US010591299B2

(12) United States Patent
Masuda

(10) Patent No.: US 10,591,299 B2
(45) Date of Patent: Mar. 17, 2020

(54) INFORMATION PROCESSING DEVICE, INFORMATION PROCESSING METHOD, AND PROGRAM

(71) Applicant: FUJIFILM CORPORATION, Minato-ku, Tokyo (JP)

(72) Inventor: Tomonori Masuda, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/101,527

(22) Filed: Aug. 13, 2018

(65) Prior Publication Data

US 2018/0347981 A1 Dec. 6, 2018

Related U.S. Application Data

(63) Continuation of application No. PCT/JP2016/083993, filed on Nov. 16, 2016.

(30) Foreign Application Priority Data

Feb. 29, 2016 (JP) ................................. 2016-038144

(51) Int. Cl.
*G01C 15/02* (2006.01)
*G01S 17/88* (2006.01)
(Continued)

(52) U.S. Cl.
CPC .............. *G01C 15/02* (2013.01); *G01C 11/02* (2013.01); *G01C 15/004* (2013.01); *G01C 25/00* (2013.01);
(Continued)

(58) Field of Classification Search
CPC ........ G01C 15/02; G01C 11/02; G01C 25/00; G01C 15/004; G03B 37/02; G03B 13/18;
(Continued)

(56) References Cited

U.S. PATENT DOCUMENTS 6,711,284 B1 3/2004 Koide
9,071,751 B2 6/2015 Higashimoto
(Continued)

FOREIGN PATENT DOCUMENTS

CN 101437167 A 5/2009
CN 102959967 A 3/2013
(Continued)

OTHER PUBLICATIONS

International Search Report issued in International Application No. PCT/JP2016/083993 dated Feb. 7, 2017.
(Continued)

*Primary Examiner* — Dominic J Bologna
(74) *Attorney, Agent, or Firm* — Solaris Intellectual Property Group, PLLC

(57) ABSTRACT

An information processing device includes an acquisition unit that acquires measurement success/failure information indicating whether or not measurement of a measurement unit has been successful, in a case where the measurement unit measures a distance to a subject by emitting directional light, which is light having directivity, toward the subject within a designated imaging range and receiving reflected light of the directional light, and an execution unit that causes the measurement unit to remeasure the distance to the subject in a state where a position of the designated imaging range has been changed within an allowable range in which the panoramic imaging is executable, in a case where the measurement success/failure information acquired by the acquisition unit indicates that the measurement of the measurement unit has not been successful.

19 Claims, 42 Drawing Sheets

(51) Int. Cl.
*G01C 11/02* (2006.01)
*G01S 17/10* (2020.01)
*H04N 5/232* (2006.01)
*G01S 7/486* (2020.01)
*G03B 37/02* (2006.01)
*G03B 13/18* (2006.01)
*G06T 7/73* (2017.01)
*G01C 15/00* (2006.01)
*G01C 25/00* (2006.01)
*G01S 7/4865* (2020.01)

(52) U.S. Cl.
CPC ............ *G01S 7/4865* (2013.01); *G01S 17/10* (2013.01); *G01S 17/88* (2013.01); *G03B 13/18* (2013.01); *G03B 37/02* (2013.01); *G06T 7/75* (2017.01); *H04N 5/23216* (2013.01); *H04N 5/23238* (2013.01); *H04N 5/23299* (2018.08)

(58) Field of Classification Search
CPC ..... H04N 5/23238; G01S 17/88; G01S 17/10; G01S 7/4865; G06T 7/75
See application file for complete search history.

(56) References Cited

U.S. PATENT DOCUMENTS

| | | | |
|---|---|---|---|
| 2009/0128663 | A1 | 5/2009 | Seto |
| 2009/0245653 | A1* | 10/2009 | Kochi .................. G06T 3/4038 382/203 |
| 2012/0229870 | A1 | 9/2012 | Inoue et al. |
| 2013/0093848 | A1 | 4/2013 | Masuda |
| 2013/0242039 | A1* | 9/2013 | Cha .................... H04N 5/23238 348/36 |

FOREIGN PATENT DOCUMENTS

| | | |
|---|---|---|
| CN | 103313081 A | 9/2013 |
| CN | 104954695 A | 9/2015 |
| CN | 104967843 A | 10/2015 |
| EP | 0964223 B1 | 4/2003 |
| JP | 2000-99740 A | 4/2000 |
| JP | 2001-124522 A | 5/2001 |
| JP | 2007-038459 A | 2/2007 |
| JP | 2007-278743 A | 10/2007 |
| JP | 2009-53126 A | 3/2009 |
| JP | 2012-185053 A | 9/2012 |
| JP | 2012-199752 A | 10/2012 |
| JP | 2013-92456 A | 5/2013 |

OTHER PUBLICATIONS

Written Opinion of the ISA issued in International Application No. PCT/JP2016/083993 dated Feb. 7, 2017.
English language translation of the following: Office action dated Oct. 11, 2019 from the SIPO in a Chinese patent application No. 201680082389.6 corresponding to the instant patent application.

* cited by examiner

INFORMATION PROCESSING DEVICE, INFORMATION PROCESSING METHOD, AND PROGRAM

CROSS-REFERENCE TO RELATED APPLICATIONS

This application is a continuation application of International Application No. PCT/JP2016/083993, filed Nov. 16, 2016, the disclosure of which is incorporated herein by reference in its entirety. Further, this application claims priority from Japanese Patent Application No. 2016-038144, filed Feb. 29, 2016, the disclosure of which is incorporated herein by reference in its entirety.

BACKGROUND

1. Technical Field

The technique of the present disclosure relates to an information processing device, an information processing method, and a program.

2. Related Art

JP2013-92456A, JP2012-185053A, and JP2000-99740A disclose a device that performs panoramic imaging on a subject. Meanwhile, in these specifications, the panoramic imaging refers to a series of operations of imaging a subject included in an imaging range with respect to a plurality of imaging ranges which are continuous with each other in a specific direction such as a vertical direction or a horizontal direction, and joining a plurality of captured images obtained by the imaging together to generate a panoramic image.

Incidentally, there has been known a distance measurement device which is equipped with a panoramic imaging function of performing panoramic imaging, in addition to a distance measurement function of emitting a laser beam to a measurement target and receiving reflected light of the laser beam to measure a distance to the measurement target. Such a type of distance measurement device operates the distance measurement function together with the panoramic imaging function to measure a distance to a subject included in an imaging range serving as an imaging target in panoramic imaging.

SUMMARY

However, in the above-described distance measurement device, it is not possible to measure a distance to a subject in a case where the subject is irradiated with a laser beam at an angle where reflected light cannot be received, is black in color, has light transmissivity, or has a gloss.

Consequently, in order to increase the degree of success in measurement of a distance to a subject, a method is considered in which the distance to the subject is measured once with respect to each of all imaging operations required in panoramic imaging.

According to this method, it is possible to increase the degree of making measurement successful in one panoramic imaging, as compared to a case where a distance to a subject is measured with respect to only a subject, included in one imaging range among all imaging ranges serving as imaging targets in one panoramic imaging, as a measurement target. However, in a case where an unsuitable region is irradiated with a laser beam as an irradiation region of the laser beam, such as a black region or a transmissive region, in each of all the imaging ranges serving as imaging targets in one panoramic imaging, a situation where measurement is never successful in one panoramic imaging may occur.

One embodiment of the invention provides an information processing device, an information processing method, and a program which are capable of increasing the degree of making the measurement of a distance to a subject successful in each of all imaging ranges serving as imaging targets in panoramic imaging, as compared to a case where the measurement of the distance to the subject is performed once with respect to each of all of the imaging ranges serving as imaging targets in the panoramic imaging.

An information processing device of a first aspect of the invention includes an acquisition unit that acquires measurement success/failure information indicating whether measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light, and an execution unit that executes a remeasurement process of causing the measurement unit to remeasure the distance to the subject in a state where a position of the designated imaging range has been changed within an allowable range in which the panoramic imaging is executable, in a case where the measurement success/failure information acquired by the acquisition unit indicates that the measurement of the measurement unit has not been successful.

Therefore, according to the information processing device of the first aspect, it is possible to increase the degree of making the measurement of the distance to the subject successful in each of all of the imaging ranges serving as imaging targets in the panoramic imaging, as compared to a case where the measurement of the distance to the subject is performed once with respect to each of all of the imaging ranges serving as imaging targets in the panoramic imaging.

In the information processing device of a second aspect of the invention according to the information processing device of the first aspect of the invention, the remeasurement process is a process including a first movement process of moving the position of the designated imaging range within the allowable range by operating a first change mechanism including a first power source and changing an imaging direction in accordance with power generated by the first power source.

Therefore, according to the information processing device of the second aspect, it is possible to move the position of the designated imaging range within the allowable range without requiring time and effort, as compared to a case where the position of the designated imaging range is manually moved within the allowable range.

In the information processing device of a third aspect of the invention according to the information processing device of the second aspect of the invention, the remeasurement process is a process including a process of causing the measurement unit to remeasure the distance to the subject, in a case where the position of the designated imaging range is moved within the allowable range by executing the first movement process by the execution unit.

Therefore, according to the information processing device of the third aspect, it is possible to cause the measurement unit to remeasure the distance to the subject by changing a location serving as a measurement target, without deviating the position of the designated imaging range from the allowable range.

In the information processing device of a fourth aspect of the invention according to the information processing device of the third aspect of the invention, the remeasurement process is a process including the process of causing the measurement unit to remeasure the distance to the subject, in a case where the position of the designated imaging range is moved within the allowable range by executing the first movement process by the execution unit and an instruction for starting the measurement of the measurement unit has been received.

Therefore, according to the information processing device of the fourth aspect, it is possible to cause the measurement unit to remeasure the distance to the subject at a user's intended timing, without deviating the position of the designated imaging range from the allowable range.

In the information processing device of a fifth aspect of the invention according to the information processing device of the first aspect of the invention, the remeasurement process is a process including a first display process of displaying first induction information for inducing the change of the position of the designated imaging range within the allowable range on a first display unit.

Therefore, according to the information processing device of the fifth aspect, it is possible to suppress the occurrence of a situation where the measurement unit remeasure the distance to the subject in a state where the position of the designated imaging range is maintained within the allowable range, as compared to a case where the first induction information is not displayed.

In the information processing device of a sixth aspect of the invention according to the information processing device of the fifth aspect of the invention, the remeasurement process further includes a second display process of displaying remeasurement start timing information indicating being a timing when the remeasurement of the measurement unit is started, on a second display unit in a case where the position of the designated imaging range has been changed within the allowable range in a state where the first induction information is displayed on the first display unit, and is a process including the process of causing the measurement unit to remeasure the distance to the subject, in a case where an instruction for starting the measurement of the measurement unit is received in a state where the remeasurement start timing information is displayed.

Therefore, according to the information processing device of the sixth aspect, it is possible to cause the measurement unit to remeasure the distance to the subject at a user's intended timing.

In the information processing device of a seventh aspect of the invention according to the information processing device of the fifth aspect of the invention, the remeasurement process is a process including a process of causing the measurement unit to remeasure the distance to the subject, in a case where the position of the designated imaging range has been changed within the allowable range in a state where the first induction information is displayed.

Therefore, according to the information processing device of the seventh aspect, it is possible to cause the measurement unit to remeasure the distance to the subject without requiring time and effort, as compared to a case where the measurement of the measurement unit is not executed again even though the position of the designated imaging range has been changed within the allowable range in a state where the first induction information is displayed.

In the information processing device of an eighth aspect of the invention according to the information processing device of any one of the first to seventh aspects of the invention, in a case where the measurement success/failure information acquired by the acquisition unit indicates that the measurement of the measurement unit has been successful, a measurement success process which is determined in advance as a process executed in a measurement success state where the measurement of the measurement unit has been successful is further executed.

Therefore, according to the information processing device of the eighth aspect, it is possible to rapidly start the execution of the measurement success process, as compared to a case where success in the measurement of the measurement unit is artificially determined without using the measurement success/failure information.

In the information processing device of a ninth aspect of the invention according to the information processing device of the eighth aspect of the invention, the measurement success process is a process including the process of causing the measurement unit to measure the distance to the subject, in a case where the position of the designated imaging range has been changed to a position where next imaging in the panoramic imaging is expected to be performed.

Therefore, according to the information processing device of the ninth aspect, it is possible to cause the measurement unit to measure the distance to the subject without requiring time and effort, as compared to a case where the measurement of the measurement unit is not executed even though the position of the designated imaging range has been changed to the position where next imaging in the panoramic imaging is expected to be performed.

In the information processing device of a tenth aspect of the invention according to the information processing device of the ninth aspect of the invention, the measurement success process is a process including a second movement process of moving the position of the designated imaging range to the position where next imaging in the panoramic imaging is expected to be performed, by operating a second change mechanism including a second power source and changing an imaging direction in accordance with power generated by the second power source.

Therefore, according to the information processing device of the tenth aspect, it is possible to move the position of the designated imaging range to the position where next imaging in the panoramic imaging is expected to be performed without requiring time and effort, as compared to a case where the position of the designated imaging range is manually moved to the position where next imaging in the panoramic imaging is expected to be performed.

In the information processing device of an eleventh aspect of the invention according to the information processing device of the ninth or tenth aspect of the invention, the measurement success process is a process including the process of causing the measurement unit to measure the distance to the subject, in a case where the position of the designated imaging range has been changed to the position where next imaging in the panoramic imaging is expected to be performed and the instruction for starting the measurement of the measurement unit has been received.

Therefore, according to the information processing device of the eleventh aspect, it is possible to cause the measurement unit to measure the distance to the subject at the user's intended timing, in a case where the position of the designated imaging range has been changed to the position where next imaging in the panoramic imaging is expected to be performed.

In the information processing device of a twelfth aspect of the invention according to the information processing device of the eighth aspect of the invention, the measurement success process is a process including a third display process of displaying second induction information for inducing the change of the position of the designated imaging range to the position where next imaging in the panoramic imaging is expected to be performed, on a third display unit.

Therefore, according to the information processing device of the twelfth aspect, it is possible to change the position of the designated imaging range to the position where next imaging in the panoramic imaging is expected to be performed at a timing, as compared to a case where the second induction information is not displayed.

In the information processing device of a thirteenth aspect of the invention according to the information processing device of the twelfth aspect of the invention, the measurement success process is a process that includes a fourth display process of displaying measurement start timing information indicating being a timing when the measurement of the measurement unit is started, on a fourth display unit in a case where the position of the designated imaging range has been changed to the position where next imaging in the panoramic imaging is expected to be performed, in a state where the second induction information is displayed on the third display unit, and includes the process of causing the measurement unit to measure the distance to the subject in a case where the instruction for starting the measurement of the measurement unit has been received in a state where the measurement start timing information is displayed.

Therefore, according to the information processing device of the thirteenth aspect, it is possible to cause the measurement unit to measure the distance to the subject at the user's intended timing, in a case where the position of the designated imaging range has been changed to the position where next imaging in the panoramic imaging is expected to be performed.

In the information processing device of a fourteenth aspect of the invention according to the information processing device of the twelfth aspect of the invention, the measurement success process is a process including the process of causing the measurement unit to measure the distance to the subject in a case where an imaging range having not been subjected to imaging has been changed to the designated imaging range in a state where the second induction information is displayed on the third display unit.

Therefore, according to the information processing device of the fourteenth aspect, it is possible to cause the measurement unit to measure the distance to the subject without requiring time and effort, as compared to a case where the measurement of the measurement unit is not executed even though the position of the designated imaging range has been changed to the position where next imaging in the panoramic imaging is expected to be performed, in a state where the second induction information is displayed.

In the information processing device of a fifteenth aspect of the invention according to the information processing device of any one of the first to fourteenth aspect of the invention, in a case where first multi-apex pixels which are at least four or more pixels for defining apexes of a polygon are included in a first captured image obtained by imaging the subject within one imaging range of which imaging is first performed, out of certain adjacent imaging ranges which are imaging ranges adjacent to each other in the plurality of imaging ranges, and corresponding pixels which are pixels corresponding to the first multi-apex pixels are included in a second captured image obtained by imaging the subject within the other imaging range out of the adjacent imaging ranges, the execution unit further executes a generation process of generating a panoramic image which is an image including a first projection-converted image which is an image obtained by performing projection conversion on the first captured image on the basis of the first multi-apex pixel, and a second projection-converted image which is an image obtained by performing projection conversion on the second captured image on the basis of the corresponding pixels.

Therefore, according to the information processing device of the fifteenth aspect of the invention, it is possible to generate the panoramic image including the projection-converted image without requiring time and effort, as compared to a case where four or more pixels for defining the apexes of the polygon are searched for with respect to each of all still images obtained by imaging each subject included in each of the plurality of imaging ranges serving as imaging targets in the panoramic imaging.

In the information processing device of a sixteenth aspect of the invention according to the information processing device of the fifteenth aspect of the invention, the execution unit further executes a fifth display process of displaying imaging start timing information, indicating a timing when the imaging of the subject within the other imaging range is started, on a fifth display unit in a case where the other imaging range includes the apexes of the polygon.

Therefore, according to the information processing device of the sixteenth aspect, it is possible to easily make a user recognize an imaging timing when a second captured image contributing to high-precision projection conversion can be acquired, as compared to a case where the imaging start timing information is not displayed.

In the information processing device of a seventeenth aspect of the invention according to the information processing device of any one of the first to sixteenth aspects of the invention, in a case where second multi-apex pixels which are at least four or more pixels for defining apexes of a polygon are included in a captured image obtained by imaging the subject within the designated imaging range, the allowable range is a range including a position on a real space which corresponds to the positions of the second multi-apex pixels within the captured image.

Therefore, according to the information processing device of the seventeenth aspect, it is possible to contribute to high-precision projection conversion of the captured image obtained by imaging the subject included in the designated imaging range within the allowable range, as compared to a case where the allowable range is not a range including the position on the real space which corresponds to the positions of the second multi-apex pixels.

In the information processing device of an eighteenth aspect of the invention according to the information processing device of any one of the first to seventeenth aspects of the invention, the execution unit further executes a derivation process of deriving a dimension of a real space region corresponding to an interval between a plurality of pixels designated within a panoramic image obtained by performing the panoramic imaging, on the basis of the distance to the subject which is measured by the measurement unit, and the interval.

Therefore, according to the information processing device of the eighteenth aspect of the invention, it is possible to derive the dimension of a real space region designated through the panoramic image, as compared to a case where the distance to the subject is measured once with respect to each of all imaging operations required in one panoramic imaging.

An information processing method of a nineteenth aspect of the invention includes acquiring measurement success/failure information indicating whether measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light, and executing a remeasurement process of causing the measurement unit to remeasure the distance to the subject in a state where a position of the designated imaging range has been changed within an allowable range in which the panoramic imaging is executable, in a case where the acquired measurement success/failure information indicates that the measurement of the measurement unit has not been successful.

Therefore, according to the information processing method of the nineteenth aspect, it is possible to increase the degree of making the measurement of the distance to the subject successful in each of all of the imaging ranges serving as imaging targets in the panoramic imaging, as compared to a case where the measurement of the distance to the subject is performed once with respect to each of all of the imaging ranges serving as imaging targets in the panoramic imaging.

A program of a twentieth aspect of the invention causes a computer to execute a process including acquiring measurement success/failure information indicating whether measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light, and executing a remeasurement process of causing the measurement unit to remeasure the distance to the subject in a state where a position of the designated imaging range has been changed within an allowable range in which the panoramic imaging is executable, in a case where the acquired measurement success/failure information indicates that the measurement of the measurement unit has not been successful.

Therefore, according to the program of the twentieth aspect, it is possible to increase the degree of making the measurement of the distance to the subject successful in each of all of the imaging ranges serving as imaging targets in the panoramic imaging, as compared to a case where the measurement of the distance to the subject is performed once with respect to each of all of the imaging ranges serving as imaging targets in the panoramic imaging.

According to one embodiment of the invention, it is possible to obtain an effect that it is possible to increase the degree of making the measurement of a distance to a subject successful in each of all imaging ranges serving as imaging targets in panoramic imaging, as compared to a case where the measurement of the distance to the subject is performed once with respect to each of all of the imaging ranges serving as imaging targets in the panoramic imaging.

BRIEF DESCRIPTION OF THE DRAWINGS

Exemplary embodiments according to the technique of the present disclosure will be described in detail based on the following figures, wherein.

DESCRIPTION

Hereinafter, an example of an embodiment according to the technique of this disclosure will be described with reference to the accompanying drawings.

Meanwhile, in this embodiment, for convenience of description, a distance from a distance measurement device 10A to a subject serving as a measurement target will be simply referred to as a "distance" or a "distance to a subject". In this embodiment, an angle of view with respect to a subject will be simply referred to as an "angle of view". In this embodiment, "distance measurement" refers to the measurement of a distance to a subject.

First Embodiment

Figure 1:
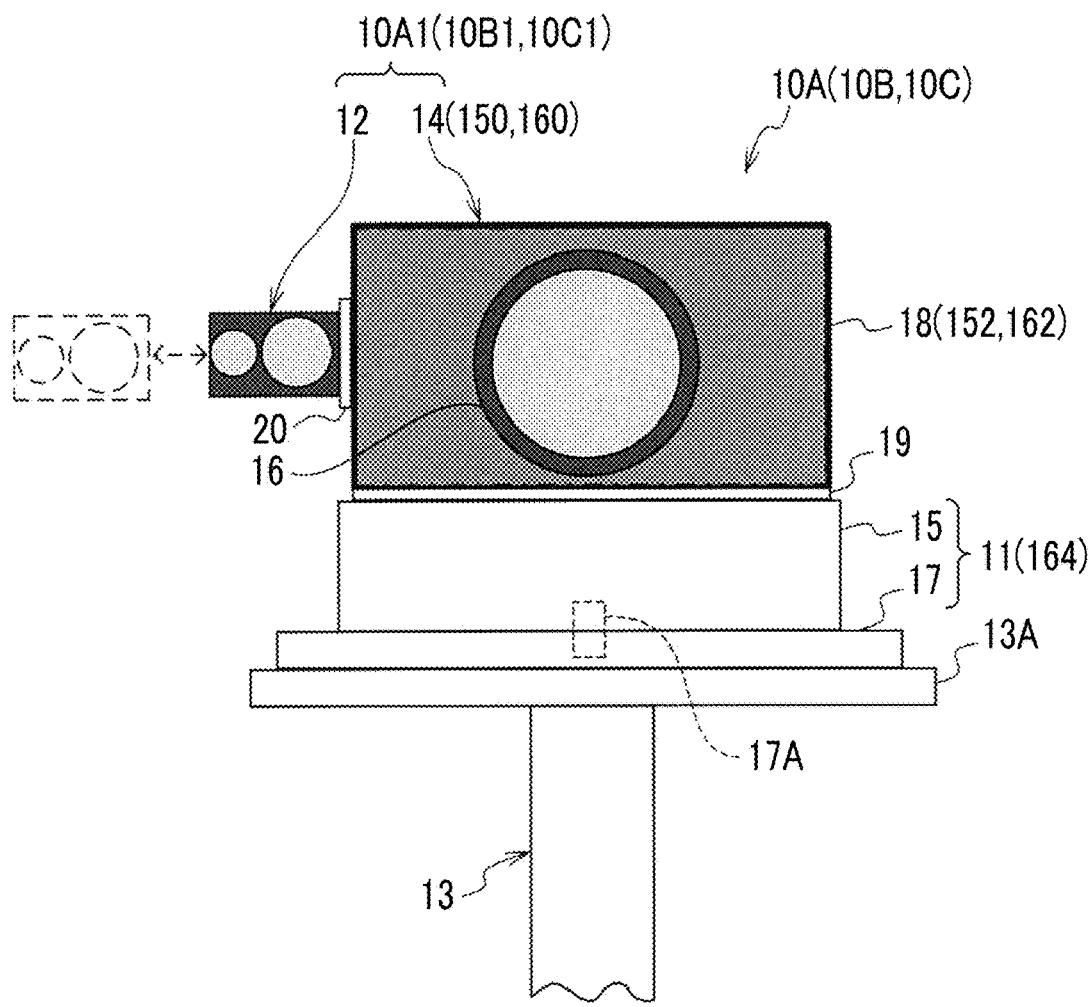
FIG. 1 is a front view illustrating an example of the appearance of a distance measurement device according to first to third embodiments.

As illustrated in FIG. 1 as an example, the distance measurement device 10A which is an example of an information processing device according to the technique of this disclosure includes a distance measurement device main body 10A1 and a change mechanism 11, and is supported by a tripod 13.

The distance measurement device main body 10A1 includes a distance measurement unit 12 and an imaging device 14. Meanwhile, in this embodiment, the distance measurement unit 12 and a distance measurement control unit 68 to be described later (see FIG. 5) are examples of a measurement unit according to the technique of this disclosure.

The change mechanism 11 which is an example of first and second change functions according to the technique of this disclosure includes a vertical rotation mechanism 15 and a horizontal rotation mechanism 17, and changes an imaging direction of the imaging device 14 in accordance with power which is generated by motors 21 and 23 to be described later. The vertical rotation mechanism 15 is disposed so as to be superimposed on the upper surface of the horizontal rotation mechanism 17. The distance measurement device main body 10A1 is disposed so as to be superimposed on the upper surface of the vertical rotation mechanism 15. The horizontal rotation mechanism 17 is detachably attached on the upper surface of a camera platform 13A of the tripod 13.

A pillar-like rotation axis 17A erected in the vertical direction of the distance measurement device 10A when seen in a front view is provided in the center portion of the horizontal rotation mechanism 17 when seen in a plan view, and the vertical rotation mechanism 15 is attached so as to be rotatable with respect to the horizontal rotation mechanism 17 through the rotation axis 17A.

A hot shoe 19 is provided on the lower surface of the imaging device 14, and the change mechanism 11 is detachably attached to the imaging device 14 through the hot shoe 19.

The imaging device 14 includes a lens unit 16 and an imaging device main body 18, and the lens unit 16 is detachably attached to the imaging device main body 18.

A hot shoe 20 is provided on the left surface of the imaging device main body 18 in a front view, and the distance measurement unit 12 is detachably attached to the hot shoe 20.

The distance measurement device 10A has a distance measurement system function of emitting a laser beam for distance measurement to the distance measurement unit 12 to perform distance measurement and an imaging system function of causing the imaging device 14 to image a subject to obtain a captured image. Meanwhile, hereinafter, a captured image will be also simply referred to as an "image". In addition, hereinafter, for convenience of description, a description will be given on the assumption that the height of an optical axis L1 (see FIG. 5) of a laser beam emitted from the distance measurement unit 12 is the same as the height of an optical axis L2 (see FIG. 5) of the lens unit 16 in the vertical direction.

The distance measurement device 10A operates the distance measurement system function to perform a measurement sequence (see FIG. 6) once in accordance with one instruction in principle, and one distance is finally output by the measurement sequence being performed once.

The distance measurement device 10A has a panoramic imaging measurement mode and a dimension derivation mode as operation modes of the distance measurement system function. The panoramic imaging measurement mode is an operation mode for performing distance measurement together with panoramic imaging. The dimension derivation mode is an operation mode for deriving the dimension of a real space region designated by a user by operating a dimension derivation function to be described later, on the basis of the actually measured distance which is a distance measured by the distance measurement device 10A.

Meanwhile, hereinafter, for convenience of description, a description will be given of an example of a case where a distance between two points in the real space is derived, as the dimension of the real space region. In addition, hereinafter, for convenience of description, "between the two points in the real space" will be referred to as an "area on the real space" or simply an "area".

The distance measurement device 10A has a still image imaging mode and a movie imaging mode as operation modes of the imaging system function. The still image imaging mode is an operation mode for capturing a still image, and the movie imaging mode is an operation mode for capturing a moving image. The still image imaging mode and the movie imaging mode are selectively set in accordance with a user's instruction.

Figure 2:
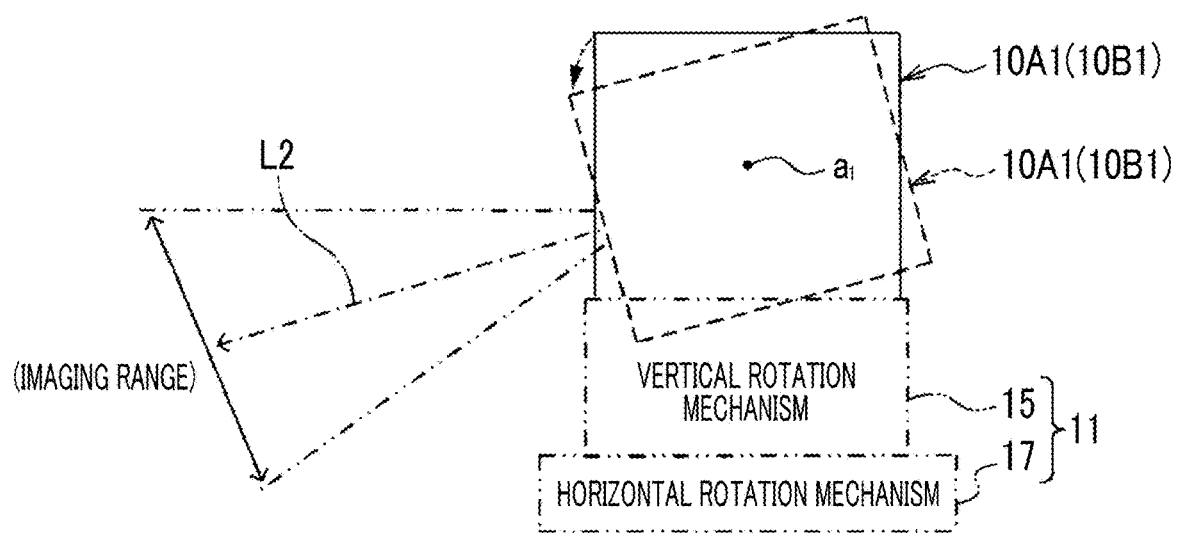
FIG. 2 is a diagram, when seen in a side view, illustrating an example of a mode in which the position of an imaging device, which is included in the distance measurement device according to the first and second embodiments, in an imaging range is changed downward when seen in a front view.
Figure 3:
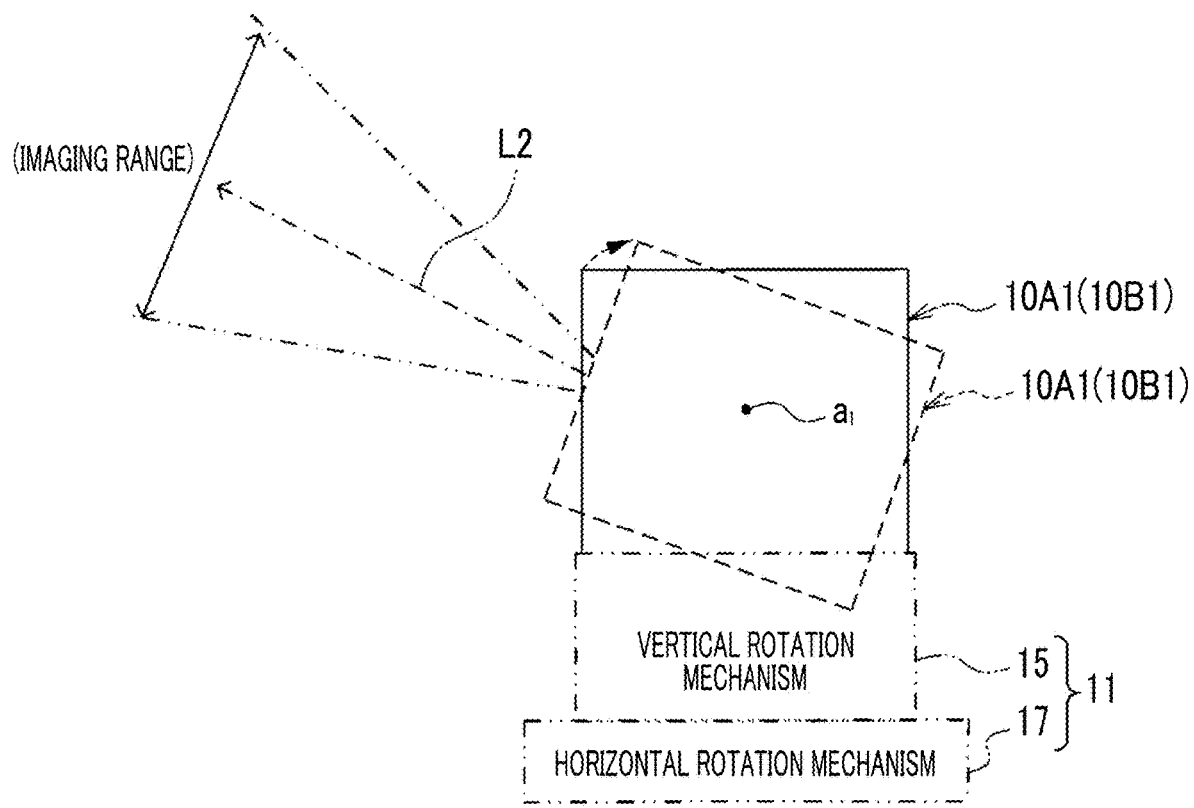
FIG. 3 is a diagram, when seen in a side view, illustrating an example of a mode in which the position of an imaging device, which is included in the distance measurement device according to the first and second embodiments, in an imaging range is changed upward when seen in a front view.

As illustrated in FIGS. 2 and 3 as examples, the vertical rotation mechanism 15 receives power generated by the motor 23 (see FIG. 5) to be described later in a state where the distance measurement device main body 10A1 is attached to the vertical rotation mechanism 15, to rotate the distance measurement device main body 10A1 in the vertical direction when seen in a front view.

As illustrated in FIG. 2 as an example, in a case where the distance measurement device main body 10A1 is rotated counterclockwise centering around a center point $a_1$ of the distance measurement device main body 10A1 when seen from the right side surface by the vertical rotation mechanism 15 in a state where the distance measurement device main body is attached to the vertical rotation mechanism 15, the position of the imaging range is changed downward when seen in a front view. In this case, the emission direction of the laser beam by the distance measurement unit 12 is also changed downward when seen in a front view. Meanwhile, in this embodiment, the imaging range refers to a range on the real space which is to be imaged by the imaging device 14.

As illustrated in FIG. 3 as an example, in a case where the distance measurement device main body 10A1 is rotated clockwise centering around the center point $a_1$ of the distance measurement device main body 10A1 when seen from the right side surface by the vertical rotation mechanism 15 in a state where the distance measurement device main body is attached to the vertical rotation mechanism 15, the position of the imaging range is changed upward when seen in a front view. In this case, the emission direction of the laser beam by the distance measurement unit 12 is also changed upward when seen in a front view.

Figure 4:
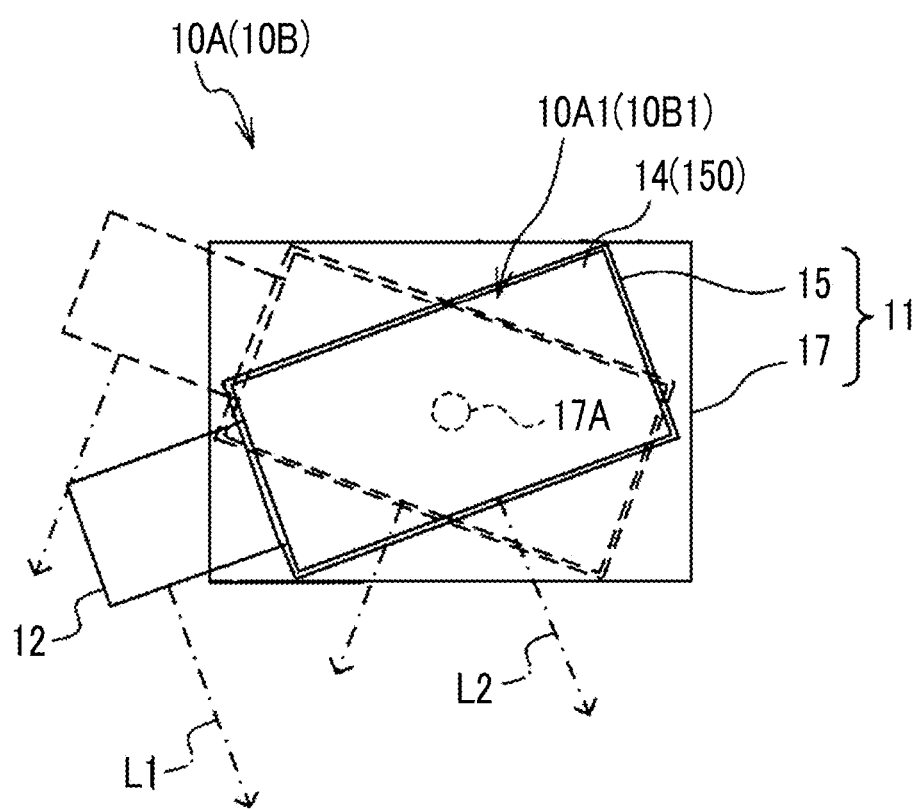
FIG. 4 is a diagram, when seen in a plan view, illustrating an example of a mode in which a distance measurement device main body included in the distance measurement device according to the first and second embodiments is rotated in a lateral direction when seen in a front view.

As illustrated in FIG. 4 as an example, the center portion of the vertical rotation mechanism 15 when seen in a bottom view is fixed to the rotation axis 17A of the horizontal rotation mechanism 17. The rotation axis 17A is rotated by the transmission of power, generated by the motor 21 (see FIG. 5) to be described later, as a rotational force. Therefore, the horizontal rotation mechanism 17 receives the power generated by the motor 21 to be described later in a state where the distance measurement device main body 10A1 is attached to the vertical rotation mechanism 15, to rotate the distance measurement device main body 10A1 in the lateral direction when seen in a front view.

That is, in a case where the distance measurement device main body 10A1 is rotated counterclockwise when seen in a plan view centering around the rotation axis 17A of the distance measurement device main body 10A1 by the horizontal rotation mechanism 17 in a state where the distance measurement device main body is attached to the vertical rotation mechanism 15, the position of the imaging range is changed rightward when seen in a front view. In this case, the emission direction of the laser beam by the distance measurement unit 12 is also changed rightward when seen in a front view.

In a case where the distance measurement device main body 10A1 is rotated counterclockwise centering around the rotation axis 17A of the distance measurement device main body 10A1 when seen in a plan view by the horizontal rotation mechanism 17 in a state where the distance measurement device main body is attached to the vertical rotation mechanism 15, the position of the imaging range is changed leftward when seen in a front view. In this case, the emission direction of the laser beam by the distance measurement unit 12 is also changed leftward when seen in a front view.

Figure 5:
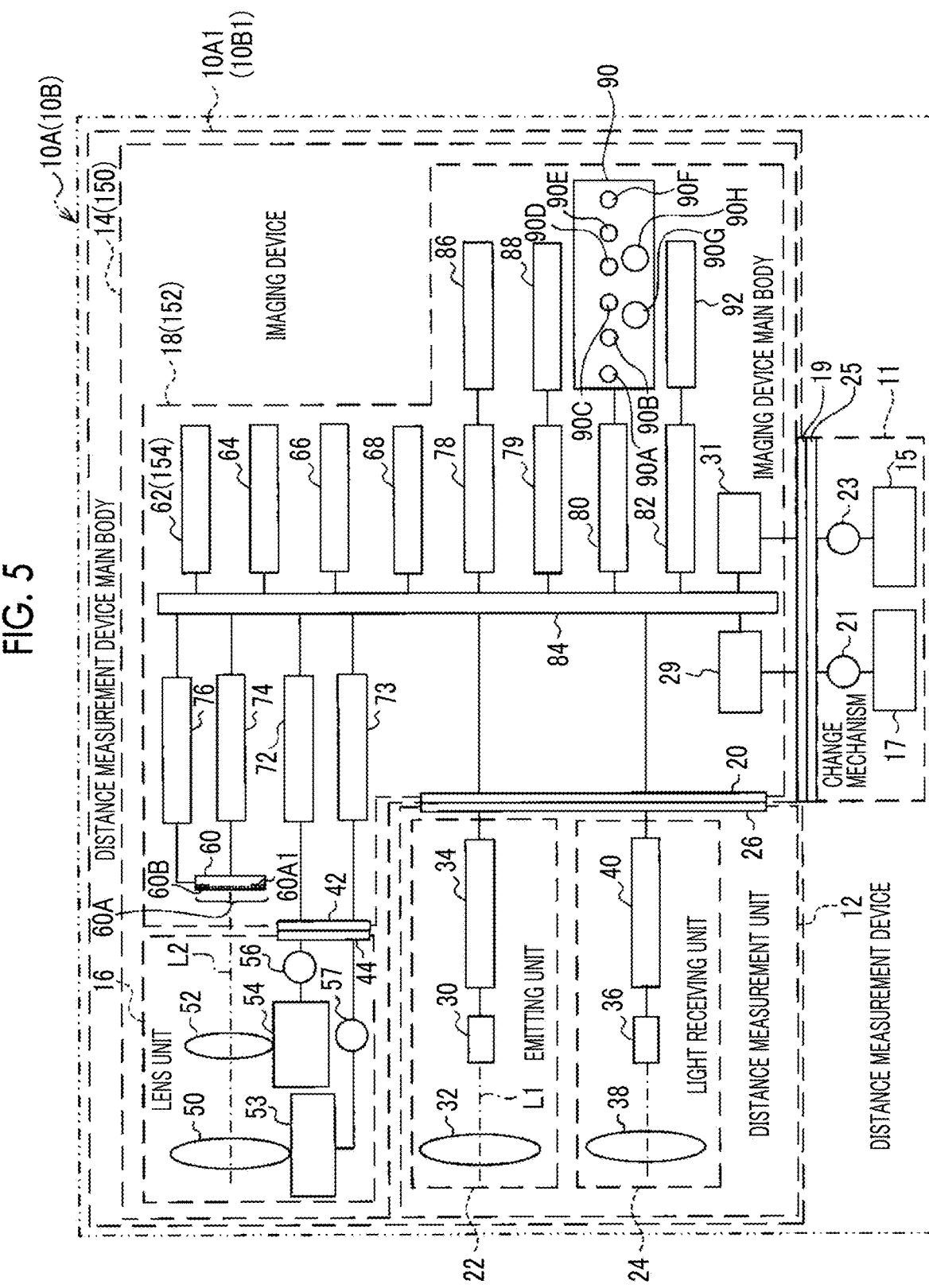
FIG. 5 is a block diagram illustrating an example of a hardware configuration of the distance measurement device according to the first and second embodiments.

As illustrated in FIG. 5 as an example, the distance measurement unit 12 includes an emitting unit 22, a light receiving unit 24, and a connector 26.

The connector 26 can be connected to the hot shoe 20, and the distance measurement unit 12 is operated under the control of the imaging device main body 18 in a state where the connector 26 is connected to the hot shoe 20.

The emitting unit 22 includes a Laser Diode (LD) 30, a condensing lens (not shown), an objective lens 32, and an LD driver 34.

The condensing lens and the objective lens 32 are provided along the optical axis L1 of a laser beam emitted by the LD 30, and are disposed in this order along the optical axis L1 from the LD 30 side.

The LD 30 emits a laser beam for distance measurement which is an example of a directional light according to the technique of this disclosure. The laser beam emitted by the LD 30 is a colored laser beam, and an irradiation position of the laser beam is visually recognized on the real space and is also visually recognized from a captured image obtained by the imaging device 14, for example, within a range of approximately several meters from the emitting unit 22.

The condensing lens condenses a laser beam emitted by the LD 30, and transmits the condensed laser beam. The objective lens 32 faces a subject, and emits the laser beam passing through the condensing lens to the subject.

The LD driver 34 is connected to the connector 26 and the LD 30, and drives the LD 30 in accordance with an instruction of the imaging device main body 18 to emit a laser beam.

The light receiving unit 24 includes a Photo Diode (PD) 36, an objective lens 38, and a light receiving signal processing circuit 40. The objective lens 38 is disposed on a light receiving surface side of the PD 36, and a reflected laser beam which is a laser beam emitted by the emitting unit 22 and reflected from the subject is incident on the objective lens 38. The objective lens 38 transmits the reflected laser beam and guides the reflected laser beam to the light receiving surface of the PD 36. The PD 36 receives the reflected laser beam having passed through the objective lens 38, and outputs an analog signal based on the amount of light received, as a light receiving signal.

The light receiving signal processing circuit 40 is connected to the connector 26 and the PD 36, amplifies the light receiving signal, which is input from the PD 36, by an amplifier (not shown), and performs Analog/Digital (A/D) conversion on the amplified light receiving signal. The light receiving signal processing circuit 40 outputs the light receiving signal digitalized by the A/D conversion to the imaging device main body 18.

The imaging device 14 includes mounts 42 and 44. The mount 42 is provided in the imaging device main body 18, and the mount 44 is provided in the lens unit 16. The lens unit 16 is exchangeably mounted on the imaging device main body 18 by the mount 44 being coupled to the mount 42.

The lens unit 16 includes a focusing lens 50, a zoom lens 52, a focusing lens movement mechanism 53, a zoom lens moving mechanism 54, and motors 56 and 57.

Subject light which is light reflected from the subject is incident on the focusing lens 50. The focusing lens 50 transmits the subject light and guides the subject light to the zoom lens 52.

The focusing lens 50 is attached to the focusing lens movement mechanism 53 so as to be slidable with respect to the optical axis L2. In addition, the motor 57 is connected to the focusing lens movement mechanism 53, and the focusing lens movement mechanism 53 receives power of the motor 57 to make the focusing lens 50 slide along the direction of the optical axis L2.

The zoom lens 52 is attached to the zoom lens moving mechanism 54 so as to be slidable with respect to the optical axis L2. In addition, the motor 56 is connected to the zoom lens moving mechanism 54, and the zoom lens moving mechanism 54 receives the power of the motor 56 to make the zoom lens 52 slide along the direction of the optical axis L2.

The motors 56 and 57 are connected to the imaging device main body 18 through the mounts 42 and 44, and driving is controlled in accordance with a command given from the imaging device main body 18.

The change mechanism 11 includes the vertical rotation mechanism 15, the horizontal rotation mechanism 17, the motors 21 and 23, and the connector 25. The motor 21 and the motor 23 which are examples of first and second power sources according to the technique of this disclosure are connected to the connector 25.

The connector 25 is configured to be connectable to the hot shoe 19. In a case where the connector 25 is connected to the hot shoe 19, the motors 21 and 23 are connected to the imaging device main body 18, and the driving of the motors is controlled in accordance with a command given from the imaging device main body 18.

Meanwhile, in this embodiment, a stepping motor is applied as an example of the motors 21, 23, 56, and 57. Therefore, the motors 21, 23, 56, and 57 are operated in synchronization with a pulse power on the basis of a command given from the imaging device main body 18.

The imaging device main body 18 includes an imaging element 60, a main control unit 62, an image memory 64, an image processing unit 66, a distance measurement control unit 68, motor drivers 29, 31, 72, and 73, an imaging element driver 74, an image signal processing circuit 76, and a display control unit 78. In addition, the imaging device main body 18 includes a touch panel interface (I/F) 79, a reception I/F 80, and a media I/F 82.

The main control unit 62, the image memory 64, the image processing unit 66, the distance measurement control unit 68, the motor drivers 29, 31, 72, and 73, the imaging element driver 74, the image signal processing circuit 76, and the display control unit 78 are connected to a bus line 84. In addition, the touch panel I/F 79, the reception I/F 80, and the media I/F 82 are also connected to the bus line 84.

The imaging element 60 is a Complementary Metal Oxide Semiconductor (CMOS) type image sensor, and includes color filters (not shown). The color filters include a G filter corresponding to green (G), an R filter corresponding to red (R), and a B filter corresponding to blue (B) which most contribute to the obtainment of a brightness signal. The imaging element 60 includes an imaging pixel group 60A including a plurality of imaging pixels 60A1 arranged in a matrix. Any one filter of the R filter, the G filter, and the B filter included in the color filters is allocated to each of the imaging pixels 60A1, and the imaging pixel group 60A receives the subject light to image the subject.

That is, the subject light having passed through the zoom lens 52 is imaged on an imaging surface 60B which is the light receiving surface of the imaging element 60, and charge based on the amount of subject light received is accumulated in the imaging pixels 60A1. The imaging element 60 outputs the charge accumulated in the imaging pixels 60A1 as an image signal indicating an image equivalent to a subject image which is obtained by imaging the subject light on the imaging surface 60B.

The main control unit 62 controls the entire distance measurement device 10A through the bus line 84.

The motor driver 72 is connected to the motor 56 through the mounts 42 and 44, and controls the motor 56 in accordance with an instruction of the main control unit 62. The motor driver 73 is connected to the motor 57 through the mounts 42 and 44, and controls the motor 57 in accordance with an instruction of the main control unit 62.

The imaging device 14 has a viewing angle changing function. The viewing angle changing function is a function of changing an angle of view by moving the zoom lens 52, and is realized by the zoom lens 52, the zoom lens moving mechanism 54, the motor 56, the motor driver 72, and the main control unit 62 in this embodiment. Meanwhile, in this embodiment, an optical viewing angle changing function of the zoom lens 52 is described. However, the technique of this disclosure is not limited thereto, an electronic viewing angle changing function not using the zoom lens 52 may be used.

The imaging element driver 74 is connected to the imaging element 60, and provides a driving pulse to the imaging element 60 under the control of the main control unit 62. The imaging pixels 60A1 included in the imaging pixel group 60A are driven in accordance with the driving pulse supplied to the imaging element 60 by the imaging element driver 74.

The image signal processing circuit 76 is connected to the imaging element 60, and reads out an image signal for one frame from the imaging element 60 for each imaging pixel 60A1 under the control of the main control unit 62. The image signal processing circuit 76 performs various processing, such as correlative double sampling processing, automatic gain control, and A/D conversion, on the read-out image signal. The image signal processing circuit 76 outputs an image signal, which is digitalized by performing various processing on the image signal, to the image memory 64 for each frame at a specific frame rate (for example, several tens of frames per second) which is specified by a clock signal supplied from the main control unit 62. The image memory 64 temporarily holds the image signal which is input from the image signal processing circuit 76.

The motor driver 29 is connected to the motor 21 through the hot shoe 19 and the connector 25, and controls the motor 21 in accordance with an instruction of the main control unit 62. The motor driver 31 is connected to the motor 23 through the hot shoe 19 and the connector 25, and controls the motor 23 in accordance with an instruction of the main control unit 62. Power generated by the motor 21 is transmitted to the horizontal rotation mechanism 17, and power generated by the motor 23 is transmitted to the vertical rotation mechanism 15.

The imaging device main body 18 includes a display unit 86 which is an example of first to fifth display units according to the technique of this disclosure, a touch panel 88, a reception device 90, and a memory card 92.

The display unit 86 is connected to the display control unit 78, and displays various information under the control of the display control unit 78. The display unit 86 is realized by, for example, a Liquid Crystal Display (LCD).

The touch panel 88 is superimposed on a display screen of the display unit 86, and receives a touch of a user's finger or an indicator such as a touch pen. The touch panel 88 is connected to the touch panel I/F 79, and outputs positional information indicating a position touched by the indicator to the touch panel I/F 79. The touch panel I/F 79 operates the touch panel 88 in accordance with an instruction of the main control unit 62, and outputs the positional information, which is input from the touch panel 88, to the main control unit 62. Meanwhile, in this embodiment, the touch panel 88 is described, but the invention is not limited thereto. A mouse (not shown) used by being connected to the distance measurement device 10A may be applied instead of the touch panel 88, or the touch panel 88 and the mouse may be used in combination.

The reception device 90 includes an imaging measurement button 90A, an imaging button (not shown), an imaging system operation mode switching button 90B, a wide angle instruction button 90C, a telephoto instruction button 90D, a panoramic imaging measurement button 90E, and a dimension derivation button 90F. In addition, the reception device 90 also includes a rotary switch for vertical rotation 90G, a rotary switch for horizontal rotation 90H, and the like, and receives the user's various instructions. The reception device 90 is connected to the reception I/F 80, and the reception I/F 80 outputs an instruction content signal indicating contents of an instruction received by the reception device 90 to the main control unit 62.

The imaging measurement button 90A is a pressing type button that receives an instruction for starting imaging and measurement. The imaging button is a pressing type button that receives an instruction for starting imaging. The imaging system operation mode switching button 90B is a pressing type button that receives an instruction for switching between a still image imaging mode and a movie imaging mode.

The wide angle instruction button 90C is a pressing type button that receives an instruction for setting an angle of view to be a wide angle, and the amount of change of the angle of view to the wide angle side is determined depending on a pressing time for which the pressing of the wide angle instruction button 90C is continuously performed within an allowable range.

The telephoto instruction button 90D is a pressing type button that receives an instruction for setting an angle of view to be at a telephoto side, the amount of change of the angle of view to the telephoto side is determined depending on a pressing time for which the pressing of the telephoto instruction button 90D is continuously performed within an allowable range.

The panoramic imaging measurement button 90E is a pressing type button that receives an instruction for starting a panoramic imaging measurement process to be described later. The dimension derivation button 90F is a pressing type button that receives an instruction for starting a dimension derivation process to be described later. The rotary switch for vertical rotation 90G is a rotary type switch that receives an instruction for operating the vertical rotation mechanism 15 to change the position of an imaging range and an irradiation direction of a laser beam in the vertical direction when seen in a front view. The rotary switch for horizontal rotation 90H is a rotary type switch that receives an instruction for operating the horizontal rotation mechanism 17 to change the position of an imaging range and an irradiation direction of a laser beam in the lateral direction when seen in a front view.

Meanwhile, hereinafter, for convenience of description, the rotary switch for vertical rotation 90G and the rotary switch for horizontal rotation 90H will be referred to as a "rotary switch" without a reference numeral in a case where it is not necessary to give a description by distinguishing between the switches.

In addition, hereinafter, for convenience of description, the imaging measurement button 90A and the imaging button will be referred to as a "release button" without a reference numeral in a case where it is not necessary to give a description by distinguishing between the buttons. In addition, hereinafter, for convenience of description, the wide angle instruction button 90C and the telephoto instruction button 90D will be referred to as a "view angle instruction button" without a reference numeral in a case where it is not necessary to give a description by distinguishing between the buttons.

Meanwhile, in the distance measurement device 10A according to this embodiment, a manual focus mode and an autofocus mode are selectively set in accordance with the user's instruction through the reception device 90. The release button receives two-stage pressing operations of an imaging preparation instruction state and an imaging instruction state. The imaging preparation instruction state refers to, for example, a state where the release button is pressed to an intermediate position (half pressing position) from a waiting position, and the imaging instruction state refers to a state where the release button is pressed to a final pressing position (full pressing position) beyond the intermediate position. Meanwhile, hereinafter, for convenience of description, the "state where the release button is pressed to the half pressing position from the waiting position" will be referred to as a "half pressing state", and the "state where the release button is pressed to the full pressing position from the waiting position" will be referred to as a "full pressing state".

In the autofocus mode, the adjustment of imaging conditions is performed by the release button being set to be in a half pressing state. Thereafter, when the release button is subsequently set to be in a full pressing state, the actual exposure is performed. That is, after exposure adjustment is performed by the operation of an Automatic Exposure (AE) function by the release button being set to be in a half pressing state prior to the actual exposure, focus adjustment is performed by the operation of an Auto-Focus (AF) function, and the actual exposure is performed when the release button is set to be in a full pressing state.

Here, the actual exposure refers to exposure performed to obtain a still image file to be described later. In this embodiment, the exposure means exposure performed to obtain a live view image to be described later and exposure performed to obtain a moving image file to be described later, in addition to the actual exposure. Hereinafter, for convenience of description, the exposures will be simply referred to as "exposure" in a case where it is not necessary to give a description by distinguishing between the exposures.

Meanwhile, in this embodiment, the main control unit 62 performs exposure adjustment based on an AE function and focus adjustment based on an AF function. In this embodiment, a case where the exposure adjustment and the focus adjustment are performed is described. However, the technique of this disclosure is not limited thereto, and the exposure adjustment or the focus adjustment may be performed.

The image processing unit 66 acquires an image signal for each frame from the image memory 64 at a specific frame rate, and performs various processing, such as gamma correction, brightness color difference conversion, and compression processing, on the acquired image signal.

The image processing unit 66 outputs the image signal, which is obtained by performing various processing, to the display control unit 78 for each frame at a specific frame rate. In addition, the image processing unit 66 outputs the image signal, which is obtained by performing various processing, to the main control unit 62 in accordance with a request of the main control unit 62.

The display control unit 78 outputs the image signal, which is input from the image processing unit 66, to the display unit 86 for each frame at a specific frame rate under the control of the main control unit 62.

The display unit 86 displays an image, character information, and the like. The display unit 86 displays an image shown by the image signal, which is input from the display control unit 78 at a specific frame rate, as a live view image. The live view image is a consecutive frame image which is obtained by consecutive imaging, and is also referred to as a through-image. In addition, the display unit 86 also displays a still image which is a single frame image obtained by performing imaging using a single frame. Further, the display unit 86 also displays a reproduced image, a menu screen, and the like, in addition to the live view image.

Meanwhile, in this embodiment, the image processing unit 66 and the display control unit 78 are realized by an Application Specific Integrated Circuit (ASIC), but the technique of this disclosure is not limited thereto. For example, each of the image processing unit 66 and the display control unit 78 may be realized by a Field-Programmable Gate Array (FPGA). In addition, the image processing unit 66 may be realized by a computer including a Central Processing Unit (CPU), a Read Only Memory (ROM), and a Random Access Memory (RAM). In addition, the display control unit 78 may also be realized by a computer including a CPU, a ROM, and a RAM. Further, each of the image processing unit 66 and the display control unit 78 may be realized by a combination of a hardware configuration and a software configuration.

The main control unit 62 controls the imaging element driver 74 to cause the imaging element 60 to perform exposure for each frame in a case where an instruction for capturing a still image is received by the release button under a still image imaging mode. The main control unit 62 acquires an image signal, which is obtained by performing the exposure for each frame, from the image processing unit 66 and performs compression processing on the acquired image signal to generate a still image file having a specific still image format. Meanwhile, here, the specific still image format refers to, for example, Joint Photographic Experts Group (JPEG).

The main control unit 62 acquires an image signal, which is output to the display control unit 78 as a signal for a live view image by the image processing unit 66, for each frame at a specific frame rate in a case where an instruction for capturing a moving image is received by the release button under a movie imaging mode. The main control unit 62 performs compression processing on the image signal acquired from the image processing unit 66 to generate a moving image file having a specific moving image format.

Meanwhile, here, the specific moving image format refers to, for example, Moving Picture Experts Group (MPEG). In addition, hereinafter, for convenience of description, the still image file and the moving image file will be referred to as an image file in a case where it is not necessary to give a description by distinguishing between the image files.

The media I/F 82 is connected to the memory card 92, and performs the recording and read-out of the image file on the memory card 92 under the control of the main control unit 62. Meanwhile, the image file which is read out from the memory card 92 by the media I/F 82 is subjected to extension processing by the main control unit 62 to be displayed on the display unit 86 as a reproduced image.

Meanwhile, the main control unit 62 stores distance information, which is input from the distance measurement control unit 68, in the memory card 92 through the media I/F 82 in association with the image file. The distance information is read out together with the image file by the main control unit 62 from the memory card 92 through the media I/F 82, and a distance indicated by the read-out distance information is displayed on the display unit 86 together with the reproduced image based on the associated image file.

The distance measurement control unit 68 controls the distance measurement unit 12 under the control of the main control unit 62. Meanwhile, in this embodiment, the distance measurement control unit 68 is realized by an ASIC, but the technique of this disclosure is not limited thereto. For example, the distance measurement control unit 68 may be realized by a FPGA. In addition, the distance measurement control unit 68 may be realized by a computer including a CPU, a ROM, and a RAM. Further, the distance measurement control unit 68 may be realized by a combination of a hardware configuration and a software configuration.

The hot shoe 20 is connected to the bus line 84, and the distance measurement control unit 68 controls the LD driver 34 to control the emission of a laser beam by the LD 30 under the control of the main control unit 62 and acquires a light receiving signal from the light receiving signal processing circuit 40. The distance measurement control unit 68 derives a distance to the subject on the basis of a timing when the laser beam is emitted and a timing when the light receiving signal is acquired, and outputs distance information indicating the derived distance to the main control unit 62.

Here, the measurement of a distance to the subject by the distance measurement control unit 68 will be described in more detail.

Figure 6:
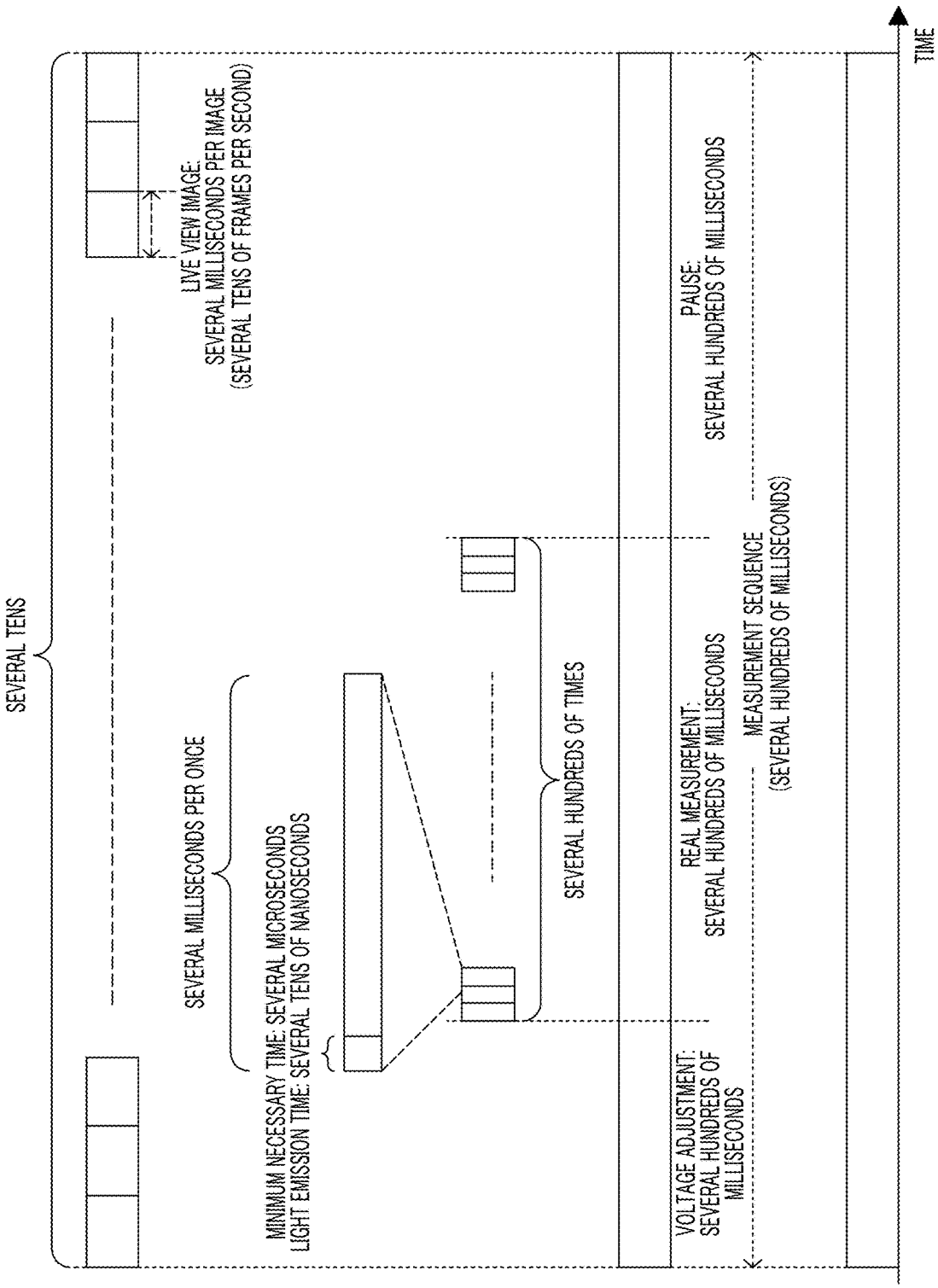
FIG. 6 is a time chart illustrating an example of a measurement sequence based on the distance measurement device according to the first to third embodiments.

As illustrated in FIG. 6 as an example, one measurement sequence by the distance measurement device 10A is specified by a voltage adjustment period, a real measurement period, and a pause period.

The voltage adjustment period is a period in which driving voltages of the LD 30 and the PD 36 are adjusted. The real measurement period is a period in which a distance to the subject is actually measured. In the real measurement period, an operation of causing the LD 30 to emit a laser beam and causing the PD 36 to receive the reflected laser beam is repeated several hundred times, and a distance to the subject is derived on the basis of a timing when the laser beam is emitted and a timing when the light receiving signal is acquired. The pause period is a period for stopping the driving of the LD 30 and the PD 36. Accordingly, in one measurement sequence, the measurement of a distance to the subject is performed several hundred times.

Meanwhile, in this embodiment, each of the voltage adjustment period, the real measurement period, and the pause period is set to be several hundred milliseconds.

Figure 7:
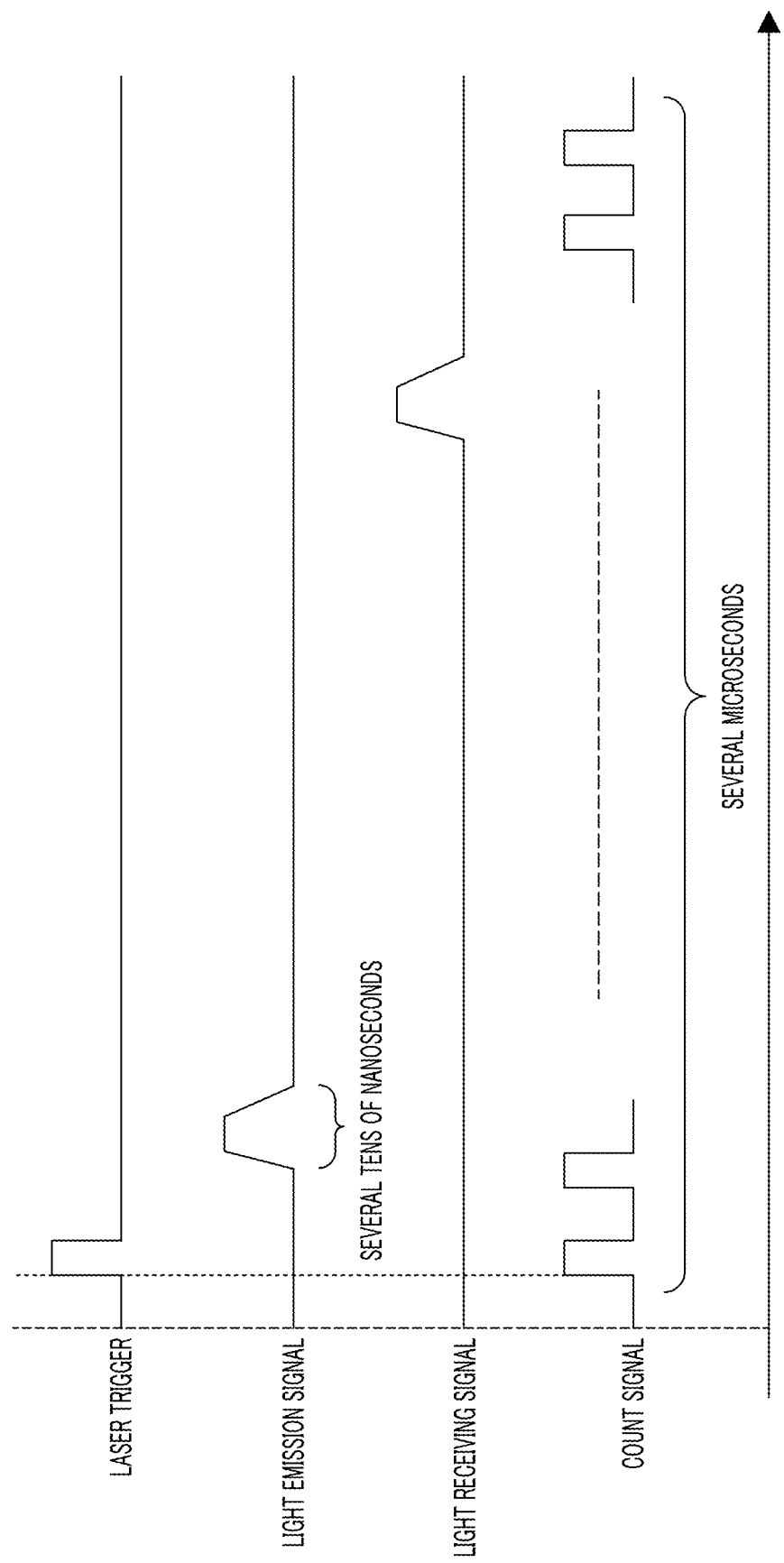
FIG. 7 is a time chart illustrating examples of a laser trigger, a light emission signal, a light receiving signal, and a count signal which are required in a case where measurement is performed once by the distance measurement device according to the first to third embodiments.

As illustrated in FIG. 7 as an example, a count signal for specifying a timing when the distance measurement control unit 68 gives an instruction for emitting a laser beam and a timing when a light receiving signal is acquired is provided to the distance measurement control unit 68 is supplied. In this embodiment, the count signal is generated by the main control unit 62 and is supplied to the distance measurement control unit 68. However, the invention is not limited thereto, and the control signal may be generated by a dedicated circuit, such as a time counter, which is connected to the bus line 84, and may be supplied to the distance measurement control unit 68.

The distance measurement control unit 68 outputs a laser trigger for emitting a laser beam to the LD driver 34 in accordance with the count signal. The LD driver 34 drives the LD 30 to emit a laser beam in accordance with the laser trigger.

In the example illustrated in FIG. 7, a light emission time of a laser beam is set to be several tens of nanoseconds. In this case, a time until the laser beam, which is emitted toward a subject positioned several kilometers ahead by the emitting unit 22, is received by the PD 36 as a reflected laser beam is set to be "several kilometers×2/speed of light"≈several microseconds. Therefore, as illustrated in FIG. 6 as an example, a time of several microseconds is required as a minimum necessary time in order to measure a distance to the subject positioned several kilometers ahead.

Meanwhile, in this embodiment, as illustrated in FIG. 6 as an example, one measurement time is set to be several milliseconds in consideration of a reciprocating time of the laser beam, and the like. However, the reciprocating time of the laser beam varies depending on a distance to the subject, and thus one measurement time may vary in accordance with an assumed distance.

In a case where a distance to the subject is derived on the basis of measured values obtained from several hundred times of measurement in one measurement sequence, the distance measurement control unit 68 analyzes, for example, a histogram of the measured values obtained from several hundred times of measurement to derive a distance to the subject.

Figure 8:
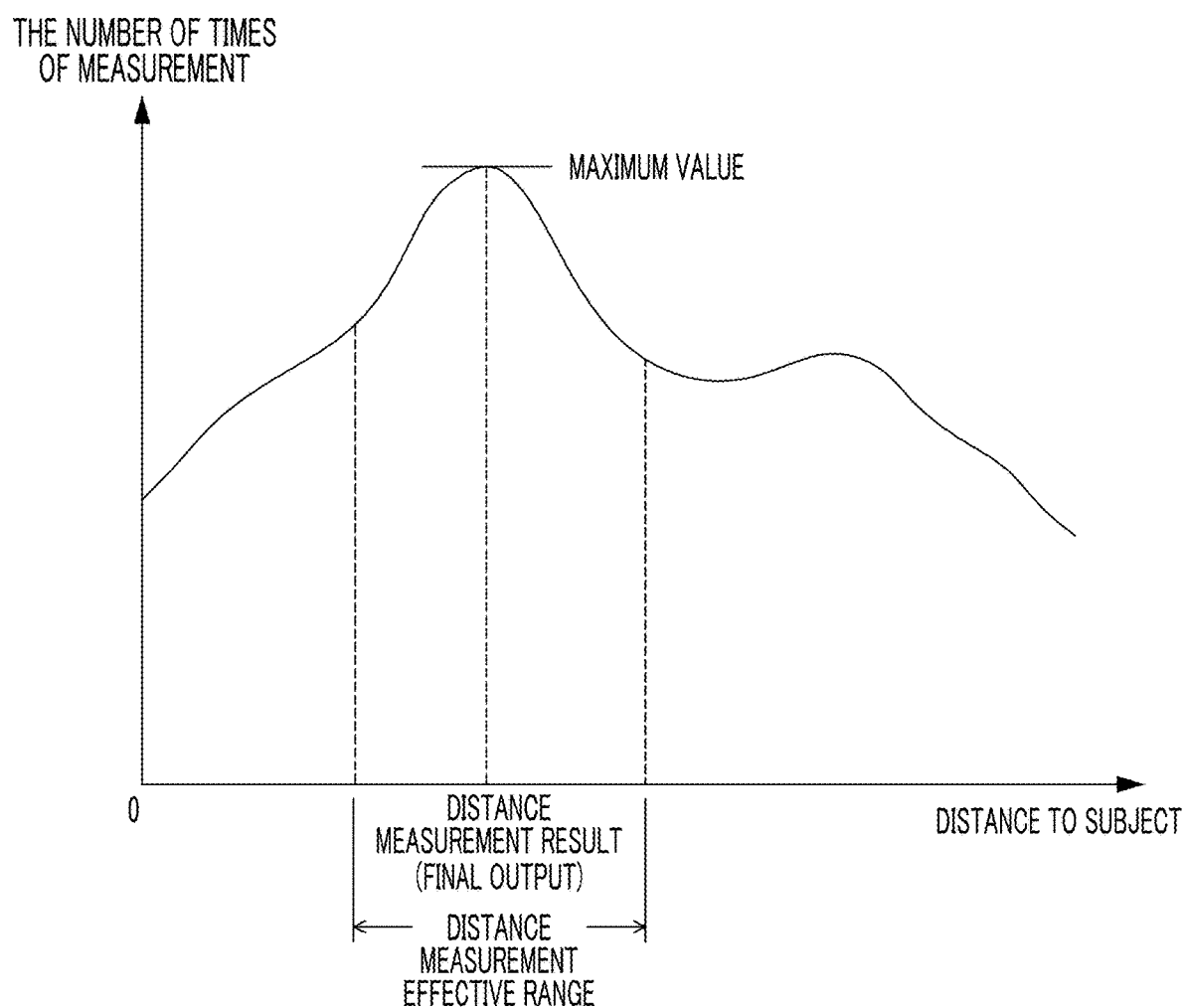
FIG. 8 is a graph illustrating an example of a histogram (a histogram in a case where a distance (measured value) to a subject is represented by a lateral axis and the number of times of measurement is represented by a vertical axis) of measured values obtained in a measurement sequence based on the distance measurement device according to the first to third embodiments.

As illustrated in FIG. 8 as an example, in a histogram of measured values obtained from several hundred times of measurement in one measurement sequence, the lateral axis represents a distance to a subject, the vertical axis represents the number of times of measurement, and a distance corresponding to a maximum value of the number of times of measurement is derived by the distance measurement control unit 68 as a distance measurement result. Meanwhile, the histogram illustrated in FIG. 8 is just an example, and a histogram may be generated on the basis of a reciprocating time (an elapsed time from the emission of light to the reception of light) of a laser beam, half of the reciprocating time of the laser beam, or the like, instead of the distance to the subject.

Figure 9:
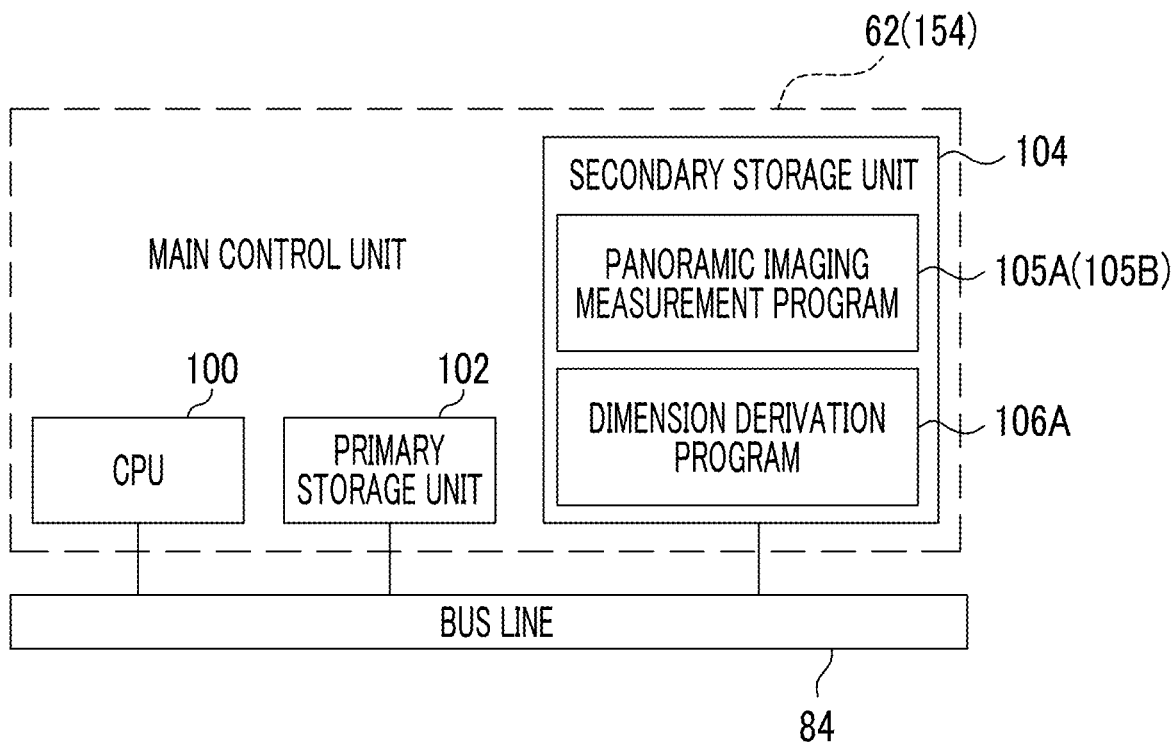
FIG. 9 is a block diagram illustrating an example of a hardware configuration of a main control unit included in the distance measurement device according to the first and second embodiments.

As illustrated in FIG. 9 as an example, the main control unit 62 includes a CPU 100, a primary storage unit 102, and a secondary storage unit 104 which are examples of an acquisition unit and an execution unit according to the technique of this disclosure. The CPU 100 controls the entire distance measurement device 10A. The primary storage unit 102 is a volatile memory which is used as a work area during the execution of various programs, and the like. An example of the primary storage unit 102 is a RAM. The secondary storage unit 104 is a non-volatile memory that stores control programs, various parameters, or the like for controlling the operation of the distance measurement device 10A in advance. An example of the secondary storage unit 104 is an Electrically Erasable Programmable Read Only Memory (EEPROM), a flash memory, or the like. The CPU 100, the primary storage unit 102, and the secondary storage unit 104 are connected to each other through the bus line 84.

In the distance measurement device 10A, the secondary storage unit 104 stores a panoramic imaging measurement program 105A and a dimension derivation program 106A, as illustrated in FIG. 9 as an example. Meanwhile, the panoramic imaging measurement program 105A is an example of a program according to the technique of this disclosure.

The CPU 100 reads out the panoramic imaging measurement program 105A from the secondary storage unit 104, and develops the read-out panoramic imaging measurement program 105A to the primary storage unit 102. The CPU 100 executes the panoramic imaging measurement program 105A which is developed to the primary storage unit 102.

Figure 10:
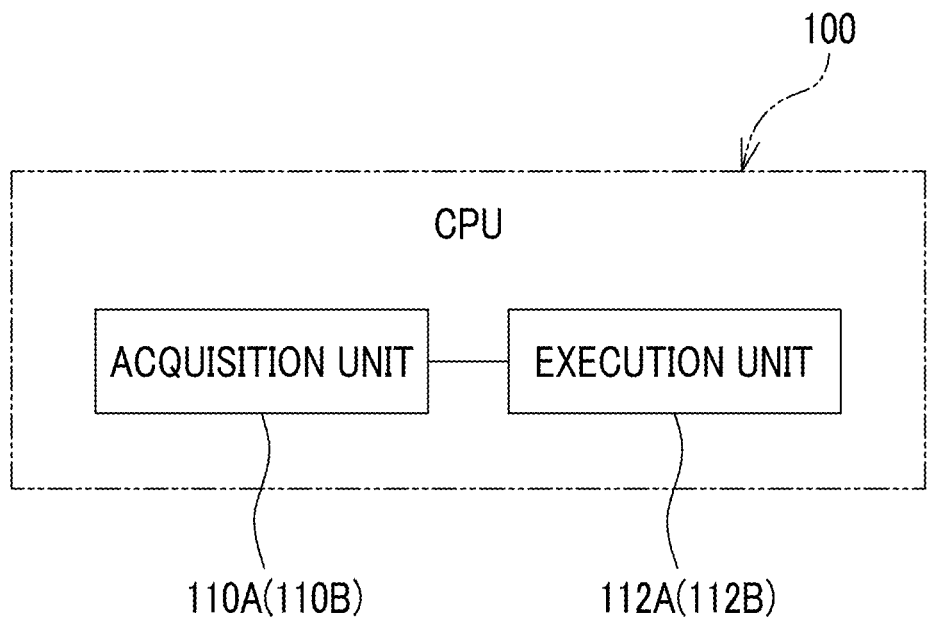
FIG. 10 is a block diagram illustrating an example of a main function of a CPU according to the first and second embodiments.

The CPU 100 executes the panoramic imaging measurement program 105A to operate as an acquisition unit 110A and an execution unit 112A, as illustrated in FIG. 10 as an example.

The acquisition unit 110A acquires measurement success/failure information in a case where a measurement process is executed by operating a distance measurement system function with a subject within a designated imaging range as a measurement target. Here, the designated imaging range refers to an imaging range which is designated as an object to be subjected to imaging before each imaging is performed, among a plurality of imaging ranges serving as imaging targets in panoramic imaging with respect to a subject. The each imaging refers to, for example, one imaging for a still image in the panoramic imaging. In addition, the measurement process refers to a process of causing the distance measurement unit 12 and the distance measurement control unit 68 to measure a distance to the subject. Further, the measurement success/failure information refers to information indicating whether the measurement of the distance to the subject by the distance measurement unit 12 and the distance measurement control unit 68 has been successful or not.

Meanwhile, hereinafter, for convenience of description, the distance measurement unit 12 and the distance measurement control unit 68 will also be referred to as a "measurement unit" without a reference numeral. In addition, hereinafter, for convenience of description, the measurement of a distance to a subject by the measurement unit will also be simply referred to as "measurement by the measurement unit". In addition, hereinafter, for convenience of description, the remeasurement of the distance to the subject by the measurement unit will also be simply referred to as "remeasurement by the measurement unit".

The execution unit 112A executes a remeasurement process in a state where the position of the designated imaging range has been changed within an allowable range in which panoramic imaging can be performed, in a case where the measurement success/failure information acquired by the acquisition unit 110A indicates that the measurement of the measurement unit has not been successful. Here, the remeasurement process refers to a process including a process of causing the measurement unit to remeasure a distance to the subject.

Meanwhile, in the first embodiment, the position of the designated imaging range is changed by operating the change mechanism 11 under the control of the main control unit 62. However, the technique of this disclosure is not limited thereto, the position of the designated imaging range may be changed manually by the user.

In addition, the CPU 100 reads out the dimension derivation program 106A from the secondary storage unit 104, and develops the read-out dimension derivation program 106A to the primary storage unit 102. The CPU 100 executes the dimension derivation program 106A which is developed to the primary storage unit 102.

The distance measurement device 10A has a dimension derivation function, and the dimension derivation function is a function which is realized by executing the dimension derivation program 106A by the CPU 100.

Figure 11:
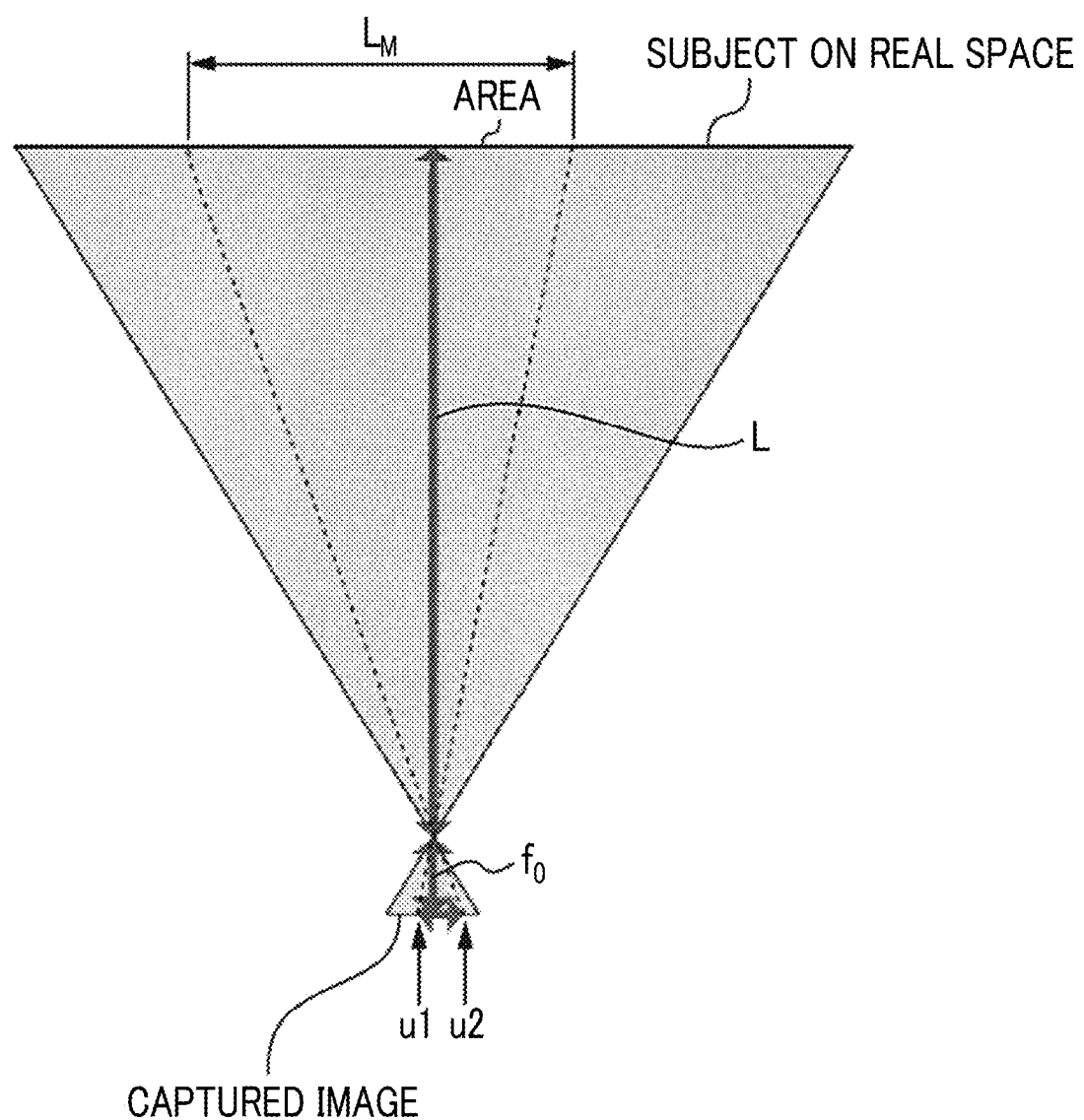
FIG. 11 is a diagram illustrating a method of measuring a dimension (length) of a designated area.

The dimension derivation function refers to a function of deriving a length $L_M$ of an area on the real space which is included in a subject or deriving a size based on the length $L_M$, on the basis of addresses u1 and u2 of a designated pixel and a distance L to the subject measured by the measurement unit, as illustrated in FIG. 11 as an example.

Here, the distance L to the subject refers to an actually measured distance. Meanwhile, hereinafter, for convenience of description, the distance L to the subject will be simply referred to as a "distance L". In addition, hereinafter, for convenience of description, the length $L_M$ of the area on the real space which is included in the subject will be simply referred to as a "length $L_M$". In addition, the "designated pixel" refers to, for example, a pixel in the imaging element 60 which corresponds to two points designated by the user on a captured image.

The length $L_M$ is calculated by, for example, the following Expression (1). In Expression (1), p denotes a pitch between pixels included in the imaging element 60, u1 and u2 denote an address of a pixel which is designated by the user, and $f_0$ denotes a focal length.

$$L_M = L \times \left\{ \frac{P(u1 - u2)}{f_0} \right\} \tag{1}$$

Expression (1) is a numerical expression which is used on the assumption that an object to be subjected to dimension derivation is imaged in a state where the object faces the focusing lens 50 when seen in a front view. Therefore, a projection conversion process is performed by the distance measurement device 10A, for example, in a case where the subject including the object to be subjected to dimension derivation is imaged in a state where the object does not face the focusing lens 50 when seen in a front view. The projection conversion process refers to a process of converting, for example, a captured image obtained by imaging into an image equivalent to a facing image on the basis of a quadrangular image included in the captured image, by using a known technique such as affine transformation. The facing image refers to an image in a state of facing the focusing lens 50 when seen in a front view. The addresses u1 and u2 of the pixel in the imaging element 60 are designated through the facing image, and the length $L_M$ is derived by Expression (1).

Next, operations of portions of the distance measurement device 10A according to the technique of this disclosure will be described.

First, reference will be made to FIGS. 12 to 15 to describe a panoramic imaging measurement process realized by executing the panoramic imaging measurement program 105A by the CPU 100 in a case where the long pressing of the panoramic imaging measurement button 90E is performed.

Meanwhile, the "long pressing" mentioned above refers to an operation of continuously turning on a button such as the panoramic imaging measurement button 90E included in the reception device 90 for a first predetermined time (for example, for three seconds) or longer. Here, the operation of turning on the button is roughly classified into "long pressing" and "normal pressing". The "normal pressing" refers to an operation of turning on the button within a range less than the above-mentioned first predetermined time.

Figure 16:
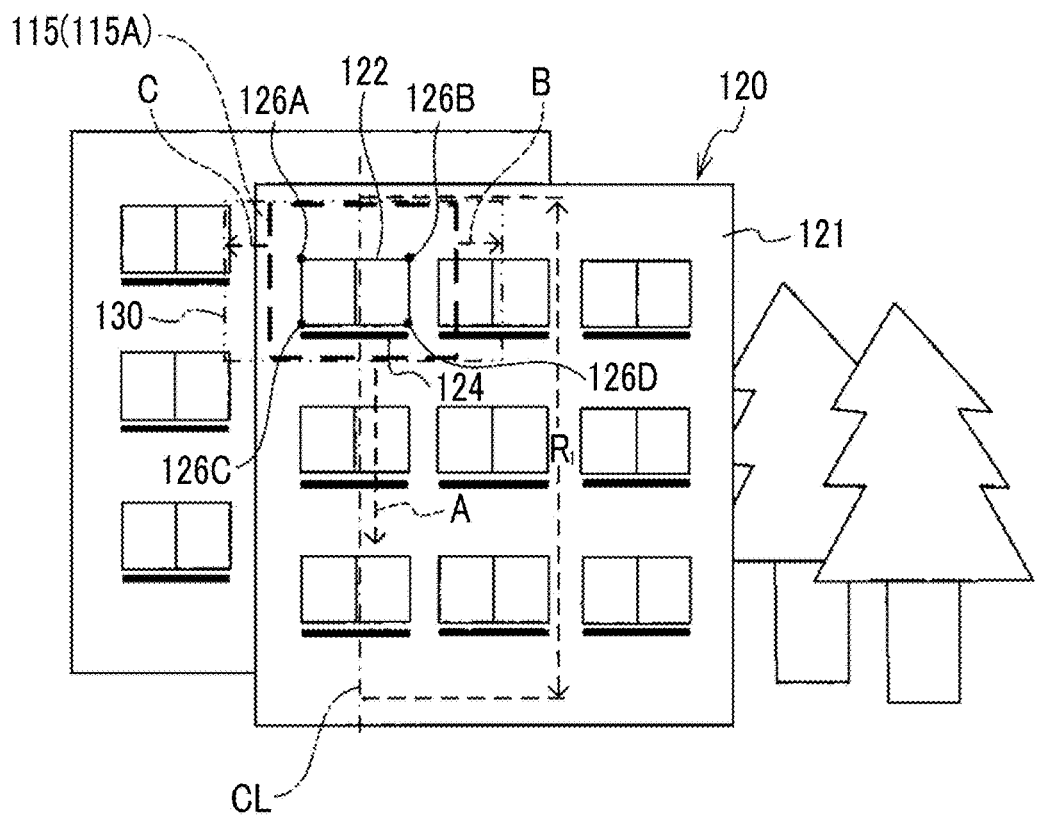
FIG. 16 is a conceptual diagram illustrating examples of an imaging range and an allowable range serving as a first imaging target in panoramic imaging.

In addition, hereinafter, for convenience of description, a description will be given on the assumption that an outer wall surface 121 of an office building 120 is a subject in panoramic imaging and is an object to be irradiated with a laser beam, as illustrated in FIG. 16 as an example.

In addition, the outer wall surface 121 is formed to have a planar shape, and is an example of a planar region according to the technique of this disclosure. In addition, a plurality of quadrangular windows 122 are provided on the outer wall surface 121, as illustrated in FIG. 16 as an example. In addition, a rectangular pattern 124 which is laterally long is drawn on the lower side of each window 122 on the outer wall surface 121, as illustrated in FIG. 16 as an example. However, the invention is not limited thereto, and dirt on the outer wall surface 121, a crack, or the like may be adopted.

Meanwhile, in this embodiment, the "planar shape" not only includes a plane, but also includes a planar shape in a range allowing slight irregularities generated due to a window, a ventilating opening, or the like. The planar shape may be a plane or a planar shape which is recognized as a "planar shape", for example, by visual observation or the existing image analysis technique.

In addition, hereinafter, for convenience of description, a description will be given on the assumption that a distance to the outer wall surface 121 is measured by the distance measurement device 10A by irradiating the outer wall surface 121 with a laser beam.

In addition, hereinafter, for convenience of description, a description will be given on the assumption that a live view image is displayed on the display unit 86.

In addition, hereinafter, for convenience of description, a description will be given on the assumption that panoramic imaging is performed while changing the position of the imaging range 115 in a direction of an arrow A along a center line CL passing through the center of the imaging range 115, which is in the lateral direction when seen in a front view, in the vertical direction when seen in a front view, as illustrated in FIG. 16 as an example.

In addition, hereinafter, for convenience of description, a description will be given on the assumption that the position of the imaging range 115 is changed from above to below when seen in a front view within a range $R_1$ along the center line CL, as illustrated in FIG. 16 as an example.

Meanwhile, the range $R_1$ is decided, for example, at a stage before the execution of the panoramic imaging measurement process is executed. The decision of the range $R_1$ is realized, for example, under a range decision mode which is an operation mode for deciding the range $R_1$. The distance measurement device 10A transitions to a range decision mode in a case where the normal pressing of the panoramic imaging measurement button 90E is performed by the user. In a case where the distance measurement device 10A transitions to the range decision mode, a guide screen (not shown) which is a screen for guiding the procedure of operations until the decision of the range $R_1$ is completed is displayed in a partial region of the display unit 86 until the decision of the range $R_1$ is completed, and the user performs a necessary operation while viewing the guide screen.

Under the range decision mode, the range $R_1$ is decided by setting the position of the first imaging range 115 and the position of the last imaging range 115 in accordance with the user's operation with respect to the rotary switch and an instruction received through the touch panel 88. Here, the first imaging range 115 refers to an imaging range 115 serving as the first imaging target in the panoramic imaging. In addition, the last imaging range 115 refers to an imaging range 115 to be subjected to the last imaging in the panoramic imaging.

In a case where the display of the above-mentioned guide screen is started under the range decision mode, first, the user operates the change mechanism 11 by operating the rotary switch to make the position of the imaging range 115 reach the user's desired position as the position of the first imaging range 115. In a case where a special operation is received by the touch panel 88 in a state where the position of the imaging range 115 is maintained at the user's desired position, the position of the present imaging range 115 is set as the position of the first imaging range 115.

Meanwhile, the special operation refers to, for example, a double-tap operation with respect to a specific region (for example, the center portion of the touch panel 88) of the touch panel 88. In addition, the present imaging range 115 refers to an imaging range 115 which is designated as an imaging target before the imaging and includes a subject capable of being imaged by the imaging device 14 at the present point in time.

Next, the user operates the change mechanism 11 by operating the rotary switch to make the position of the imaging range 115 reach the user's desired position as the position of the last imaging range 115. In a case where the above-mentioned special operation is received by the touch panel 88 in a state where the position of the imaging range 115 is maintained at the user's desired position, the position of the present imaging range 115 is decided as the position of the last imaging range 115, and the display of the above-mentioned guide screen is terminated.

In this manner, in a case where the range $R_1$ is decided, the change mechanism 11 is operated under the control of the main control unit 62, so that the position of the imaging range 115 is returned to the position of the last imaging range 115, and the CPU 100 is set to be in a standby state of long pressing with respect to the panoramic imaging measurement button 90E. In a case where the long pressing of the panoramic imaging measurement button 90E is performed in this state, the panoramic imaging measurement process illustrated in FIGS. 12 to 15 is executed. Meanwhile, in the first embodiment, the imaging range 115 serving as an imaging target for a still image in panoramic imaging within the range $R_1$ by executing the panoramic imaging measurement process is an example of a designated imaging range according to the technique of this disclosure.

Figure 17:
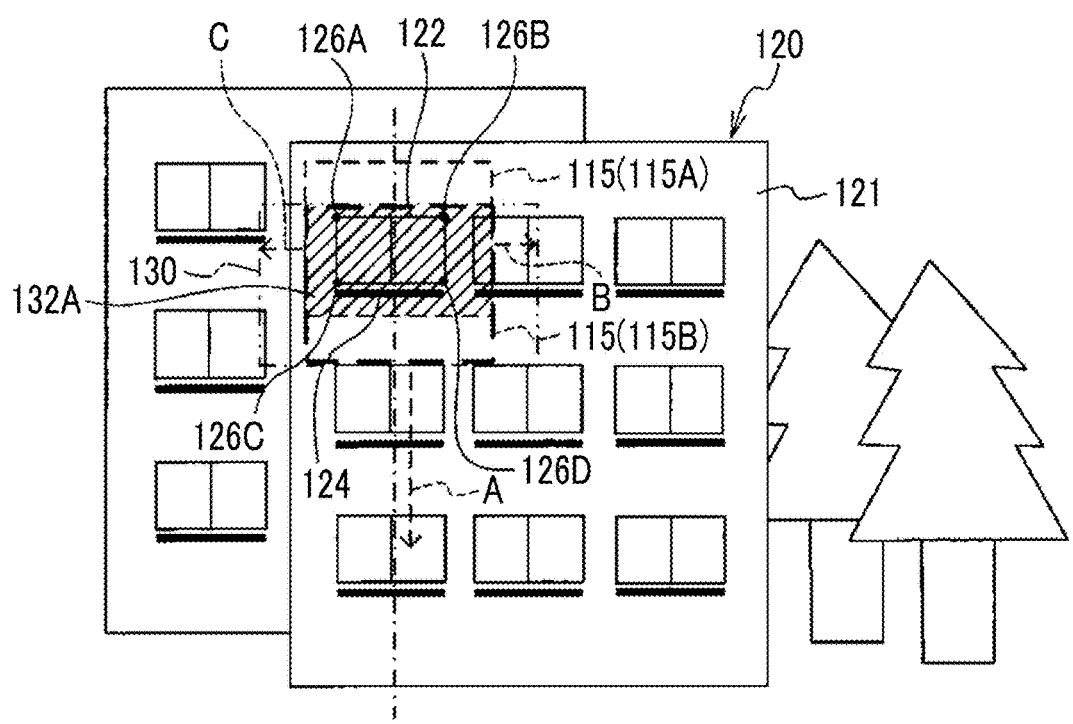
FIG. 17 is a conceptual diagram illustrating examples of an imaging range and an allowable range serving as a second imaging target in panoramic imaging.
Figure 18:
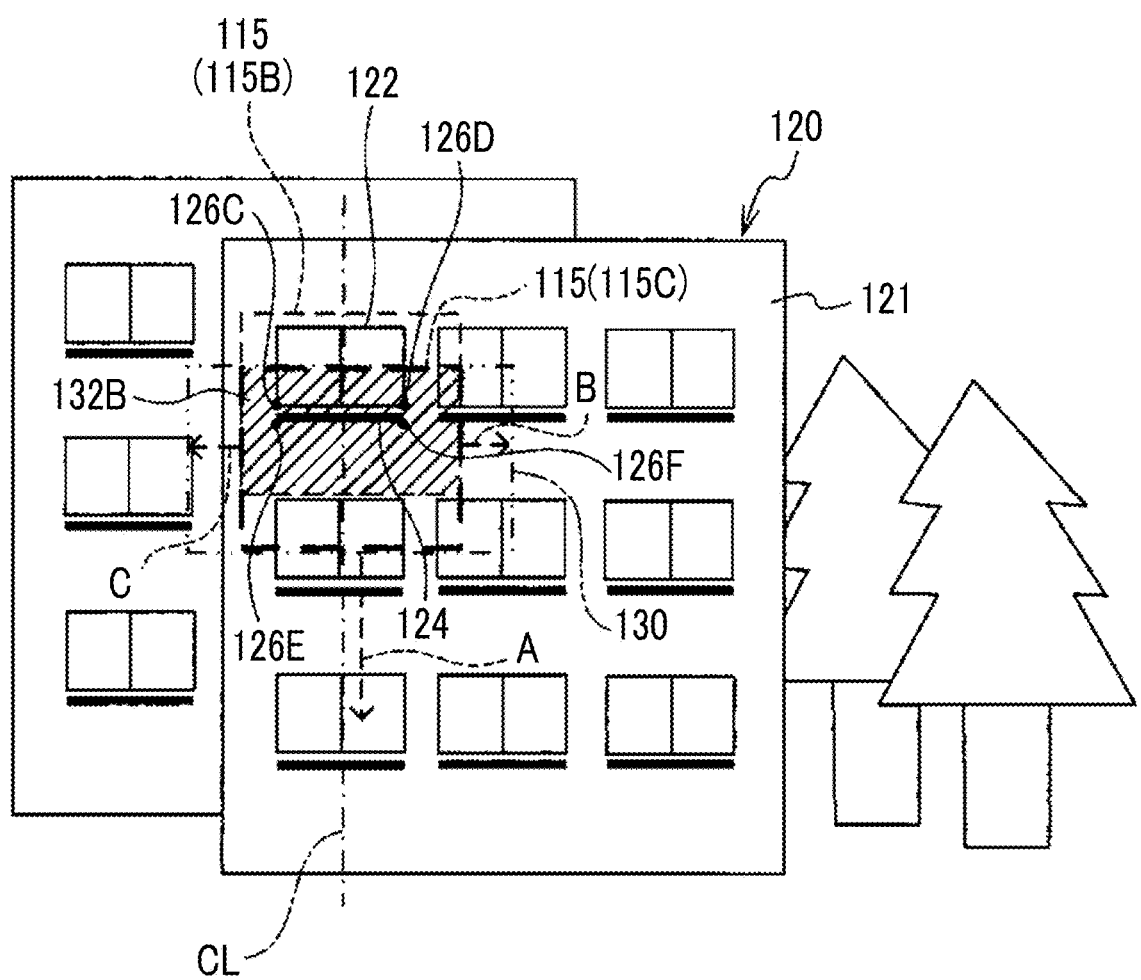
FIG. 18 is a conceptual diagram illustrating examples of an imaging range and an allowable range serving as a third imaging target in panoramic imaging.

In addition, hereinafter, for convenience of description, the first imaging range 115 will be referred to as an "imaging range 115A", as illustrated in FIG. 16 as an example. In addition, hereinafter, for convenience of description, an imaging range 115 serving as a second imaging target in the panoramic imaging will be referred to as an "imaging range 115B", as illustrated in FIG. 17 as an example. In addition, hereinafter, for convenience of description, an imaging range 115 serving as a third imaging target in the panoramic imaging will be referred to as an "imaging range 115C", as illustrated in FIG. 18 as an example.

Further, hereinafter, for convenience of description, a description will be given on the assumption that a captured image obtained by imaging a subject within at least one imaging range 115 among the plurality of imaging ranges 115 includes four pixels capable of specifying four apexes for defining a quadrangle.

Figure 12:
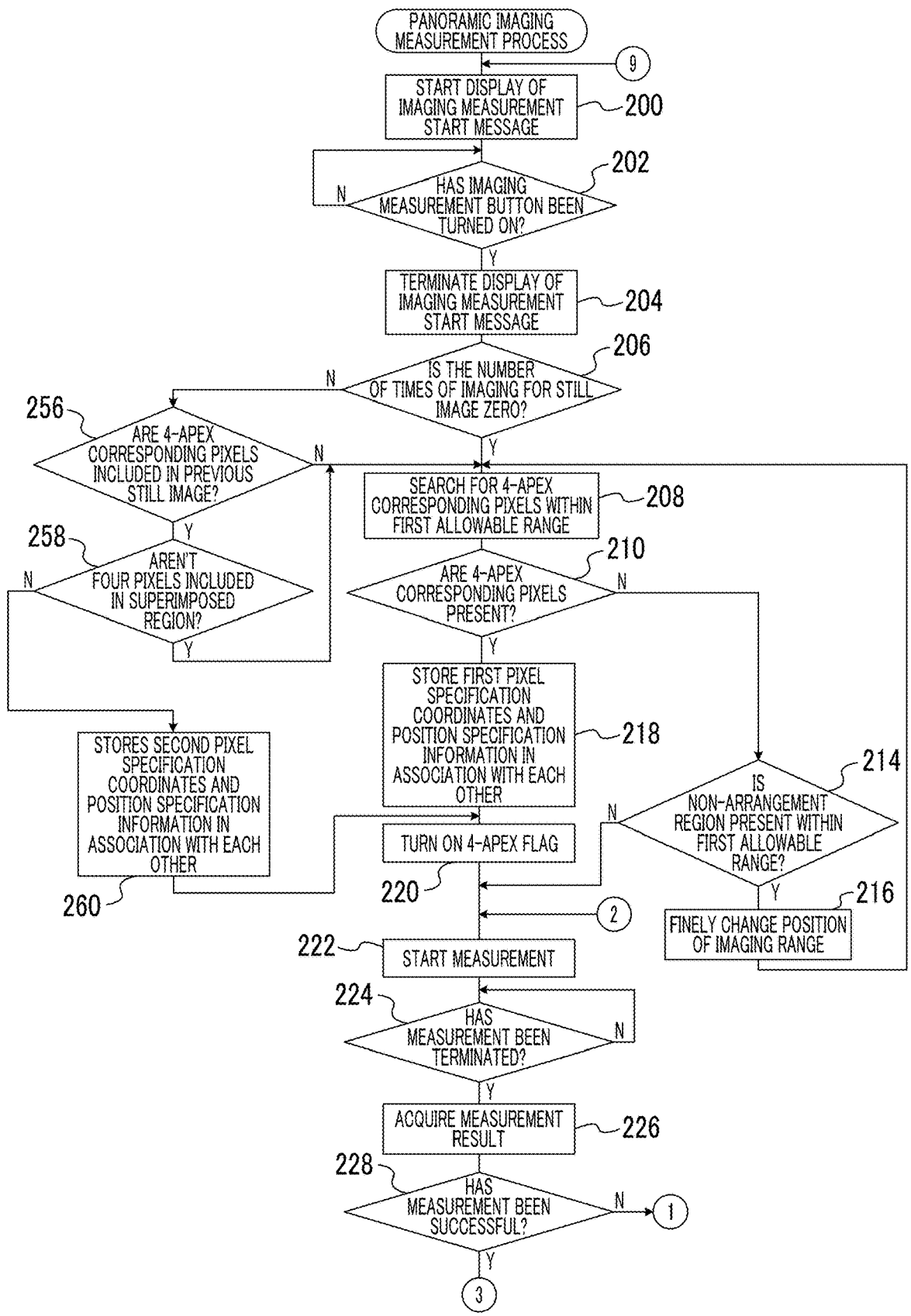
FIG. 12 is a flowchart illustrating an example of a flow of a panoramic imaging measurement process according to the first embodiment.
Figure 19:
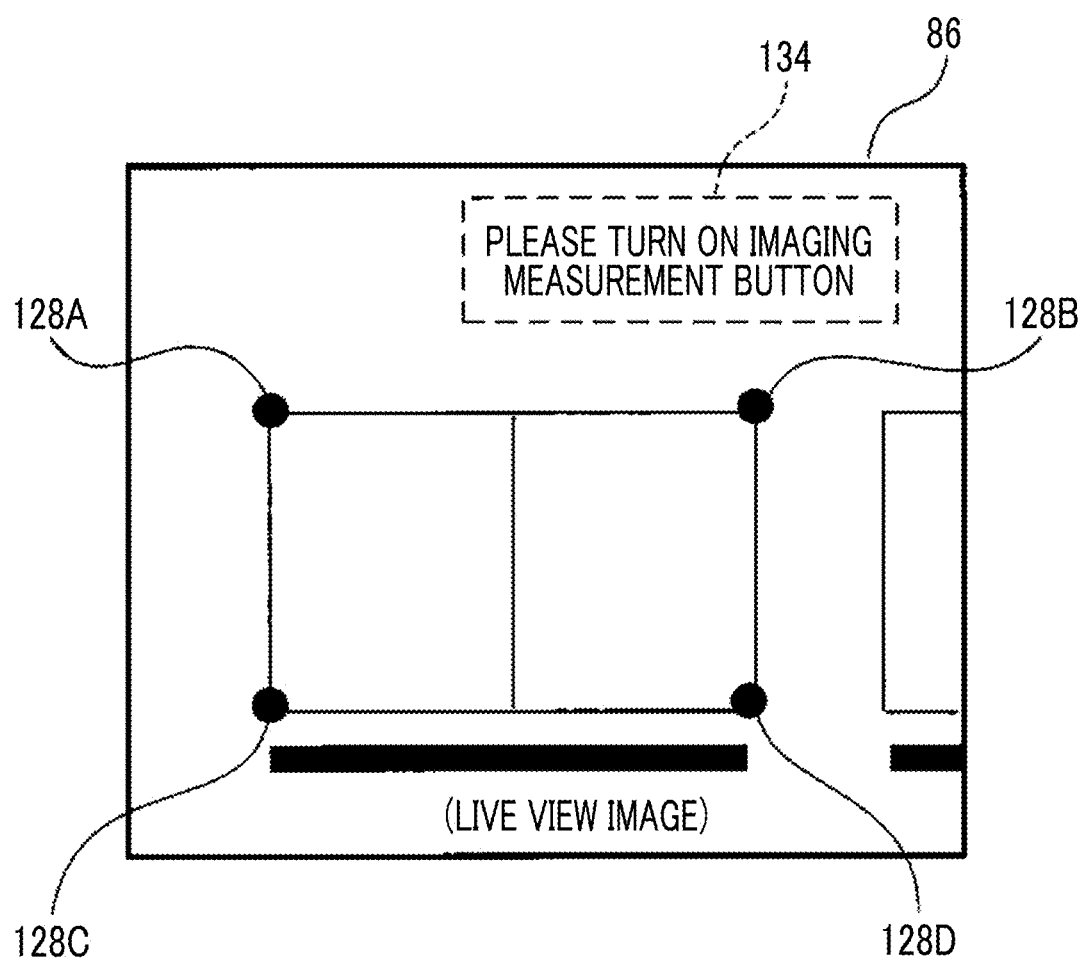
FIG. 19 is a schematic screen view illustrating an example of a screen on which a live view image showing a subject within the imaging range illustrated in FIG. 16 and an imaging measurement start message are displayed.

In the panoramic imaging measurement process illustrated in FIG. 12, first, the acquisition unit 110A starts the display of an imaging measurement start message 134 within a display region of a live view image on the display unit 86, as illustrated in FIG. 19 as an example, in step 200, and then the process proceeds to step 202. Here, a message of "please turn on imaging measurement button" is adopted as an example of the imaging measurement start message 134. However, this is just an example, and a message for prompting the user to give an instruction for starting imaging by the imaging device 14 and measurement by the measurement unit may be used.

In addition, the example illustrated in FIG. 19 shows a case where the imaging measurement start message 134 is visibly displayed, but audible display such as the output of a sound using a sound reproducing device (not shown) or permanent visible display such as the output of printed matter using a printer may be performed instead of the visible display or may be performed in combination.

In step 202, the acquisition unit 110A determines whether or not the imaging measurement button 90A has been turned on. In step 202, in a case where the imaging measurement button 90A has not been turned on, the determination result is negative, and the determination in step 202 is performed again. In step 202, in a case where the imaging measurement button 90A has been turned on, the determination result is positive, and the process proceeds to step 204.

Meanwhile, in the first embodiment, an operation of turning on the imaging measurement button 90A is an example of "instruction for starting the measurement of the measurement unit" according to the technique of this disclosure.

In step 204, the acquisition unit 110A causes the display unit 86 to terminate the display of the imaging measurement start message, and then the process proceeds to step 206.

In step 206, the execution unit 112A determines whether or not the number of times of imaging for a still image after the execution of the panoramic imaging measurement process is started is zero. Whether or not imaging for a still image has been performed after the execution of the panoramic imaging measurement process is started is determined depending on whether or not the processing of step 268 to be described later has been executed.

In step 206, in a case where the number of times of imaging for a still image after the execution of the panoramic imaging measurement process is started is equal to or more than once, the determination result is negative, and the process proceeds to step 256. In step 206, in a case where the number of times of imaging for a still image after the execution of the panoramic imaging measurement process is started is zero, the determination result is positive, and the process proceeds to step 208.

In step 208, the execution unit 112A searches for 4-apex corresponding pixels which are an example of first and second multi-apex pixels according to the technique of this disclosure, with a live view image showing the subject within the imaging range 115 as a target, and then the process proceeds to step 210.

Here, both the first and second multi-apex pixels refer to at least four or more pixels for defining the apexes of a polygon, among the pixels included in the captured image. In particular, the first multi-apex pixels refer to at least four or more pixels for defining apexes of a polygon among pixels included in a first captured image. The first captured image refers to a captured image obtained by imaging a subject within one imaging range 115 of which the imaging is performed first, out of adjacent imaging ranges. The adjacent imaging ranges refer to imaging ranges 115 adjacent to each other in the plurality of imaging ranges 115. Meanwhile, in the first embodiment, for convenience of description, a 4-apex pixel is given as an example of first and second multi-apex pixels. However, the technique of this disclosure is not limited thereto, and replacement with any pixels can be performed as long as the pixels are at least four or more pixels for defining the apexes of a polygon.

The 4-apex corresponding pixels refer to four pixels for defining four apexes of a quadrangle within the captured image. In the example illustrated in FIG. 16, the subject within the imaging range 115 includes real-space four apexes which are four apexes for defining the quadrangle, and the real-space four apexes correspond to 4-apex corresponding pixels. In the example illustrated in FIG. 16, apexes 126A, 126B, 126C, and 126D which are four apexes of an outer frame of the window 122 within the imaging range 115A correspond to the real-space four apexes.

On the other hand, in the example illustrated in FIG. 19, a live view image obtained by imaging the subject within the imaging range 115A is shown. In the example illustrated in FIG. 19, pixels 128A, 128B, 128C, and 128D which are four pixels respectively corresponding to the apexes 126A, 126B, 126C, and 126D, among pixels included in the live view image, correspond to 4-apex corresponding pixels.

In step 210, the execution unit 112A determines whether or not 4-apex corresponding pixels are present in the live view image showing the subject within the imaging range 115.

Meanwhile, in the example illustrated in FIG. 19, the pixels 128A, 128B, 128C, and 128D are present as 4-apex corresponding pixels in the live view image showing the subject within the imaging range 115A.

In the example illustrated in FIG. 17, the apexes 126A, 126B, 126C, and 126D are also included as real-space four apexes in the subject within the imaging range 115B. Therefore, the pixels 128A, 128B, 128C, and 128D are also present as 4-apex corresponding pixels in the live view image showing the subject within the imaging range 115B, similar to the example illustrated in FIG. 19.

Further, in the example illustrated in FIG. 18, apexes 126C, 126D, 126E, and 126F are included as real-space four apexes in the subject within the imaging range 115C. Therefore, in this case, 4-apex corresponding pixels corresponding to the apexes 126C, 126D, 126E, and 126F are present in the live view image showing the subject within the imaging range 115C.

In step 210, in a case where 4-apex corresponding pixels are present in the live view image showing the subject within the imaging range 115, the determination result is positive, and the process proceeds to step 218. In step 210, in a case where 4-apex corresponding pixels are not present in the live view image showing the subject within the imaging range 115, the determination result is negative, and the process proceeds to step 214.

In step 214, the execution unit 112A determines whether or not a non-arrangement region is present within a first allowable range.

Meanwhile, in step 214, the non-arrangement region refers to a region where the imaging range 115 has not been disposed within the first allowable range, in a case where 4-apex corresponding pixels are searched for. In addition, the first allowable range refers to, for example, a range in which the imaging range 115 is enlarged in the lateral direction when seen in a front view with respect to the imaging range 115, and which is allowable as a range in which panoramic imaging can be performed.

In the example illustrated in FIG. 16, a range 130 corresponds to a first allowable range. The range 130 is a range in which the imaging range 115 is enlarged by 1.5 times as an example in the lateral direction when seen in a front view with respect to the imaging range 115A.

In step 214, in a case where a non-arrangement region is present within the first allowable range, the determination result is positive, and the process proceeds to step 216. In step 214, in a case where a non-arrangement region is not present within the first allowable range, the determination result is negative. In a case where the determination result in step 214 is negative, the execution unit 112A stores position specification information in time series in a first storage region (not shown) of the primary storage unit 102, and then the process proceeds to step 222.

Here, the position specification information refers to information for specifying the position of the present imaging range 115. The position specification information is derived, for example, on the basis of rotation directions and the amounts of rotation of the vertical rotation mechanism 15 and the horizontal rotation mechanism 17. The rotation direction and the amount of rotation of the vertical rotation mechanism 15 are specified by, for example, the rotation direction and the amount of rotation of the motor 23, and the rotation direction and the amount of rotation of the horizontal rotation mechanism 17 are specified by, for example, the rotation direction and the amount of rotation of the motor 21.

In step 216, the execution unit 112A operates the change mechanism 11 with the non-arrangement region within the first allowable range as a change destination to finely change the position of the imaging range 115 in a non-arrangement direction, and then the process proceeds to step 208.

Here, the non-arrangement direction refers to a direction in which the non-arrangement region is present. In the examples illustrated in FIGS. 16 to 18, a direction of an arrow B and a direction of an arrow C within the range 130 correspond to the non-arrangement direction.

In addition, the fine change refers to a change with a predetermined amount of change of the position of the imaging range 115 within the first allowable range. The predetermined amount of change refers to, for example, the amount of change which is performed once and is derived so that the non-arrangement region disappears by several tens (for example, 20 times) of changes of the position of the imaging range 115 within the first allowable range. Meanwhile, the "several tens of times" as mentioned herein may be a fixed number of times or may be the number of times which is changeable in accordance with the user's instruction.

In step 218, the execution unit 112A stores first pixel specification coordinates and position specification information in time series in the first storage region of the primary storage unit 102 in a state where the first pixel specification coordinates and the position specification information are associated with each other, and then the process proceeds to step 220. Meanwhile, here, the first pixel specification coordinates refer to coordinates for specifying the positions of the 4-apex corresponding pixels obtained by searching, among pixels within the live view image showing the subject within the present imaging range 115.

In step 220, the execution unit 112A turns on a 4-apex flag indicating that real-space four apexes are included in the present imaging range 115, and then the process proceeds to step 222.

In step 222, the execution unit 112A causes the measurement unit to start the measurement of the distance to the subject by emitting a laser beam toward the subject within the present imaging range 115, and then the process proceeds to step 224.

In step 224, the execution unit 112A determines whether or not the measurement of the measurement unit has been terminated. Here, a case where the measurement of the measurement unit has been terminated is roughly classified into a case of a distance derivation success state and a case of a distance derivation failure state. The distance derivation success state refers to a state where the derivation of the distance to the subject has been successful, that is, a state where reflected light of the laser beam emitted from the emitting unit 22 has been received by the PD 36 of the light receiving unit 24 and the distance to the subject has been derived by the distance measurement control unit 68. The distance derivation failure state refers to a state where the reflected light of the laser beam emitted from the emitting unit 22 has not been received by the PD 36 of the light receiving unit 24 or the distance to the subject has not been derived by the distance measurement control unit 68 due to the amount of light received by the PD 36 which has not reach a predetermined amount of light received. Meanwhile, the predetermined amount of light received refers to the amount of light received which is obtained in advance as the amount of light received which is effective in the derivation of the distance to the subject, for example, by experiment using the real machine, computer simulation, or the like.

In step 224, in a case where the measurement of the measurement unit has not been terminated, the determination result is negative, and the determination in step 224 is performed again. In step 224, in a case where the measurement of the measurement unit has been terminated, the determination result is positive, and the process proceeds to step 226.

In step 226, the acquisition unit 110A acquires a measurement result of the measurement unit from the distance measurement control unit 68, and then the process proceeds to step 228. The measurement result is roughly classified into a measurement result in a case of the distance derivation success state and a measurement result in a case of the distance derivation failure state. The measurement result in a case of the distance derivation success state refers to an actually measured distance. The measurement result in a case of the distance derivation failure state refers to measurement failure information indicating that the measurement of the measurement unit has not been successful. Meanwhile, the measurement result acquired by the acquisition unit 110A by executing the processing of step 226 is an example of measurement success/failure information according to the technique of this disclosure.

In step 228, the execution unit 112A determines whether or not the measurement of the measurement unit has been successful by using the measurement result acquired by the acquisition unit 110A. That is, in step 226, the execution unit 112A determines that the measurement of the measurement unit has been successful, in a case where the measurement result acquired by the acquisition unit 110A is an actually measured distance. In addition, in step 226, the execution unit 112A determines that the measurement of the measurement unit has not been successful, in a case where the measurement result acquired by the acquisition unit 110A is measurement failure information.

Figure 13:
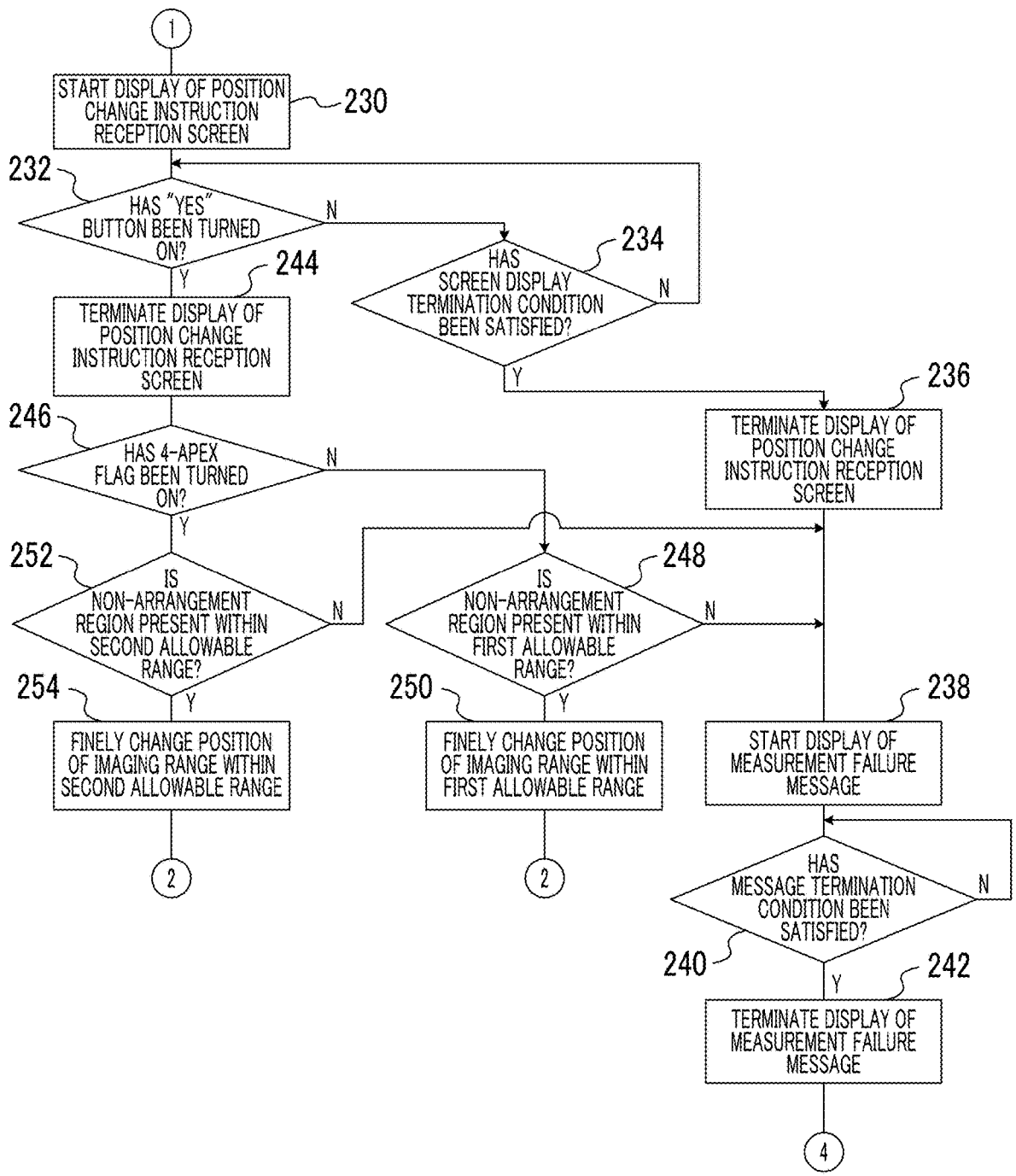
FIG. 13 is the continuation of the flowchart illustrated in FIG. 12.
Figure 14:
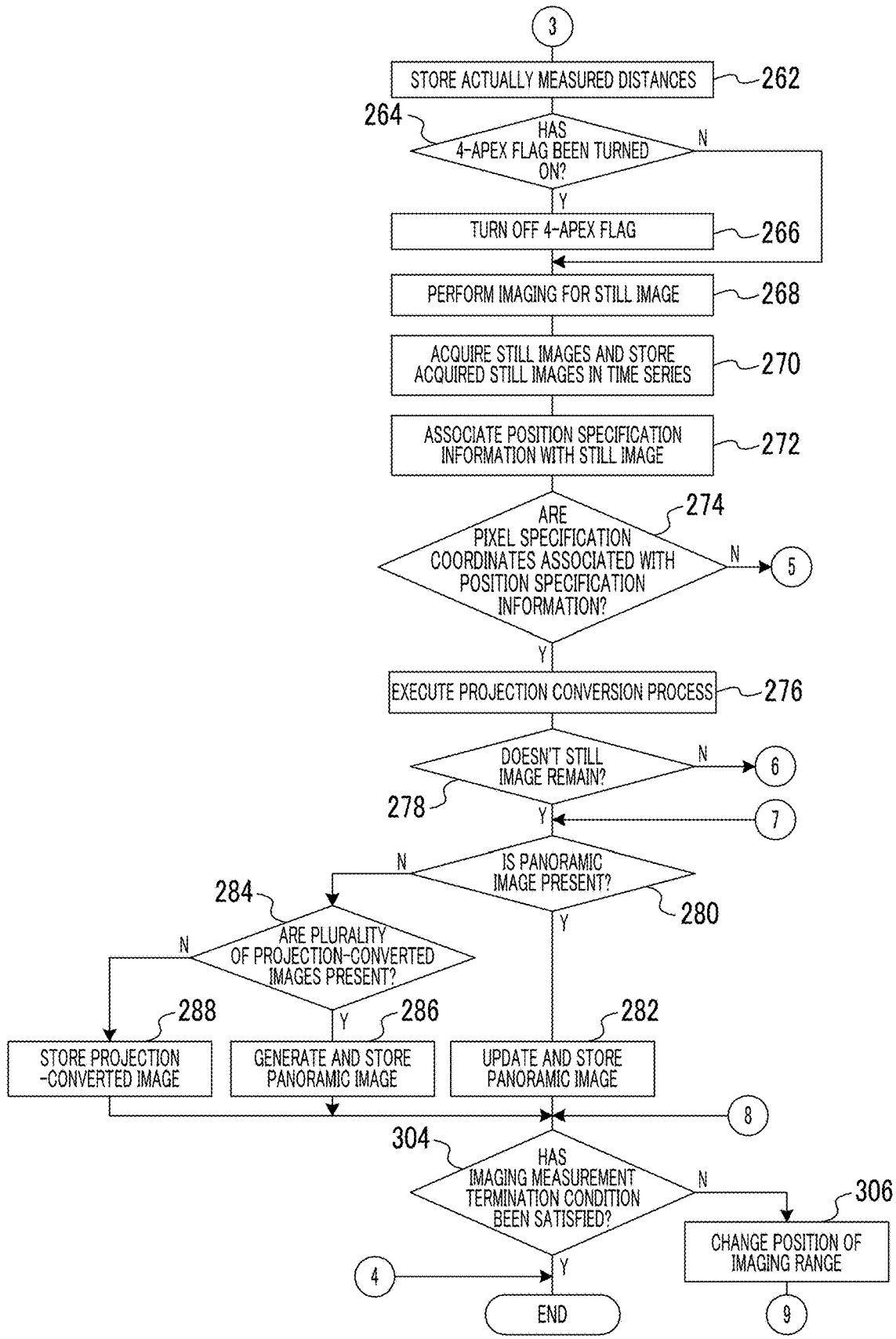
FIG. 14 is the continuation of the flowchart illustrated in FIGS. 12 and 13.

In step 228, in a case where the measurement of the measurement unit has been successful, the determination result is positive, and the process proceeds to step 262 illustrated in FIG. 14. In step 228, in a case where the measurement of the measurement unit has not been successful, the determination result is negative, and the process proceeds to step 230 illustrated in FIG. 13.

Figure 20:
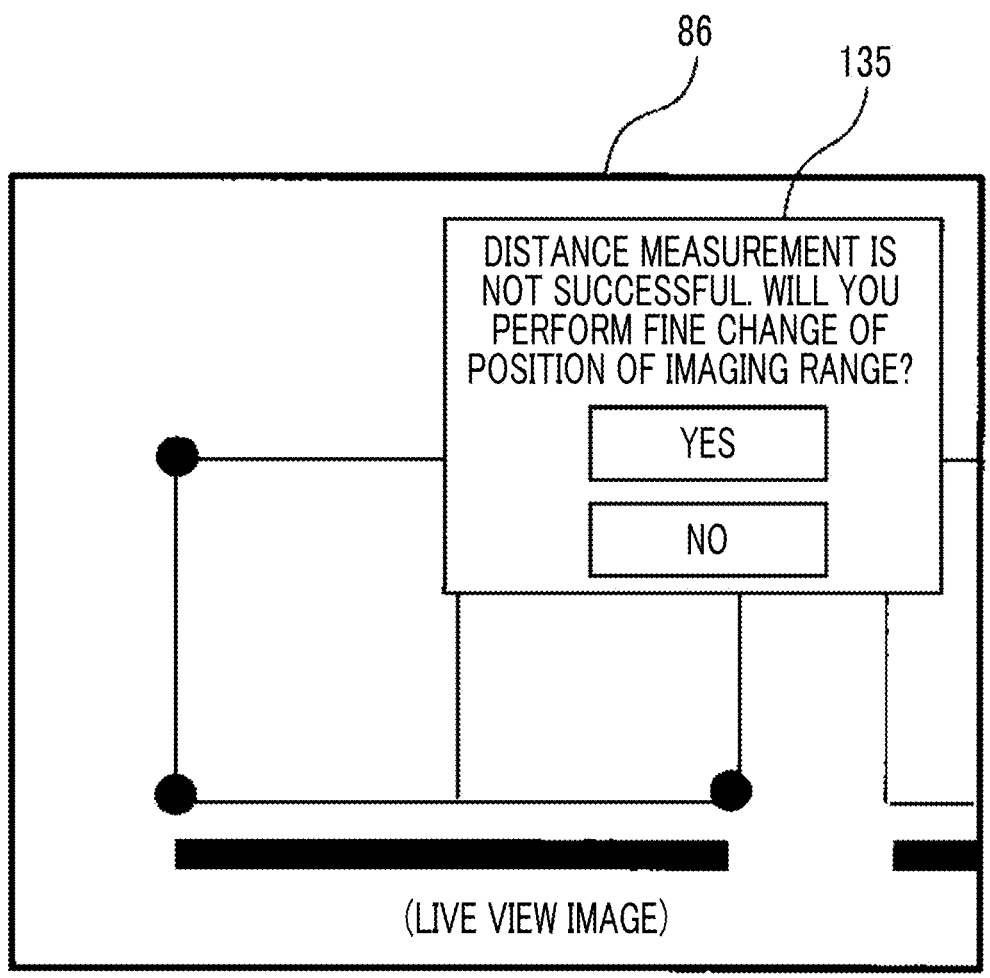
FIG. 20 is a schematic screen view illustrating an example of a screen on which a live view image showing a subject within the imaging range illustrated in FIG. 16 and a position change instruction reception screen are displayed.

In step 230 illustrated in FIG. 13, the execution unit 112A causes the display unit 86 to start the display of a position change instruction reception screen 135 as illustrated in FIG. 20 as an example, and then the process proceeds to step 232.

As illustrated in FIG. 20 as an example, the position change instruction reception screen 135 includes a message of "Distance measurement is not successful. Will you perform fine change of position of imaging range?". In addition, the position change instruction reception screen 135 includes a "YES" button and a "NO" button. The "YES" button is a soft key which is turned on through the touch panel 88 in a case where the user expresses an idea that he or she has understood the fine change of the position of the imaging range 115. The "NO" button is a soft key which is turned on through the touch panel 88 in a case where the user expresses an idea that he or she has not understood the fine change of the position of the imaging range 115.

In step 232, the execution unit 112A determines whether or not the "YES" button within the position change instruction reception screen 135 has been turned on. In step 232, in a case where the "YES" button within the position change instruction reception screen 135 has not been turned on, the determination result is negative, and the process proceeds to step 234. In step 232, in a case where the "NO" button within the position change instruction reception screen 135 has been turned on, the determination result is positive, and the process proceeds to step 244.

In step 234, the execution unit 112A determines whether or not a screen display termination condition which is a condition for terminating the display of the position change instruction reception screen 135 has been satisfied. An example of the screen display termination condition is a condition that the "NO" button within the position change instruction reception screen 135 has been turned on. Another example of the screen display termination condition is a condition that a second predetermined time (for example, one minute) has elapsed from the start of the display of the position change instruction reception screen 135 by executing the processing of step 230.

In step 234, in a case where the screen display termination condition has not been satisfied, the determination result is negative, and the determination in step 232 is performed again. In step 234, in a case where the screen display termination condition has been satisfied, the determination result is positive, and the process proceeds to step 236.

In step 236, the execution unit 112A causes the display unit 86 to terminate the display of the position change instruction reception screen 135, and then the process proceeds to step 238.

Figure 21:
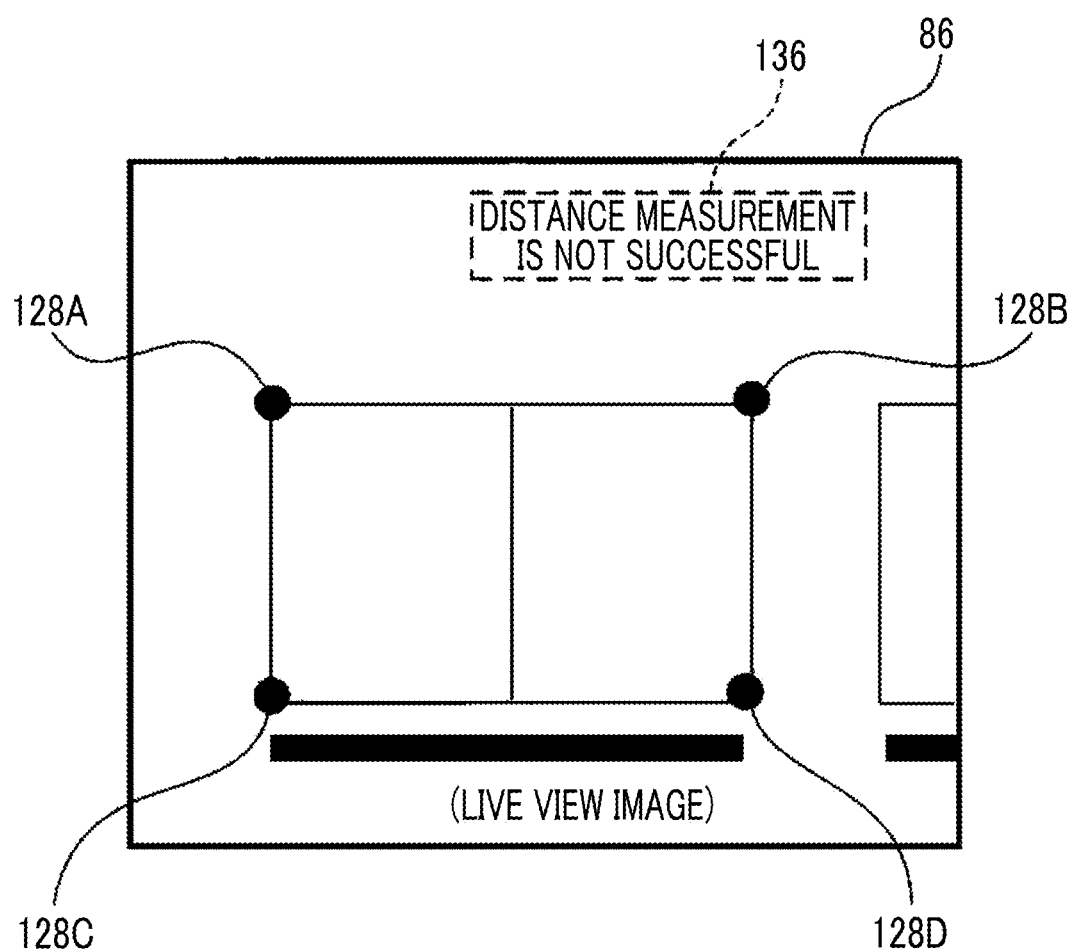
FIG. 21 is a schematic screen view illustrating an example of a screen on which a live view image showing a subject within the imaging range illustrated in FIG. 16 and a measurement failure message are displayed.

In step 238, the execution unit 112A causes the display unit 86 to start the display of a measurement failure message 136 indicating that the measurement of the measurement unit has not been successful, within a display region of the live view image as illustrated in FIG. 21 as an example, and then the process proceeds to step 240. Here, a message of "distance measurement is not successful" is shown as an example of the measurement failure message 136. However, this is just an example, and any message may be adopted as long as the message is a message for making the user recognize that the measurement of the measurement unit has not been successful.

The example illustrated in FIG. 21 shows a case where the measurement failure message 136 visibly displayed, but audible display such as the output of a sound using a sound reproducing device (not shown) or permanent visible display such as the output of printed matter using a printer may be performed instead of the visible display or may be performed in combination.

In step 240, the execution unit 112A determines whether or not a display termination condition for terminating the display of the measurement failure message 136 has been satisfied. An example of the display termination condition is a condition that a double-tap operation has been received by the touch panel 88, a condition that a specific button (for example, the imaging measurement button 90A) included in the reception device 90 has been turned on, or the like.

In step 240, in a case where the display termination condition has not been satisfied, the determination result is negative, and the determination in step 240 is performed again. In step 240, in a case where the display termination condition has been satisfied, the determination result is positive, and the process proceeds to step 242.

In step 242, the execution unit 112A causes the display unit 86 to terminate the display of the measurement failure message 136, and then the panoramic imaging measurement process is terminated.

In step 244, the execution unit 112A causes the display unit 86 to terminate the display of the position change instruction reception screen 135, and then the process proceeds to step 246.

In step 246, the execution unit 112A determines whether or not the 4-apex flag has been turned on. In step 246, in a case where the 4-apex flag has been turned off, the determination result is negative, and the process proceeds to step 248. In step 246, in a case where the 4-apex flag has been turned on, the determination result is positive, and the process proceeds to step 252.

In step 248, the execution unit 112A determines whether or not a non-arrangement region is present within the first allowable range. Meanwhile, in step 248, the non-arrangement region refers to a region where the imaging range 115 has not yet been disposed within the first allowable range in a case where the measurement of the measurement unit is performed.

In step 248, in a case where a non-arrangement region is not present within the first allowable range, the determination result is negative, and the process proceeds to step 238. In step 248, in a case where a non-arrangement region is present within the first allowable range, the determination result is positive, and the process proceeds to step 250.

In step 250, the execution unit 112A finely changes the position of the imaging range 115 by operating the change mechanism 11 with the non-arrangement region within the first allowable range as a change destination to move the position of the imaging range 115 in the above-described non-arrangement direction within the first allowable range. In a case where the execution of the processing of step 250 is terminated, the panoramic imaging measurement process proceeds to step 222 illustrated in FIG. 12. Meanwhile, the processing of step 250 is an example of a first movement process according to the technique of this disclosure.

In step 252, the execution unit 112A determines whether or not a non-arrangement region is present within the second allowable range. Meanwhile, in step 252, the non-arrangement region refers to a region where the imaging range 115 has not yet been disposed within the second allowable range in a case where the measurement of the measurement unit is performed.

In addition, the second allowable range refers to a range including a position on the real space which corresponds to the positions of 4-apex corresponding pixels within the live view image. The "4-apex corresponding pixels within the live view image" as mentioned herein are an example of second multi-apex pixels according to the technique of this disclosure.

In step 252, the second allowable range is a range satisfying at least all of the next first to third conditions. The first condition refers to a condition indicating being a range in which the imaging range 115 is enlarged in the lateral direction when seen in a front view with respect to the imaging range 115. The second condition refers to a condition indicating being a range in which real-space four apexes included in the present imaging range 115 are present. The third condition refers to a condition indicating being a range which is allowed as a range in which panoramic imaging can be performed. In this manner, the second allowable range is required to satisfy the second condition, and is thus a narrower range than the first allowable range.

In step 252, in a case where a non-arrangement region is not present within the second allowable range, the determination result is negative, and the process proceeds to step 238. In step 252, in a case where a non-arrangement region is present within the second allowable range, the determination result is positive, and the process proceeds to step 254.

Meanwhile, the first allowable range and the second allowable range are examples of an allowable range according to the technique of this disclosure. In addition, hereinafter, for convenience of description, the first allowable range and the second allowable range will be simply referred to as an "allowable range" in a case where it is not necessary to give a description by distinguishing between the ranges.

In step 254, the execution unit 112A finely changes the position of the imaging range 115 by operating the change mechanism 11 with a non-arrangement region within the second allowable range as a change destination to move the position of the imaging range 115 in the above-described non-arrangement direction. In a case where the execution of the processing of step 254 is terminated, the panoramic imaging measurement process proceeds to step 222 illustrated in FIG. 12.

In step 256 illustrated in FIG. 12, the execution unit 112A determines whether or not 4-apex corresponding pixels are included in the previous still image which is an example of a first captured image according to the technique of this disclosure. Here, the previous still image refers to a still image showing the subject within an imaging range 115 (an imaging range 115 used in imaging in the processing of step 268 to be described later) which is used in imaging for a still image and is located one imaging range before the present imaging range 115 among the plurality of imaging ranges 115.

In step 256, in a case where 4-apex corresponding pixels are not included in the previous still image, the determination result is negative, and the process proceeds to step 208. In step 256, in a case where 4-apex corresponding pixels are included in the previous still image, the determination result is positive, and the process proceeds to step 258.

In step 258, the execution unit 112A determines whether or not four pixels (an example of corresponding pixels according to the technique of this disclosure) which correspond to the 4-apex corresponding pixels included in the previous still image are present in a superimposed region. Here, the superimposed region refers to a region superimposed on the previous still image in the live view image showing the subject within the present imaging range 115. Meanwhile, the live view image showing the subject within the present imaging range 115 is an example of a second captured image according to the technique of this disclosure. The second captured image according to the technique of this disclosure refers to a captured image obtained by imaging a subject within the other imaging range 115 out of the above-described adjacent imaging ranges.

In the example illustrated in FIG. 17, a range 132A (a hatched region illustrated in FIG. 17) in which the imaging range 115A and the imaging range 115B are superimposed on each other is shown. In the example illustrated in FIG. 17, the apexes 126A, 126B, 126C, and 126D in the subject within the imaging range 115A are included as real-space four apexes within the range 132A. Therefore, in this case, four pixels corresponding to the apexes 126A, 126B, 126C, and 126D are present in the live view image showing the subject within the imaging range 115B.

In the live view image showing the subject within the imaging range 115B, four pixels corresponding to the apexes 126A, 126B, 126C, and 126D illustrated in FIG. 17 are examples of corresponding pixels according to the technique of this disclosure. The corresponding pixels refer to, for example, four pixels corresponding to 4-apex corresponding pixels (an example of first multi-apex pixels according to the technique of this disclosure) which are included in a still image showing the subject within the imaging range 115A, among pixels included in the live view image showing the subject within the imaging range 115B illustrated in FIG. 17.

In the example illustrated in FIG. 17, the imaging range 115A and the imaging range 115B are examples of adjacent imaging ranges according to the technique of this disclosure. In the example illustrated in FIG. 17, the imaging range 115A is an example of "one imaging range of which the imaging is performed first, out of adjacent imaging ranges" according to the technique of this disclosure. The imaging range 115B is an example of "the other imaging range out of adjacent imaging ranges" according to the technique of this disclosure.

Here, as illustrated in FIG. 19 as an example, the pixels 128A, 128B, 128C, and 128D included in the live view image showing the subject within the imaging range 115A are pixels corresponding to the apexes 126A, 126B, 126C, and 126D. The pixels 128A, 128B, 128C, and 128D are also included in a still image obtained by imaging the subject within the imaging range 115A by executing the processing of step 268 to be described later. In this case, the apexes 126A, 126B, 126C, and 126D are included within the range 132A illustrated in FIG. 17. Therefore, four pixels corresponding to the pixels 128A, 128B, 128C, and 128D are also included in the live view image showing the subject within the imaging range 115B as the above-described corresponding pixels.

In the example illustrated in FIG. 18, a range 132B (a hatched region illustrated in FIG. 18) in which the imaging range 115B and the imaging range 115C are superimposed on each other is shown. In the example illustrated in FIG. 18, the apexes 126C, 126D, 126E, and 126F in the subject within the imaging range 115B are included as real-space four apexes in the range 132B. Therefore, in this case, four pixels corresponding to the apexes 126C, 126D, 126E, and 126F are present in the live view image showing the subject within the imaging range 115C.

In the live view image showing the subject within the imaging range 115C, four pixels corresponding to the apexes 126C, 126D, 126E, and 126F illustrated in FIG. 18 are an example of corresponding pixels according to the technique of this disclosure. In addition, in the example illustrated in FIG. 18, the imaging range 115B and the imaging range 115C are an example of adjacent imaging ranges according to the technique of this disclosure. In the example illustrated in FIG. 18, the imaging range 115B is an example of "one imaging range of which the imaging is performed first, out of adjacent imaging ranges" according to the technique of this disclosure. The imaging range 115C is an example of "the other imaging range out of adjacent imaging ranges" according to the technique of this disclosure. Meanwhile, the example illustrated in FIG. 18 is an example given on the assumption that 4-apex corresponding pixels are not present in the still image showing the subject within the imaging range 115A and 4-apex corresponding pixels are present in the still image showing the subject within the imaging range 115B.

Four pixels corresponding to the apexes 126C, 126D, 126E, and 126F are present in the still image showing the subject within the imaging range 115B illustrated in FIG. 18. In this case, the apexes 126C, 126D, 126E, and 126F are included in the range 132B illustrated in FIG. 18. Therefore, the four pixels corresponding to the apexes 126C, 126D, 126E, and 126F are also included as the above-described corresponding pixels in the live view image showing the subject within the imaging range 115C.

In step 258, in a case where four pixels corresponding to 4-apex corresponding pixels included in the previous still image are present in the superimposed region (for example, a case of the example illustrated in FIG. 17 and a case of the example illustrated in FIG. 18), the determination result is negative, and the process proceeds to step 260. In step 258, in a case where four pixels corresponding to 4-apex corresponding pixels included in the previous still image are not present in the superimposed region, the determination result is positive, and the process proceeds to step 208.

In step 260, the execution unit 112A stores second pixel specification coordinates, which are coordinates for specifying the positions of the four pixels included in the superimposed region, and position specification information in time series in the first storage region in a state where the second pixel specification coordinates and the position specification information are associated with each other, and then the process proceeds to step 220. Meanwhile, the four pixels located at positions specified by the second pixel specification coordinates stored in the first storage region by executing step 260 are an example of corresponding pixels according to the technique of this disclosure. In addition, hereinafter, for convenience of description, the first and second pixel specification coordinates will be referred to as "pixel specification coordinates" in a case where it is not necessary to give a description by distinguishing between the first and second pixel specification coordinates.

In step 262 illustrated in FIG. 14, the execution unit 112A stores the actually measured distances, which are measurement results acquired by the acquisition unit 110A, in the second storage region (not shown) of the primary storage unit 102 in time series, and then the process proceeds to step 264.

In step 264, the execution unit 112A determines whether or not the 4-apex flag has been turned on. In step 264, in a case where the 4-apex flag has been turned on, the determination result is positive, and the process proceeds to step 266. In step 264, in a case where the 4-apex flag has been turned off, the determination result is negative, and the process proceeds to step 268.

In step 266, the execution unit 112A turns off the 4-apex flag, and then the process proceeds to step 268.

In step 268, the execution unit 112A causes the imaging device 14 to perform imaging for a still image, and then the process proceeds to step 270.

In step 270, the execution unit 112A acquires still images obtained by performing imaging by executing the processing of step 268 and stores the acquired still images in time series in a third storage region (not shown) of the primary storage unit 102, and then the process proceeds to step 272.

In step 272, the execution unit 112A associates the latest position specification information stored in the first storage region with the latest still image among the still images stored in time series in the third storage region. In addition, the execution unit 112A associates the latest actually measured distance stored in the second storage region with the latest still image among still images stored in the third storage region in time series, and then the process proceeds to step 274.

Meanwhile, hereinafter, for convenience of description, the latest still image among the still images stored in time series in the third storage region will be simply referred to as "the latest still image". In addition, hereinafter, for convenience of description, position specification information associated with a still image will also be referred to as "position specification information corresponding to a still image". Further, hereinafter, for convenience of description, the actually measured distance associated with the still image will also be referred to as an "actually measured distance associated with a still image".

In step 274, the execution unit 112A determines whether or not pixel specification coordinates are associated with position specification information corresponding to the latest still image. In step 274, in a case where pixel specification coordinates are not associated with position specification information corresponding to the latest still image, the determination result is negative, and the process proceeds to step 290 illustrated in FIG. 15. In step 274, in a case where pixel specification coordinates are associated with position specification information corresponding to the latest still image, the determination result is positive, and the process proceeds to step 276. Meanwhile, hereinafter, for convenience of description, the pixel specification coordinates associated with the position specification information corresponding to the still image will be referred to as "pixel specification coordinates corresponding to a still image".

In step 276, the execution unit 112A executes a projection conversion process on the basis of the pixel specification coordinates corresponding to the latest still image, with the latest still image as a processing target, and erases the still image which is set to be a processing target from the third storage region, and then the process proceeds to step 278. In a case where the projection conversion process is executed in step 276, a projection conversion coefficient which is a coefficient for projection conversion is derived on the basis of a quadrangle defined by the pixel specification coordinates. The latest still image is converted into an image equivalent to the above-described facing image by using the derived projection conversion coefficient.

Meanwhile, hereinafter, for convenience of description, the image equivalent to the facing image obtained by executing the projection conversion process on the still image will be referred to as a "projection-converted image". In addition, position specification information corresponding to the still image which is set to be a processing target in step 268 is also associated with the projection-converted image. In addition, hereinafter, for convenience of description, the position specification information associated with the projection-converted image is also referred to as "position specification information corresponding to the projection-converted image". In addition, hereinafter, for convenience of description, the latest projection-converted image obtained by executing the processing of step 276 will be simply referred to as "the latest projection-converted image".

In step 278, the execution unit 112A determines whether or not a still image other than the still image which is set to be a processing target in step 276 remains in the third storage region. In step 278, in a case where a still image other than the still image which is set to be a processing target in step 276 does not remain in the third storage region, the determination result is positive, and the process proceeds to step 280. In step 278, in a case where a still image other than the still image which is set to be a processing target in step 276 remains in the third storage region, the determination result is negative, and the process proceeds to step 292 illustrated in FIG. 15.

In step 280, the execution unit 112A determines whether or not a panoramic image is stored in a fourth storage region (not shown) of the primary storage unit 102. Meanwhile, in a case where the processing of step 286 to be described later is executed and the processing of step 282 is executed, a panoramic image is stored in the fourth storage region.

In step 280, in a case where a panoramic image is stored in the fourth storage region, the determination result is positive, and the process proceeds to step 282. In step 280, in a case where a panoramic image is not stored in the fourth storage region, the determination result is negative, and the process proceeds to step 284.

In step 284, the execution unit 112A determines whether or not a plurality of projection-converted images are present. Here, first to fourth patterns are considered as a pattern including the plurality of projection-converted images.

The first pattern refers to a pattern in which a projection-converted image has already been stored in a fifth storage region (not shown) of the primary storage unit 102 by executing the processing of step 288 to be described later and the latest projection-converted image is present. The second pattern refers to a pattern in which a projection-converted image is stored in the fifth storage region, the latest projection-converted image is present, and a projection-converted image is obtained by executing the processing of step 300 to be described later. The third pattern refers to a pattern in which a projection-converted image is not stored in the fifth storage region, the latest projection-converted image is present, and a projection-converted image is obtained by executing the processing of step 300 to be described later. The fourth pattern refers to a pattern in which the latest projection-converted image is not present, and a plurality of projection-converted images are obtained by executing the processing of step 300 to be described later. Meanwhile, in a case where the processing of step 288 is executed, a projection-converted image obtained by executing the processing of step 276 is stored in the fifth storage region.

In step 284, in a case where a projection-converted image is stored in the fifth storage region, the determination result is positive, and the process proceeds to step 286. In step 284, in a case where a projection-converted image is not stored in the fifth storage region, the determination result is negative, and the process proceeds to step 288.

In step 288, the execution unit 112A stores the latest projection-converted image obtained by executing the processing of step 276 in the fifth storage region, and then the process proceeds to step 304.

In step 286, the execution unit 112A generates a panoramic image by joining the projection-converted image, obtained by executing at least one processing of step 276 and step 300, and the projection-converted image stored in the fifth storage region together. The execution unit 112A stores the generated panoramic image in the fourth storage region, and then the process proceeds to step 304. Meanwhile, the processing of step 286 is an example of a generation process according to the technique of this disclosure.

In step 282, the execution unit 112A acquires the panoramic image stored in the fourth storage region. Subsequently, the execution unit 112A updates the panoramic image by joining the projection-converted image obtained by executing at least one processing of step 276 and step 300 to the acquired panoramic image. The execution unit 112A stores the updated panoramic image in the fourth storage region (overwrite save), and then the process proceeds to step 304. Meanwhile, the processing of step 282 is an example of a generation process according to the technique of this disclosure.

Figure 15:
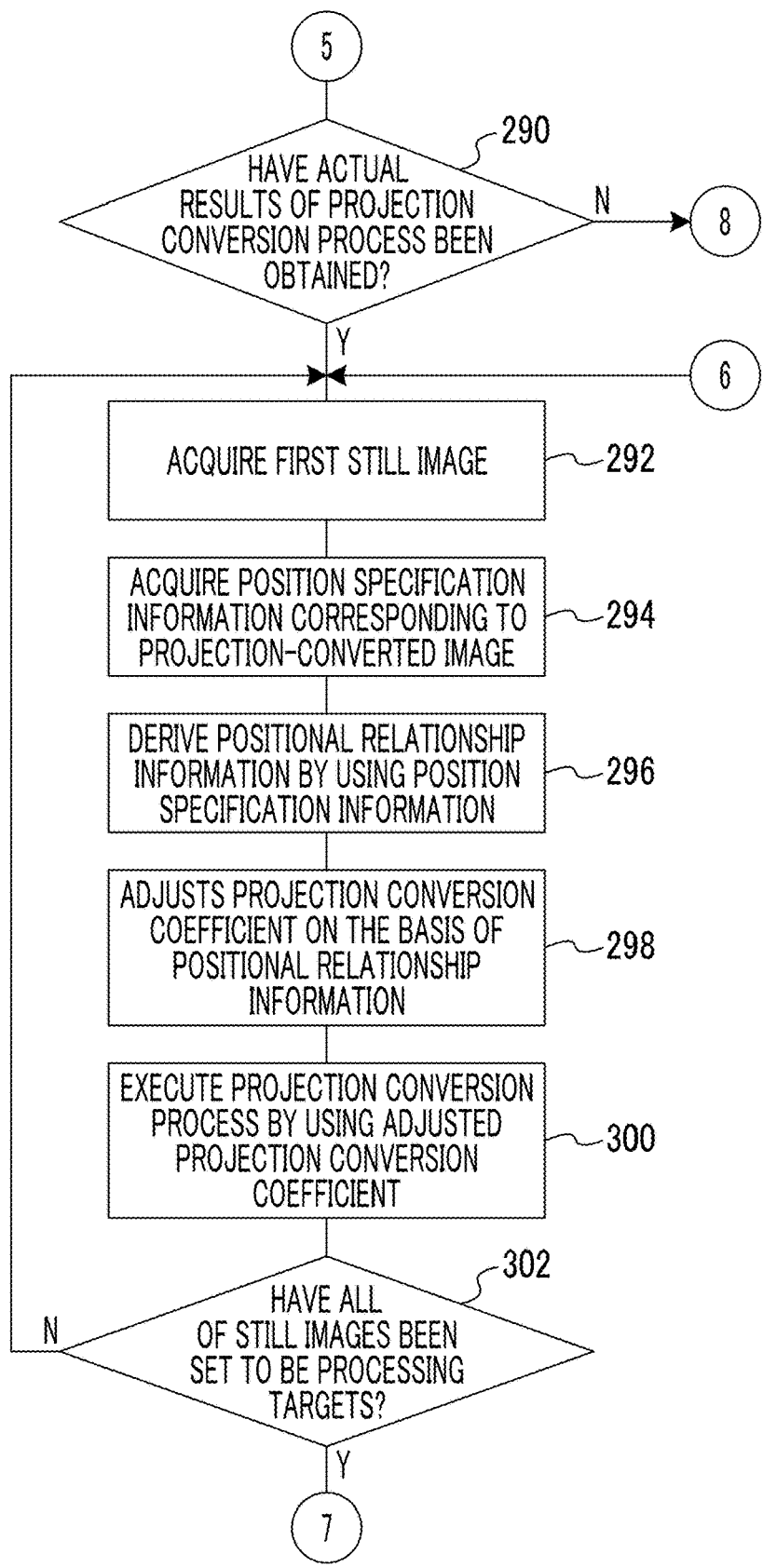
FIG. 15 is the continuation of the flowchart illustrated in FIG. 14.

In step 290 illustrated in FIG. 15, the execution unit 112A determines whether or not actual results of the projection conversion process have been obtained. The actual results of the projection conversion process refer to a fact that the projection conversion process has been executed on a still image from the start of the execution of the panoramic imaging measurement process to the present point in time. The presence or absence of actual results of the projection conversion process is determined whether or not the processing of step 276 illustrated in FIG. 14 has been executed.

In step 290, in a case where actual results of the projection conversion process are not present, the determination result is negative, and the process proceeds to step 304 illustrated in FIG. 14. In step 290, in a case where actual results of the projection conversion process are present, the determination result is positive, and the process proceeds to step 292.

In step 292, the execution unit 112A acquires the first still image, and then the process proceeds to step 294. Here, the first still image refers to a still image which is first stored among still images stored in the third storage region, that is, the oldest still image. Meanwhile, hereinafter, for convenience of description, the first still image obtained by executing the processing of step 292 will be simply referred to as a "first still image".

In step 294, the execution unit 112A acquires position specification information corresponding to the latest projection-converted image, and then the process proceeds to step 296.

In step 296, the execution unit 112A derives positional relationship information by using two pieces of position specification information, and then the process proceeds to step 298.

Here, the positional relationship information is information indicating a positional relationship between the imaging range 115 used in imaging performed to obtain the first still image and the imaging range 115 used in imaging performed to obtain a still image corresponding to the latest projection-converted image. The positional relationship information is information including a distance between the imaging ranges and an imaging range direction. The distance between the imaging ranges refers to a distance between the imaging range 115 used in imaging performed to obtain the first still image and the imaging range 115 used in imaging performed to obtain a still image corresponding to the latest projection-converted image. The imaging range direction refers to a direction of the imaging range 115 used in imaging performed to obtain the first still image with respect to the imaging range 115 used in imaging performed to obtain a still image corresponding to the latest projection-converted image.

In step 298, the execution unit 112A adjusts a projection conversion coefficient of the latest projection-converted image to a coefficient capable of converting the first still image into the projection-converted image on the basis of the positional relationship information derived in the processing of step 296, and then the process proceeds to step 300.

In step 300, the execution unit 112A executes the projection conversion process by using the projection conversion coefficient adjusted in the processing of step 298 with the first still image as a processing target, and erases the still image which is set to be a processing target from the third storage region, and then the process proceeds to step 302.

In step 302, the execution unit 112A determines whether or not all of the still images stored in the third storage region have been set to be processing targets of the projection conversion process of step 300. In step 302, in a case where all of the still images stored in the third storage region have not been set to be processing targets of the projection conversion process of step 300, the determination result is negative, and the process proceeds to step 292. In step 302, in a case where all of the still images stored in the third storage region have been set to be processing targets of the projection conversion process of step 300, the determination result is positive, and the process proceeds to step 280 illustrated in FIG. 14.

In step 304 illustrated in FIG. 14, the execution unit 112A determines whether or not an imaging measurement termination condition which is a condition for terminating the panoramic imaging measurement process has been satisfied. An example of the imaging measurement termination condition is a condition that a panoramic image including a projection-converted image obtained on the basis of a still image, obtained by performing imaging on a subject within the last imaging range 115, is generated and stored in the fourth storage region. Another example of the imaging measurement termination condition is a condition that an instruction for terminating the panoramic imaging measurement process is received by the touch panel 88 or the reception device 90.

In step 304, in a case where the imaging measurement termination condition has not been satisfied, the determination result is negative, and the process proceeds to step 306.

In step 306, the execution unit 112A moves the position of the imaging range 115 to a position where imaging for a still image is expected to be performed next as imaging for a still image required in panoramic imaging by operating the change mechanism 11, to thereby change the position of the imaging range 115. In a case where the execution of the processing of step 306 is terminated, the panoramic imaging measurement process proceeds to step 200 illustrated in FIG. 12.

Meanwhile, the position where imaging for a still image is expected to be performed next refers to the position of the imaging range 115B, for example, in a case where the present imaging range 115 is the imaging range 115A, and refers to the position of the imaging range 115C in a case where the present imaging range 115 is the imaging range 115B (see FIGS. 17 and 18). In addition, the processing of step 306 is an example of a second movement process according to the technique of this disclosure.

In step 304, in a case where the imaging measurement termination condition has been satisfied, the determination result is positive, and the panoramic imaging measurement process is terminated.

Next, reference will be made to FIG. 22 to describe a dimension derivation process realized by operating a dimension derivation function by executing the dimension derivation program 106A by the CPU 100 in a case where the dimension derivation button 90F is turned on in a state where a panoramic image is stored in the fourth storage region.

Meanwhile, hereinafter, for convenience of description, a description will be given on the assumption that an actually measured distance corresponding to each of all of the still images required in the generation of the panoramic image is stored in the second storage region. In addition, hereinafter, for convenience of description, a description will be given on the assumption that the dimension derivation button 90F is turned on without shutting down the distance measurement device 10A after the panoramic imaging measurement process is executed.

In addition, hereinafter, for convenience of description, "$f_0$" in Expression (1) denotes a focal length which is used in each of imaging operations for a still image which are required in panoramic imaging and performed a plurality of times, and a description will be given, for example, on the assumption that the focal length is stored in the primary storage unit 102 for each corresponding still image.

Figure 22:
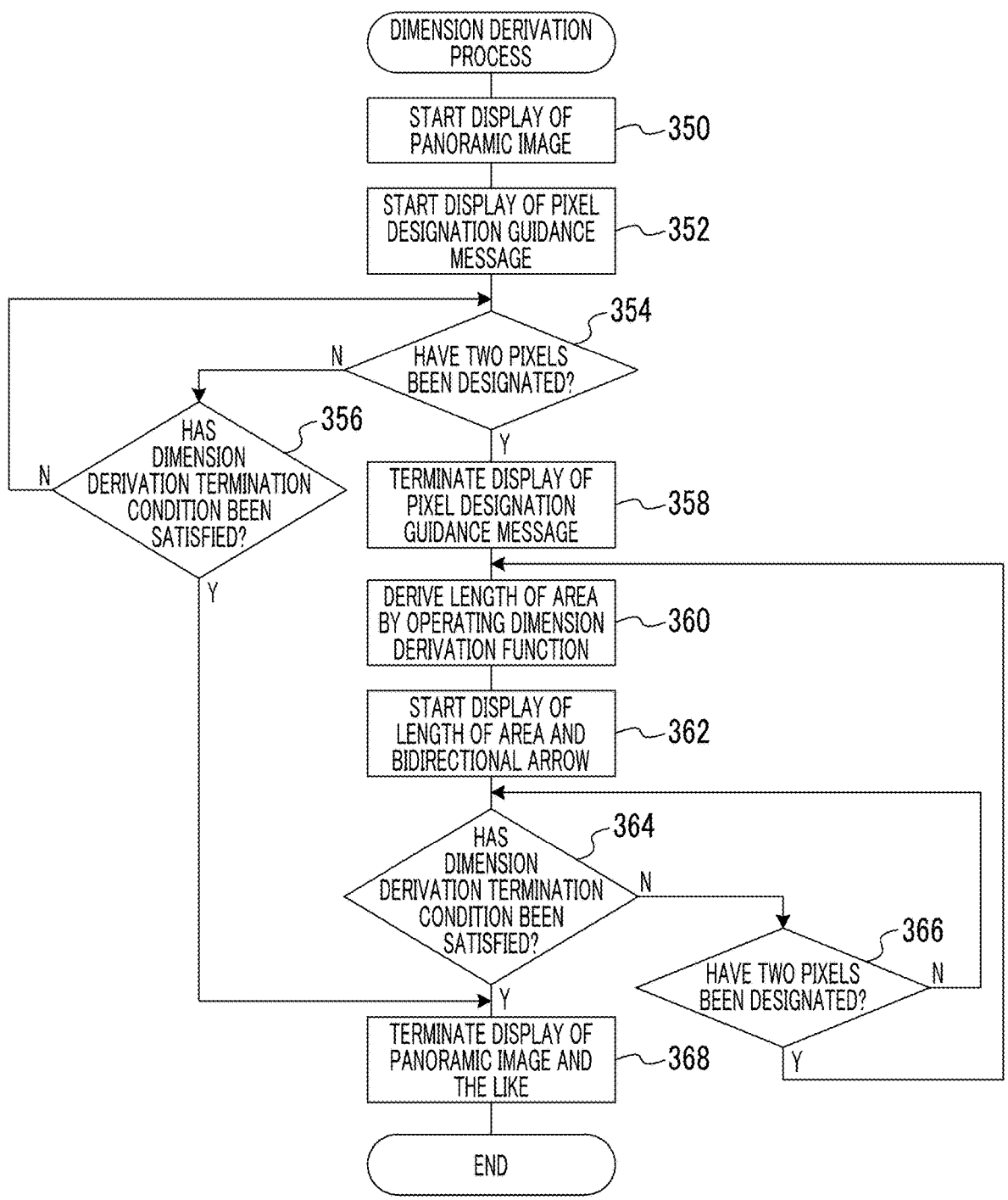
FIG. 22 is a flowchart illustrating an example of a flow of a dimension derivation process according to the first and second embodiments.
Figure 23:
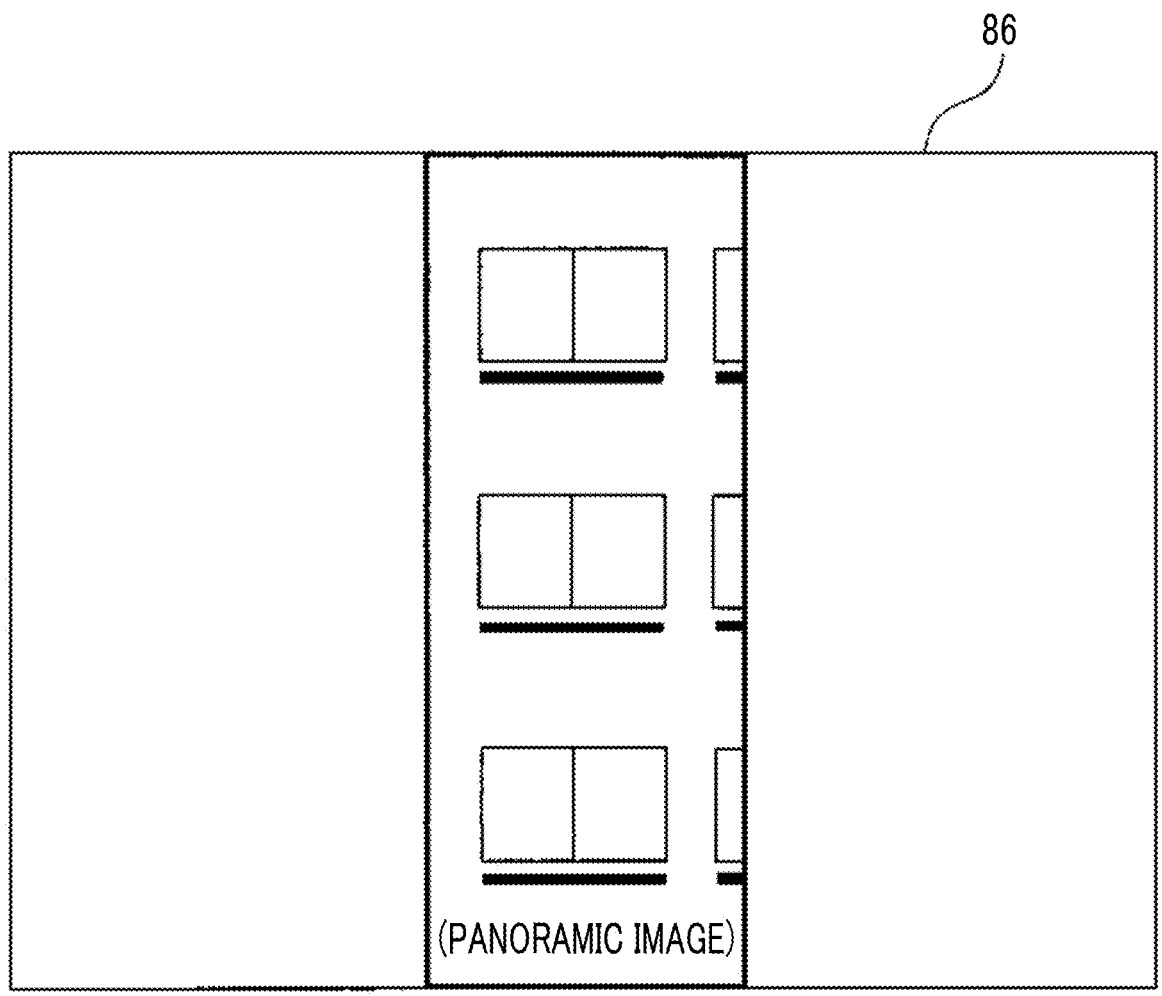
FIG. 23 is a schematic screen view illustrating an example of a screen including a panoramic image displayed on a display unit by executing the dimension derivation process according to the first and second embodiments.

In the dimension derivation process illustrated in FIG. 22, first, in step 350, the execution unit 112A acquires a panoramic image from the fourth storage region. The execution unit 112A causes the display unit 86 to start the display of the panoramic image, as illustrated in FIG. 23 as an example, and then the process proceeds to step 352.

Figure 24:
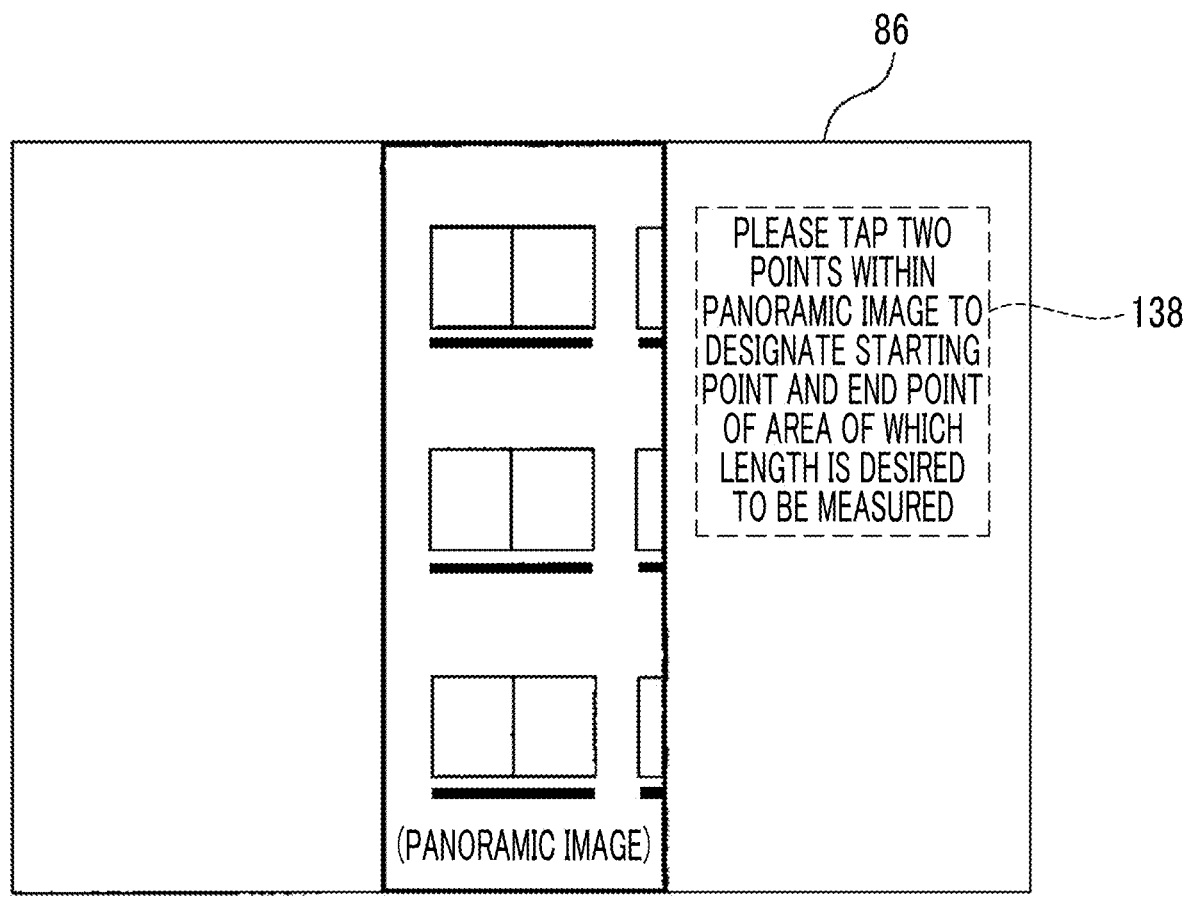
FIG. 24 is a schematic screen view illustrating an example of a screen including a panoramic image and a pixel designation guidance message which are displayed on the display unit by executing the dimension derivation process according to the first and second embodiments.

In step 352, the execution unit 112A causes the display unit 86 to display a pixel designation guidance message 138 within a horizontal display region of the panoramic image, as illustrated in FIG. 24 as an example, and then the process proceeds to step 354.

In the example illustrated in FIG. 24, a message of "please tap two points within panoramic image to designate starting point and end point of area of which length is desired to be measured" is shown as the pixel designation guidance message 138, but this is just an example. The pixel designation guidance message 138 is not limited to the example illustrated in FIG. 24, and may be any message as long as the message is a message for prompting the user to designate two pixels for specifying a starting point and an end point of an area of which the length is desired to be measured.

Figure 25:
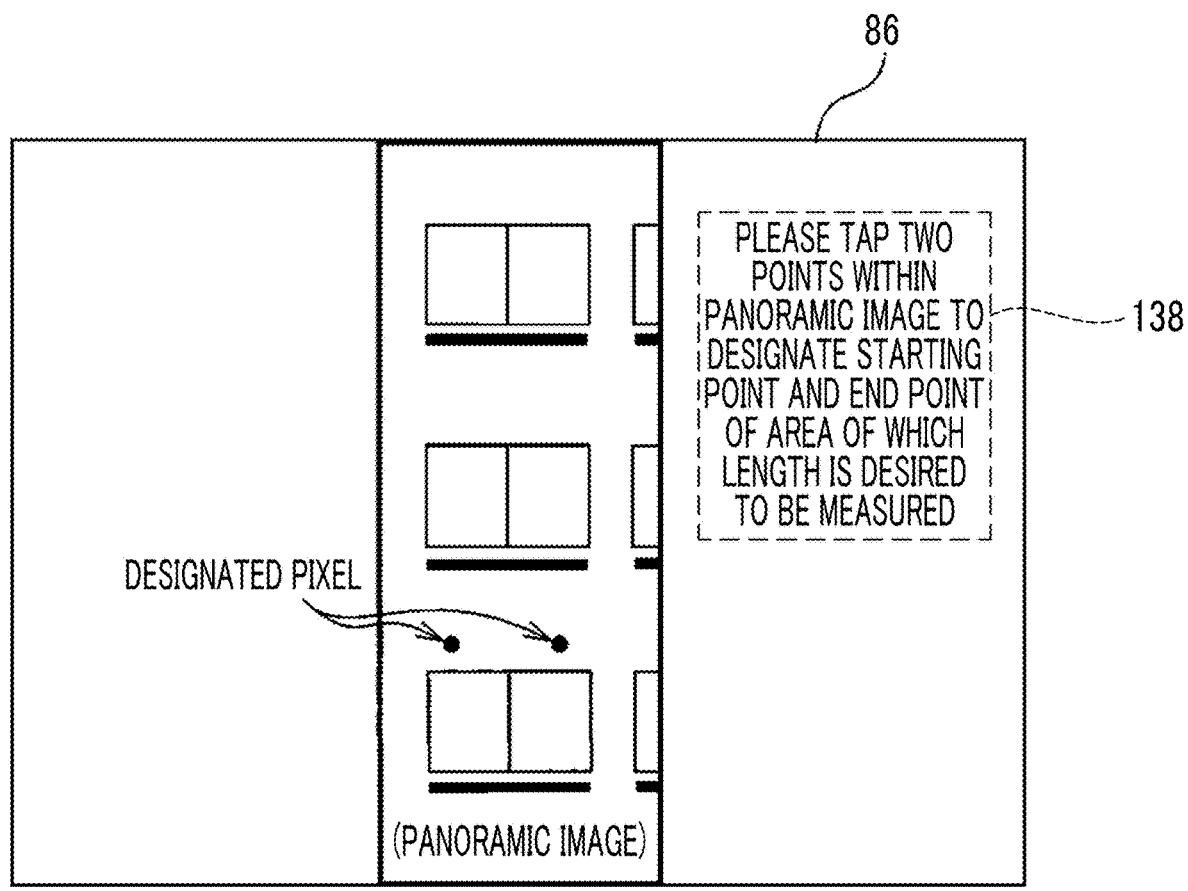
FIG. 25 is a schematic screen view illustrating an example of a screen including a panoramic image displayed on the display unit by executing the dimension derivation process according to the first and second embodiments, and two pixels designated in accordance with a pixel designation guidance message and a pixel designation guidance message.

In step 354, the execution unit 112A determines whether or not two pixels have been designated by the user through the touch panel 88. In step 354, in a case where two pixels have not been designated by the user through the touch panel 88, the determination result is negative, and the process proceeds to step 356. In step 354, in a case where two pixels have been designated by the user through the touch panel 88 as illustrated in FIG. 25 as an example, the determination result is positive, and the process proceeds to step 358.

In step 356, the execution unit 112A determines whether or not a dimension derivation termination condition which is a condition for terminating the dimension derivation process has been satisfied. An example of the dimension derivation termination condition is a condition that an instruction for terminating the dimension derivation process is received by the touch panel 88 or the reception device 90. Another example of the dimension derivation termination condition is a condition that a predetermined time (for example, 30 minutes) has elapsed after the execution of the dimension derivation process is started.

In step 356, in a case where the dimension derivation termination condition has not been satisfied, the determination result is negative, and the process proceeds to step 354. In step 356, in a case where the dimension derivation termination condition has been satisfied, the determination result is positive, and the process proceeds to step 368.

In step 358, the execution unit 112A causes the display unit 86 to terminate the display of the pixel designation guidance message 138, and then the process proceeds to step 360.

In step 360, the execution unit 112A operates the dimension derivation function to derive the length of an area on the real space which corresponds to an interval between the two pixels designated by the user through the touch panel 88, and then the process proceeds to step 362.

In step 360, the length of the area on the real space which corresponds to an interval between the two pixels designated by the user through the touch panel 88 is derived by Expression (1). Meanwhile, in this case, u1 and u2 in Expression (1) denote addresses of the two pixels designated by the user through the touch panel 88. In addition, L in Expression (1) denotes an actually measured distance corresponding to a still image which is a basis of a projection-converted image including two designated pixels, among actually measured distances stored in the second storage region by executing the processing of step 262 included in the panoramic imaging measurement process. In addition, "$f_0$" in Expression (1) is a focal length which is used in imaging for obtaining a still image which is a basis of the projection-converted image including two designated pixels, among focal lengths stored in the primary storage unit 102 for each still image.

Figure 26:
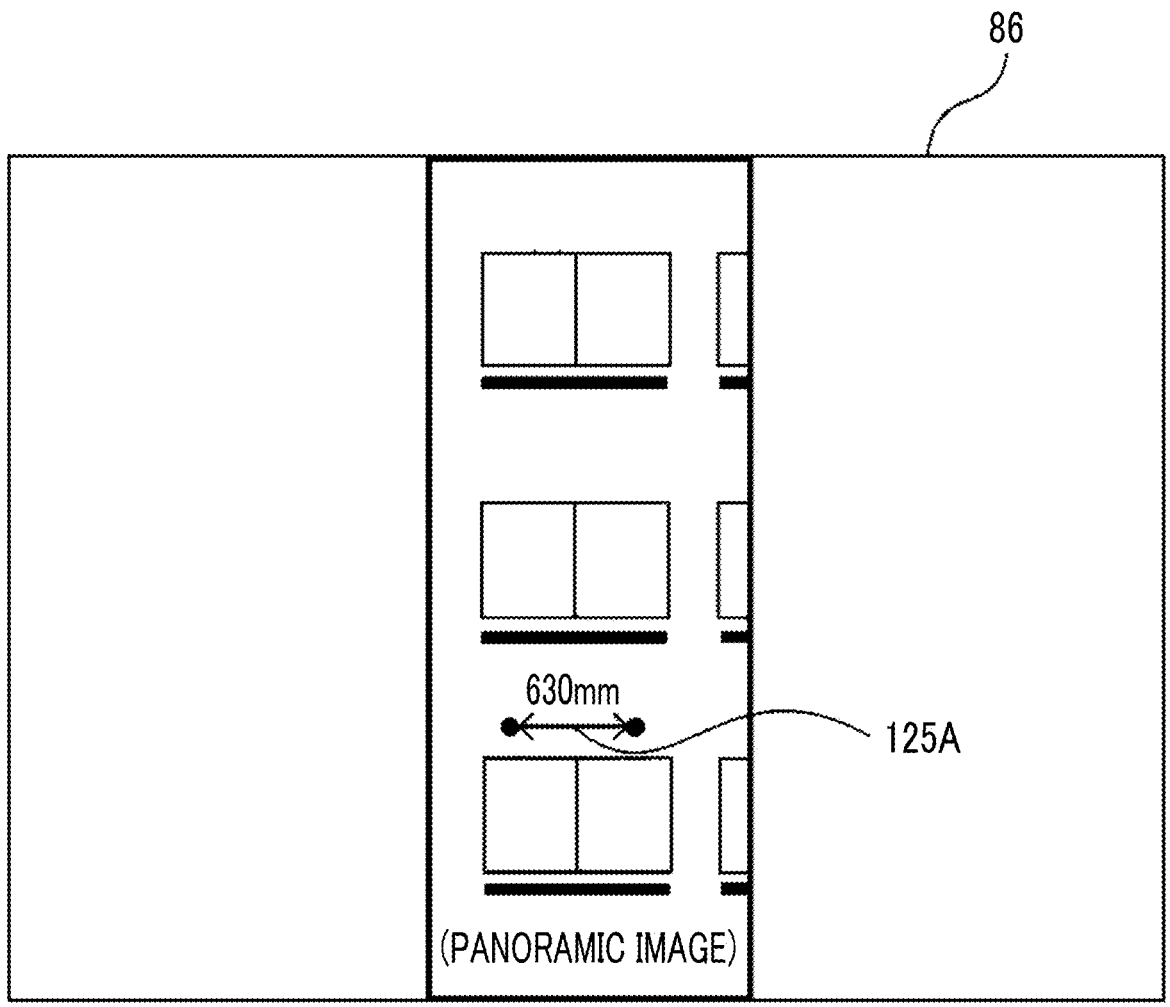
FIG. 26 is a schematic screen view illustrating an example of a screen in a state where the length of an area on the real space, which is derived by executing the dimension derivation process according to the first and second embodiments, is superimposed on a panoramic image.

In step 362, the execution unit 112A causes the display unit 86 to display the length of the area and a bidirectional arrow 125A so as to be superimposed on the panoramic image as illustrated in FIG. 26 as an example, and then the process proceeds to step 364.

The length of the area which is displayed on the display unit 86 by executing the processing of step 362 is the length of the area which is derived by the execution unit 112A by executing the processing of step 360. Meanwhile, in the example illustrated in FIG. 26, a length of "630 mm" corresponds to the length of the area. In addition, the bidirectional arrow 125A displayed on the display unit 86 by executing the processing of step 362 is an arrow for specifying a distance between the two pixels designated by the user through the touch panel 88.

In step 364, the execution unit 112A determines whether or not the above-described dimension derivation termination condition has been satisfied. In step 364, in a case where the dimension derivation termination condition has not been satisfied, the determination result is negative, and the process proceeds to step 366. In step 364, in a case where the dimension derivation termination condition has been satisfied, the determination result is positive, and the process proceeds to step 368.

Figure 27:
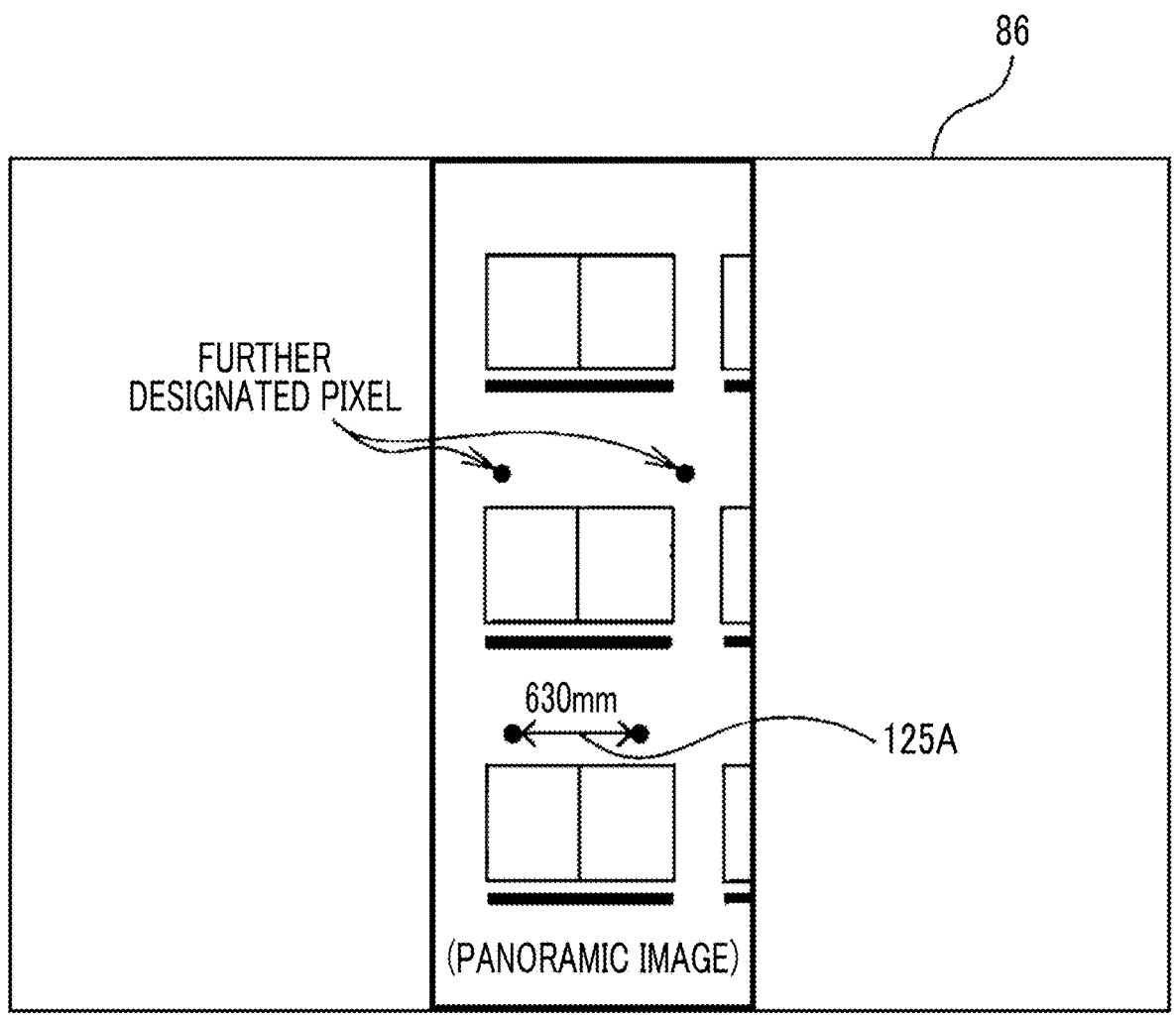
FIG. 27 is a schematic screen view illustrating an example of a screen in a case where two pixels are further designated in a state where the length of an area on the real space is displayed so as to be superimposed on a panoramic image by executing the dimension derivation process according to the first and second embodiments.

In step 366, the execution unit 112A determines whether or not two pixels have been further designated by the user through the touch panel 88. In step 366, in a case where two pixels have not been further designated by the user through the touch panel 88, the determination result is negative, and the process proceeds to step 364. In step 366, in a case where two pixels have been further designated by the user through the touch panel 88 as illustrated in FIG. 27 as an example, the determination result is positive, and the process proceeds to step 360.

Figure 28:
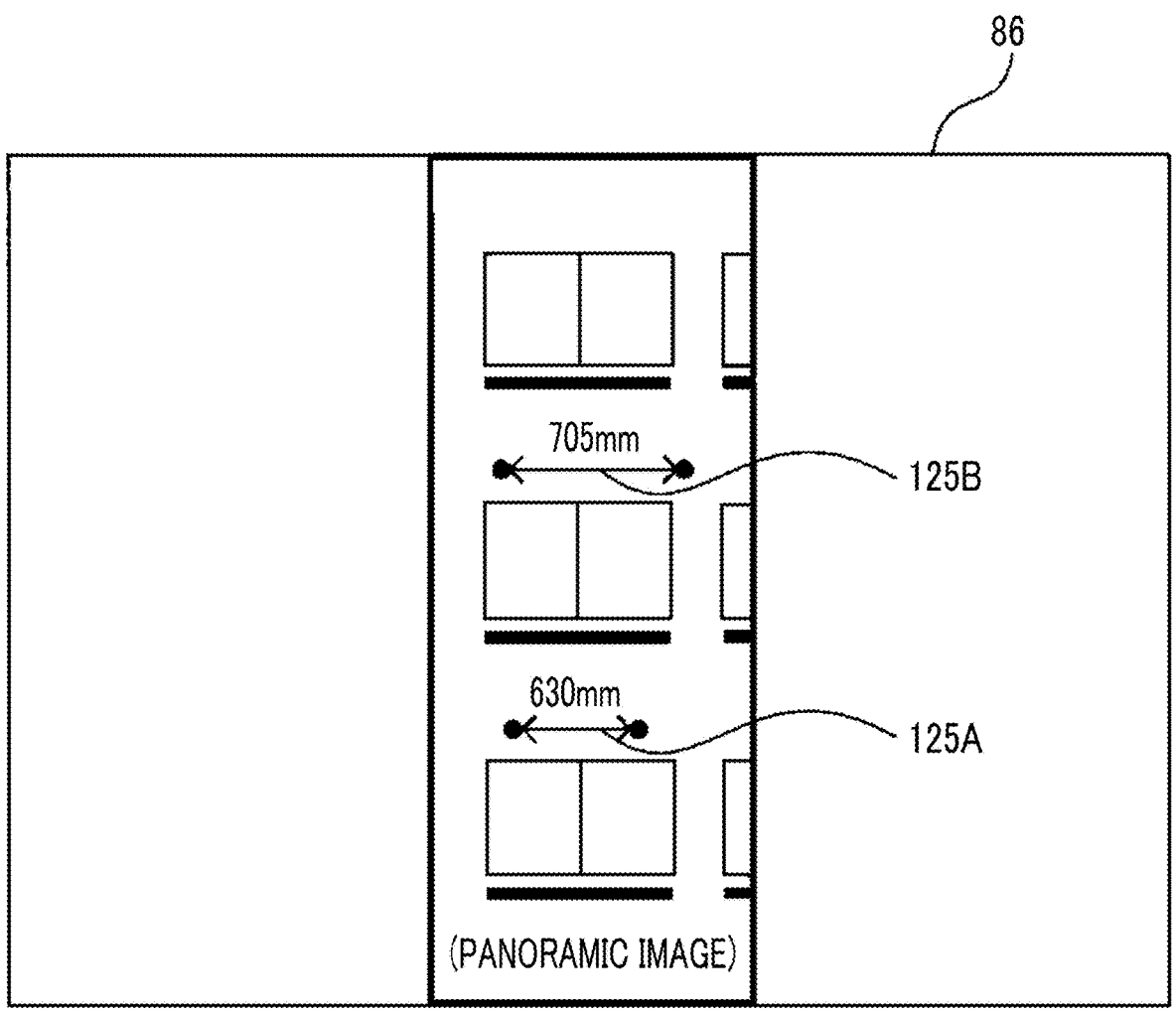
FIG. 28 is a schematic screen view illustrating an example of a screen in a state where the length of each of two areas on the real space is displayed so as to be superimposed on a panoramic image by executing the dimension derivation process according to the first and second embodiments.

In a case where the determination result in step 366 is positive and the processing of step 360 and the processing of step 362 are executed again, the length of an area which corresponds to a distance between the two pixels further designated by the user through the touch panel 88 is displayed on the display unit 86 as illustrated in FIG. 28 as an example. Meanwhile, in the example illustrated in FIG. 28, a length of "705 mm" corresponds to the length of the area which corresponds to the distance between the two pixels further designated by the user through the touch panel 88. In addition, in the example illustrated in FIG. 28, a bidirectional arrow 125B specifies the distance between the two pixels further designated by the user through the touch panel 88 so as to be visually perceived. Meanwhile, hereinafter, for convenience of description, the bidirectional arrows 125A and 125B will be simply referred to as a "bidirectional arrow 125" in a case where it is not necessary to give a description by distinguishing between the bidirectional arrows.

In step 368, the execution unit 112A causes the display unit 86 to terminate the display of a panoramic image and the like, and then the dimension derivation process is terminated. Meanwhile, here, the panoramic image and the like refer to the panoramic image and the pixel designation guidance message 138 in a case where the determination result in step 356 is positive, and refer to the panoramic image, the length of an area, and the bidirectional arrow 125 in a case where the determination result in step 364 is positive.

As described above, in the distance measurement device 10A, a measurement result of the measurement unit is acquired by the acquisition unit 110A (step 226). In a case where the acquired measurement result indicates that the measurement of the measurement unit has not been successful (step 228: N), remeasurement is executed by the measurement unit (step 222) in a state where the position of the present imaging range 115 is changed within an allowable range (step 250 or step 254).

Therefore, according to the distance measurement device 10A, it is possible to increase the degree of making the measurement of a distance to a subject successful in each of all of the imaging ranges 115 serving as imaging targets in panoramic imaging, as compared to a case where the measurement of the distance to the subject is performed once with respect to each of all of the imaging ranges 115 serving as imaging targets in the panoramic imaging.

In the distance measurement device 10A, a process of executing remeasurement by the measurement unit includes the process of changing the position of the present imaging range 115 within the allowable range by operating the change mechanism 11 in accordance with power of the motor 21 (the processing of step 250 or 254).

Therefore, according to the distance measurement device 10A, it is possible to change the position of the present imaging range 115 within the allowable range without requiring time and effort, as compared to a case where the position of the present imaging range 115 is manually changed within the allowable range.

In the distance measurement device 10A, remeasurement is executed by the measurement unit (step 222) in a case where the position of the present imaging range 115 is changed within the allowable range (step 250 or step 254) by operating the change mechanism 11.

Therefore, according to the distance measurement device 10A, it is possible to execute remeasurement by the measurement unit by changing a location serving as a measurement target, without deviating the position of the imaging range 115 from the allowable range.

In the distance measurement device 10A, remeasurement is executed by the measurement unit in a case where the "YES" button within the position change instruction reception screen 135 is turned on (step 232: Y) and the position of the imaging range 115 has been changed within the allowable range by operating the change mechanism 11.

Therefore, according to the distance measurement device 10A, it is possible to finely change the position of the imaging range 115 at the user's intended timing.

In the distance measurement device 10A, remeasurement is executed by the measurement unit in a case where the "YES" button is turned on in a state where the position change instruction reception screen 135 is displayed within a display region of a live view image, and the position of the imaging range 115 has been changed within the allowable range.

Therefore, according to the distance measurement device 10A, it is possible to cause the measurement unit to perform remeasurement at the user's intended timing, without deviating the position of the imaging range 115 from the allowable range.

In the distance measurement device 10A, a measurement success process, which is a process determined in advance as a process executed in a measurement success state where the measurement of the measurement unit has been successful, is further executed by the execution unit 112A in a case where the measurement result acquired by the acquisition unit 110A indicates success in the measurement of the measurement unit. Meanwhile, in the examples illustrated in FIGS. 12 to 15, a process subsequent to the process in which the determination result in step 228 is positive corresponds to an example of the measurement success process.

Therefore, according to the distance measurement device 10A, it is possible to rapidly start the execution of the measurement success process, as compared to a case where success in the measurement of the measurement unit is artificially determined without using measurement success/failure information.

In the distance measurement device 10A, the above-described measurement success process includes a process of causing the measurement unit to measure a distance to a subject, in a case where the position of the imaging range 115 has been changed to a position where imaging for a still image is expected to be performed next as imaging for a still image required in panoramic imaging.

Therefore, according to the distance measurement device 10A, it is possible to cause the measurement unit to measure a distance to a subject without requiring time and effort, as compared to a case where the measurement of the measurement unit is not started even though the position of the imaging range 115 has been changed to a position where imaging for a still image is expected to be performed next as imaging for a still image required in panoramic imaging.

In the distance measurement device 10A, the above-described measurement success process includes a process of changing the position of the imaging range 115 to a position where imaging for a still image is expected to be performed next as imaging for a still image required in panoramic imaging by operating the change mechanism 11 in accordance with power of the motor 23.

Therefore, according to the distance measurement device 10A, it is possible to change the position of the imaging range 115 to a position where imaging for a still image is expected to be performed next as imaging for a still image required in panoramic imaging without requiring time and effort, as compared to a case where the position of the imaging range 115 is manually changed to a position where imaging for a still image is expected to be performed next as imaging for a still image required in panoramic imaging.

In the distance measurement device 10A, a process of causing the measurement unit to measure a distance to a subject (step 222) is included in the measurement success process, in a case where the position of the imaging range 115 has been changed to a position where imaging for a still image is expected to be performed next as imaging for a still image required in panoramic imaging (step 306) and the imaging measurement button 90A is turned on (step 202: Y).

Therefore, according to the distance measurement device 10A, it is possible to cause the measurement unit to measure a distance to a subject at the user's intended timing, in a case where the position of the imaging range 115 has been changed to a position where imaging for a still image is expected to be performed next as imaging for a still image required in panoramic imaging.

In the distance measurement device 10A, a first still image which is the previous still image includes 4-apex corresponding pixels and corresponding pixels which are four pixels corresponding to 4-apex corresponding pixels are included in a second still image which is the latest still image (step 258: N), the first still image is subjected to projection conversion on the basis of the 4-apex corresponding pixels (step 276). In addition, the second still image is subjected to projection conversion on the basis of the corresponding pixels (step 276). A panoramic image is generated which is an image including a projection-converted image obtained by performing the projection conversion on the first still image (an example of a first projection-converted image according to the technique of this disclosure) and a projection-converted image obtained by performing the projection conversion on the second still image (a second projection-converted image according to the technique of this disclosure) (steps 286 and 288).

Therefore, according to the distance measurement device 10A, it is possible to generate a panoramic image including a projection-converted image without requiring time and effort, as compared to a case where 4-apex corresponding pixels are searched for with respect to each of all of the still images obtained by imaging each subject included in each of the plurality of imaging ranges 115 serving as imaging targets in panoramic imaging.

In the distance measurement device 10A, the second allowable range is set to be a range the real-space four apexes included in the present imaging range 115 are present.

Therefore, according to the distance measurement device 10A, it is possible to contribute to high-precision projection conversion of a still image obtained by imaging a subject included in the imaging range 115 within the second allowable range, as compared to a case where the second allowable range is a range in which the real-space four apexes included in the present imaging range 115 are not present.

Further, in the distance measurement device 10A, the length of an area on the real space which corresponds to a distance between two pixels designated within a panoramic image is derived by operating the dimension derivation function on the basis of an actually measured distance obtained by executing the panoramic imaging measurement process, and the panoramic image (step 360).

Therefore, according to the distance measurement device, it is possible to derive the length of an area on the real space which is designated through a panoramic image without requiring time and effort, as compared to a case where a distance to a subject is measured once with respect to each of all imaging operations required in one panoramic imaging.

Figure 29:
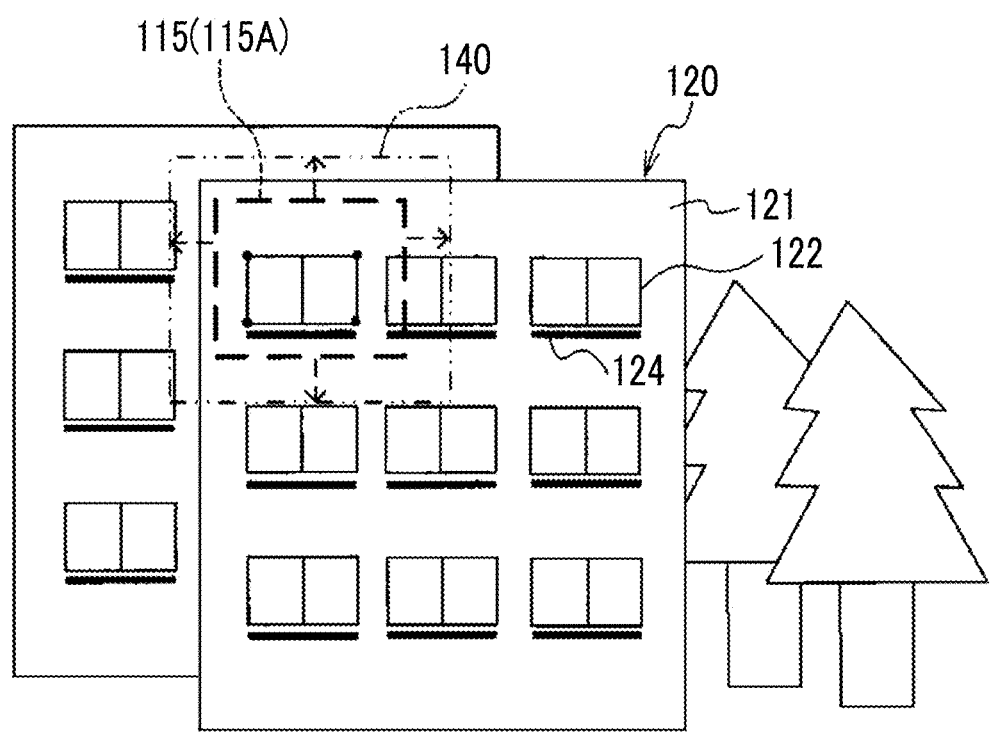
FIG. 29 is a conceptual diagram illustrating a modification example of an allowable range which is used by executing the panoramic imaging measurement process according to the first embodiment.

Meanwhile, in the first embodiment, the range 130 has been described as a first allowable range. However, the technique of this disclosure is not limited thereto, and a range 140 may be used as a first allowable range, as illustrated in FIG. 29 as an example. The range 140 is a range in which the imaging range 115 is not only enlarged in the lateral direction when seen in a front view with respect to the imaging range 115, but also enlarged in the vertical direction when seen in a front view. In the example illustrated in FIG. 29, the imaging range 115 is enlarged by 1.5 times both in the imaging range 115 when seen in a front view with respect to the imaging range 115 and the lateral direction. In this case, the position of the imaging range 115 is also finely changed within a first allowable range in the vertical direction when seen in a front view in the same manner as the fine change described in the first embodiment. In the example illustrated in FIG. 29, the range 140 applied as the first allowable range is shown, but a range equivalent to the range 140 can also be applied with respect to the second allowable range.

In the first embodiment, remeasurement is executed by the measurement unit in a case where the position of the imaging range 115 has been changed within the allowable range after the "YES" button is turned on, but the technique of this disclosure is not limited thereto. For example, remeasurement may be executed by the measurement unit in a case where the imaging measurement button 90A is turned on after the position of the imaging range 115 is changed within the allowable range.

In the first embodiment, a description has been given of a case where a panoramic image is generated on the basis of a still image obtained by imaging a subject included in each of the plurality of imaging ranges 115 which are arranged in the vertical direction when seen in a front view with respect to the subject, but the technique of this disclosure is not limited thereto. For example, a panoramic image may be generated on the basis of a still image obtained by imaging a subject included in each of the plurality of imaging ranges 115, while moving the position of the imaging range 115 in the lateral direction when seen in a front view with respect to the subject. In addition, a panoramic image may be generated on the basis of a still image obtained by imaging a subject within each imaging range 115, while moving the position of the imaging range 115 in the vertical direction when seen in a front view with respect to the subject and the lateral direction, in accordance with a predetermined rule.

In the first embodiment, the panoramic imaging measurement process is terminated in a case where a non-arrangement region has ceased to be present due to continuous failures in the remeasurement of the measurement unit by the fine change of the position of the imaging range within the first allowable range or the second allowable range, but the technique of this disclosure is not limited thereto. For example, the process may proceed to step 264 illustrated in FIG. 14 in a case where a non-arrangement region has ceased to be present due to continuous failures in the remeasurement of the measurement unit by the fine change of the position of the imaging range within the first allowable range or the second allowable range. In this case, an actually measured distance to the subject within the present imaging range 115 cannot be secured, but imaging for a still image to be performed on the subject within the present imaging range 115 can be executed. That is, it is possible to accomplish the generation of a panoramic image even though an actually measured distance cannot be secured.

Meanwhile, in this case, it is possible to derive the length of an area specified by two designated pixels by operating the dimension derivation function, in a case where an actually measured distance to a subject is secured with respect to at least one imaging range among all of the imaging ranges serving as imaging targets in panoramic imaging. For example, in a case where an actually measured distance to a subject within any imaging range 115 is secured even in a case where an actually measured distance to a subject is not obtained with respect to a certain imaging range 115, the secured actually measured distance itself may be adopted as "L" in Expression (1). In addition, an actually measured distance obtained by an interpolation method, such as linear interpolation or nonlinear interpolation, can also be adopted as "L" in Expression (1) in a case where a plurality of actually measured distances are secured.

In the first embodiment, a description has been given of a case where the panoramic imaging measurement process is continued until imaging for a still image with respect to a subject within the last imaging range 115 determined within the range $R_1$ is terminated, but the technique of this disclosure is not limited thereto. The panoramic imaging measurement process may be terminated in accordance with an instruction received through the touch panel 88 or the reception device 90 in the middle of the panoramic imaging measurement process, without deciding the last imaging range 115 in advance.

In the first embodiment, a description has been given of a case where the process proceeds to step 222 illustrated in FIG. 12 in a case where the processing of step 254 illustrated in FIG. 13 is executed, but the technique of this disclosure is not limited thereto. For example, the processing of step 650 and the processing of step 652 may be executed after the processing of step 254 is executed as illustrated in FIG. 46.

In the first embodiment, a description has been given of a case where the process proceeds to step 222 illustrated in FIG. 12 in a case where the processing of step 250 illustrated in FIG. 13 is executed, but the technique of this disclosure is not limited thereto. For example, the processing of step 654 and the processing of step 656 may be executed after the processing of step 250 is executed as illustrated in FIG. 46.

Figure 46:
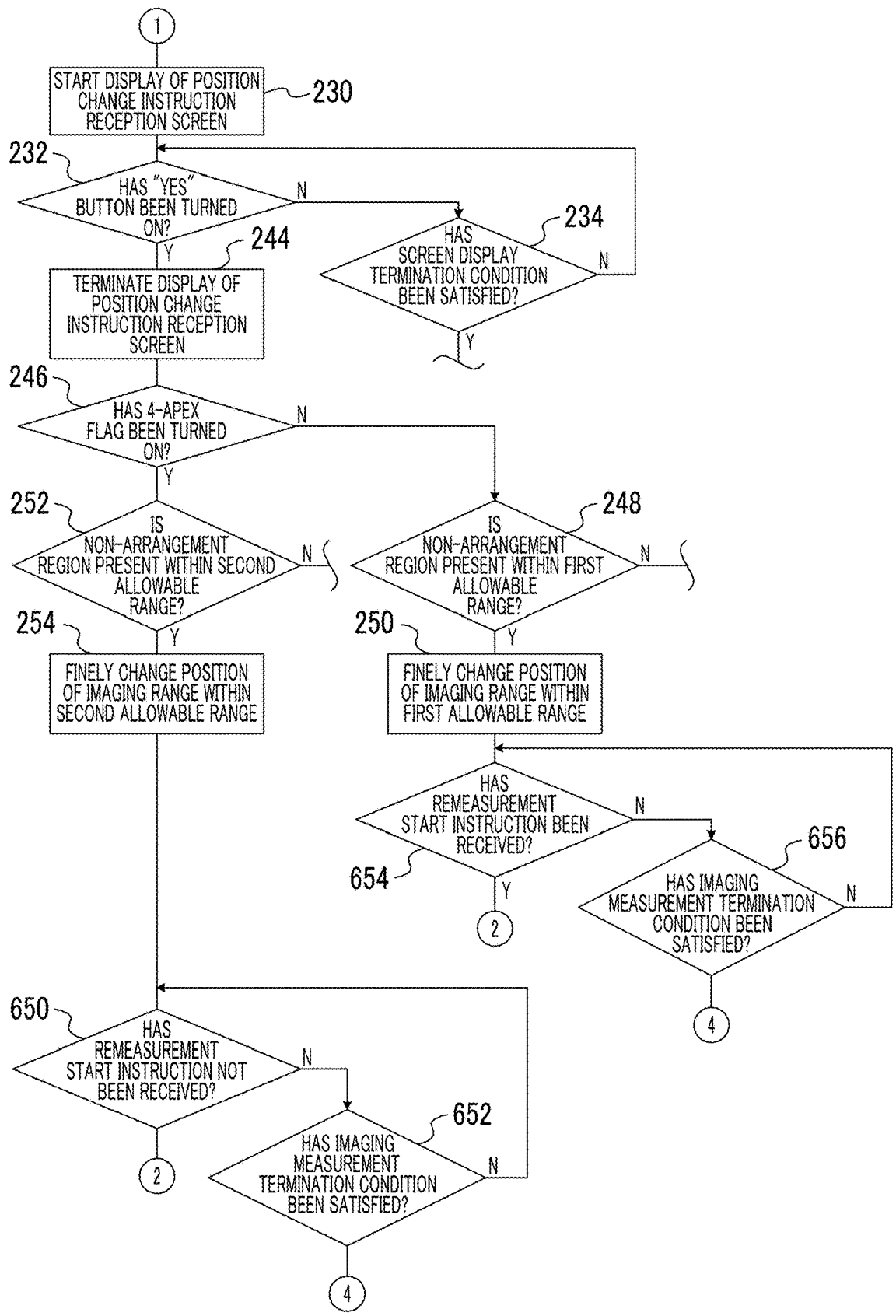
FIG. 46 is a flowchart illustrating a flow (a flow of the processing illustrated in FIG. 13) of a portion of the panoramic imaging measurement process according to a modification example of the first embodiment.

In step 650 illustrated in FIG. 46, the execution unit 112A determines whether or not a remeasurement start instruction which is an instruction for causing the measurement unit to execute remeasurement has been received by the touch panel 88 or the reception device 90. An example of the remeasurement start instruction received by the touch panel 88 is a double-tap operation. In addition, an example of the remeasurement start instruction received by the reception device 90 is normal pressing of the imaging measurement button 90A.

In step 650, in a case where the remeasurement start instruction has not been received by the touch panel 88 or the reception device 90, the determination result is negative, and the process proceeds to step 652. In step 650, in a case where the remeasurement start instruction has been received by the touch panel 88 or the reception device 90, the determination result is positive, and the process proceeds to step 222 illustrated in FIG. 12.

In step 652, the execution unit 112A determines whether or not the above-described imaging measurement termination condition has been satisfied. In step 652, in a case where the imaging measurement termination condition has not been satisfied, the determination result is negative, and the process proceeds to step 650. In step 652, in a case where the imaging measurement termination condition has been satisfied, the determination result is positive, and the panoramic imaging measurement process is terminated.

On the other hand, in step 654 illustrated in FIG. 46, the execution unit 112A determines whether or not the above-described remeasurement start instruction has been received by the touch panel 88 or the reception device 90. In step 654, in a case where the remeasurement start instruction has not been received by the touch panel 88 or the reception device 90, the determination result is negative, and the process proceeds to step 656. In step 654, in a case where the remeasurement start instruction has been received by the touch panel 88 or the reception device 90, the determination result is positive, and the process proceeds to step 222 illustrated in FIG. 12.

In step 656, the execution unit 112A determines whether or not the above-described imaging measurement termination condition has been satisfied. In step 656, in a case where the imaging measurement termination condition has not been satisfied, the determination result is negative, and the process proceeds to step 654. In step 656, in a case where the imaging measurement termination condition has been satisfied, the determination result is positive, and the panoramic imaging measurement process is terminated.

In this manner, in the example illustrated in FIG. 46, the measurement of the measurement unit is executed again in the distance measurement device 10A in a case where the position of the imaging range 115 has been finely changed within the allowable range and the remeasurement start instruction has been received by the touch panel 88 or the reception device 90 (step 222). Therefore, according to the example illustrated in FIG. 46, it is possible to cause the measurement unit to remeasure a distance to the subject at the user's intended timing.

Second Embodiment

In the first embodiment, a description has been given of a case where the change of the position of the imaging range 115 is realized without depending on a user's manual operation, but a description will be given of a case where the change of the position of an imaging range 115 is performed by a user's manual operation, in a second embodiment. Meanwhile, in the second embodiment, the same components as those described in the first embodiment will be denoted by the same reference numerals and signs, and a description thereof will be omitted.

A distance measurement device 10B according to the second embodiment is different from the distance measurement device 10A in that the distance measurement device 10B includes a distance measurement device main body 10B1 instead of the distance measurement device main body 10A1, as illustrated in FIGS. 1 to 4 as an example. The distance measurement device main body 10B1 is different from the distance measurement device main body 10A1 in that the distance measurement device main body 10B1 includes an imaging device 150 instead of the imaging device 14. The imaging device 150 is different from the imaging device 14 in that the imaging device 150 includes an imaging device main body 152 instead of the imaging device main body 18.

As illustrated in FIG. 5 as an example, the imaging device main body 152 is different from the imaging device main body 18 in that the imaging device main body 152 includes a main control unit 154 instead of the main control unit 62. As illustrated in FIG. 9 as an example, the main control unit 154 is different from the main control unit 62 in that a panoramic imaging measurement program 105B is stored in the secondary storage unit 104, instead of the panoramic imaging measurement program 105A.

A CPU 100 executes the panoramic imaging measurement program 105B to be operated as an acquisition unit 110B and an execution unit 112B, as illustrated in FIG. 10 as an example. The acquisition unit 110B corresponds to the acquisition unit 110A described in the first embodiment, and the execution unit 112B corresponds to the execution unit 112A described in the first embodiment. Meanwhile, in the second embodiment, for convenience of description, with regard to the acquisition unit 110B and the execution unit 112B, differences from the acquisition unit 110A and the execution unit 112A described in the first embodiment will be described.

Next, a panoramic imaging measurement process realized by executing the panoramic imaging measurement program 105B by the CPU 100 will be described with reference to FIGS. 30 to 35, as the operation of portions of the distance measurement device 10B according to the technique of this disclosure. Meanwhile, the same steps as the steps included in the panoramic imaging measurement process (FIGS. 12 to 15) described in the first embodiment will be denoted by the same step numbers, and a description thereof will be omitted.

Figure 31:
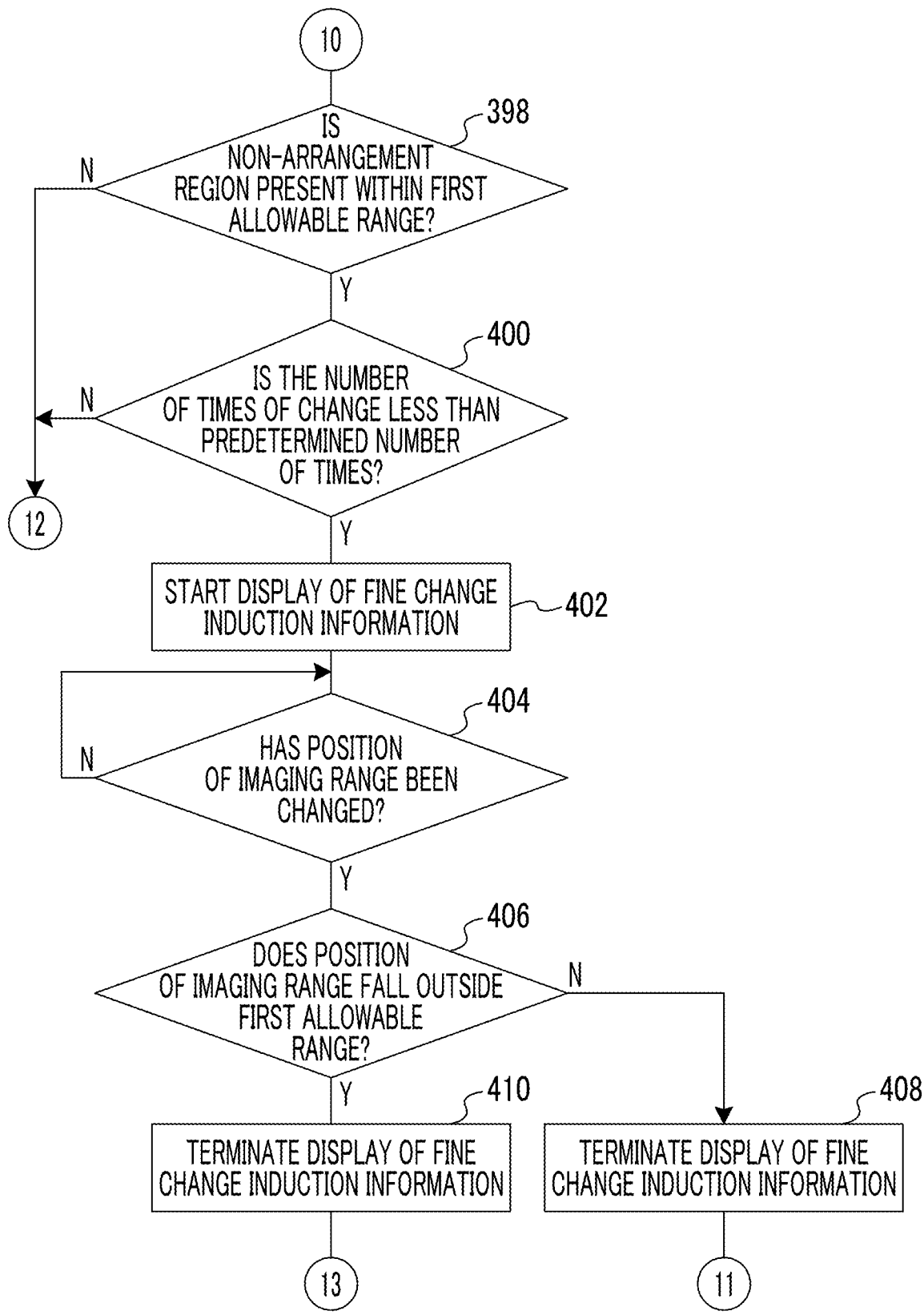
FIG. 31 is the continuation of the flowchart illustrated in FIG. 30.
Figure 32:
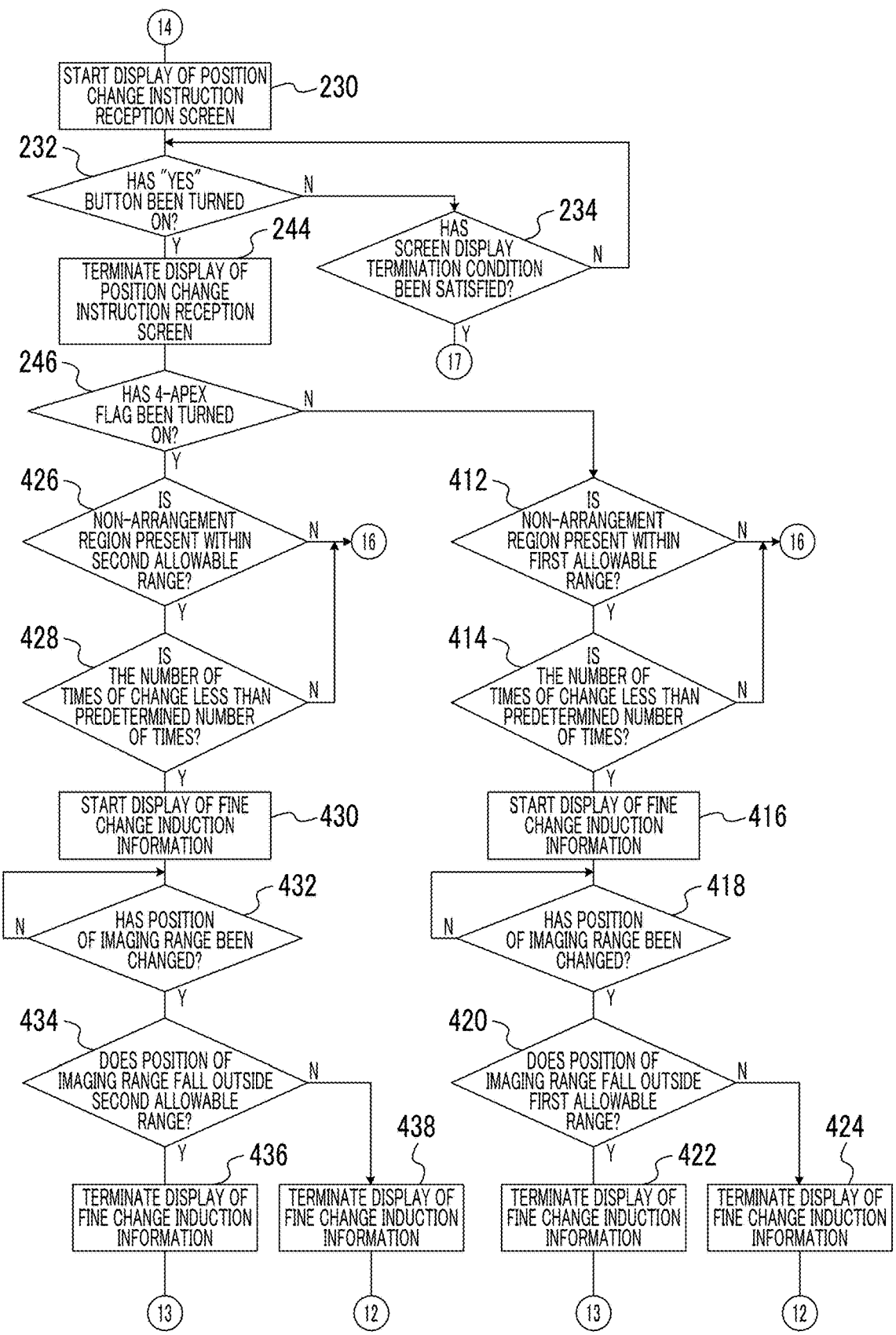
FIG. 32 is the continuation of the flowchart illustrated in FIG. 30.
Figure 33:
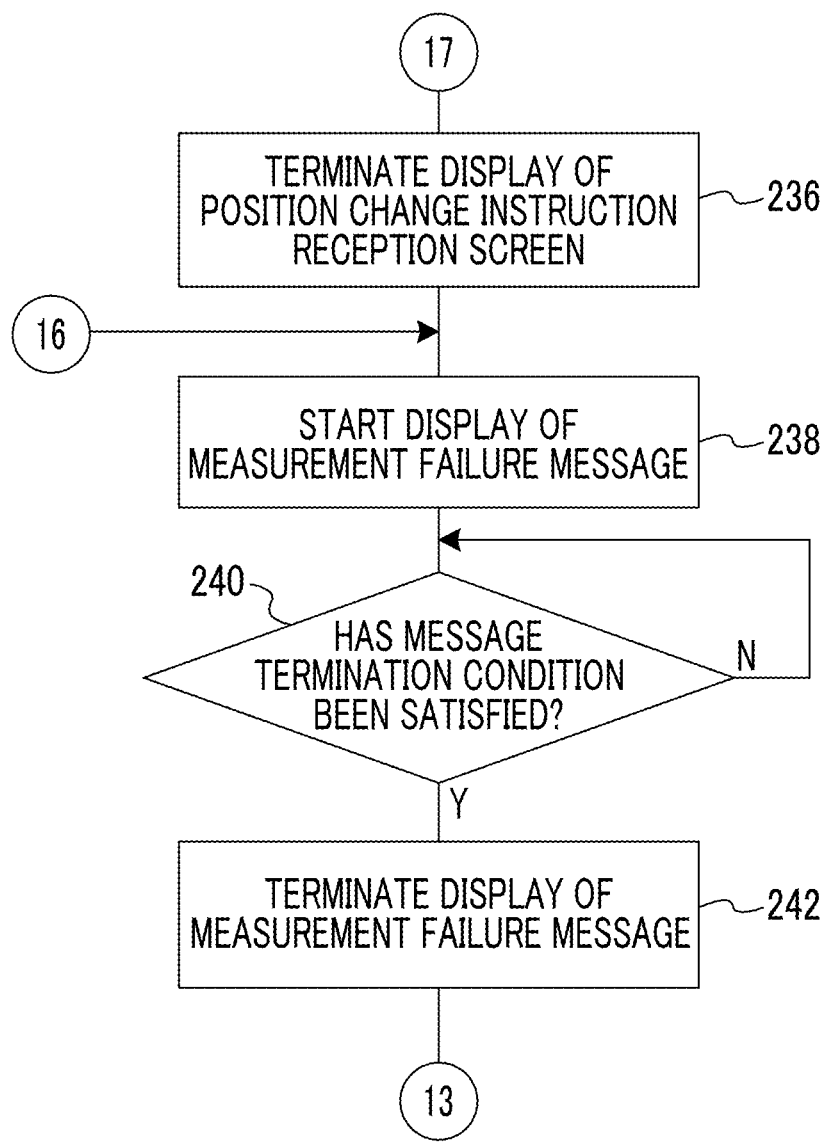
FIG. 33 is the continuation of the flowchart illustrated in FIG. 32.
Figure 34:
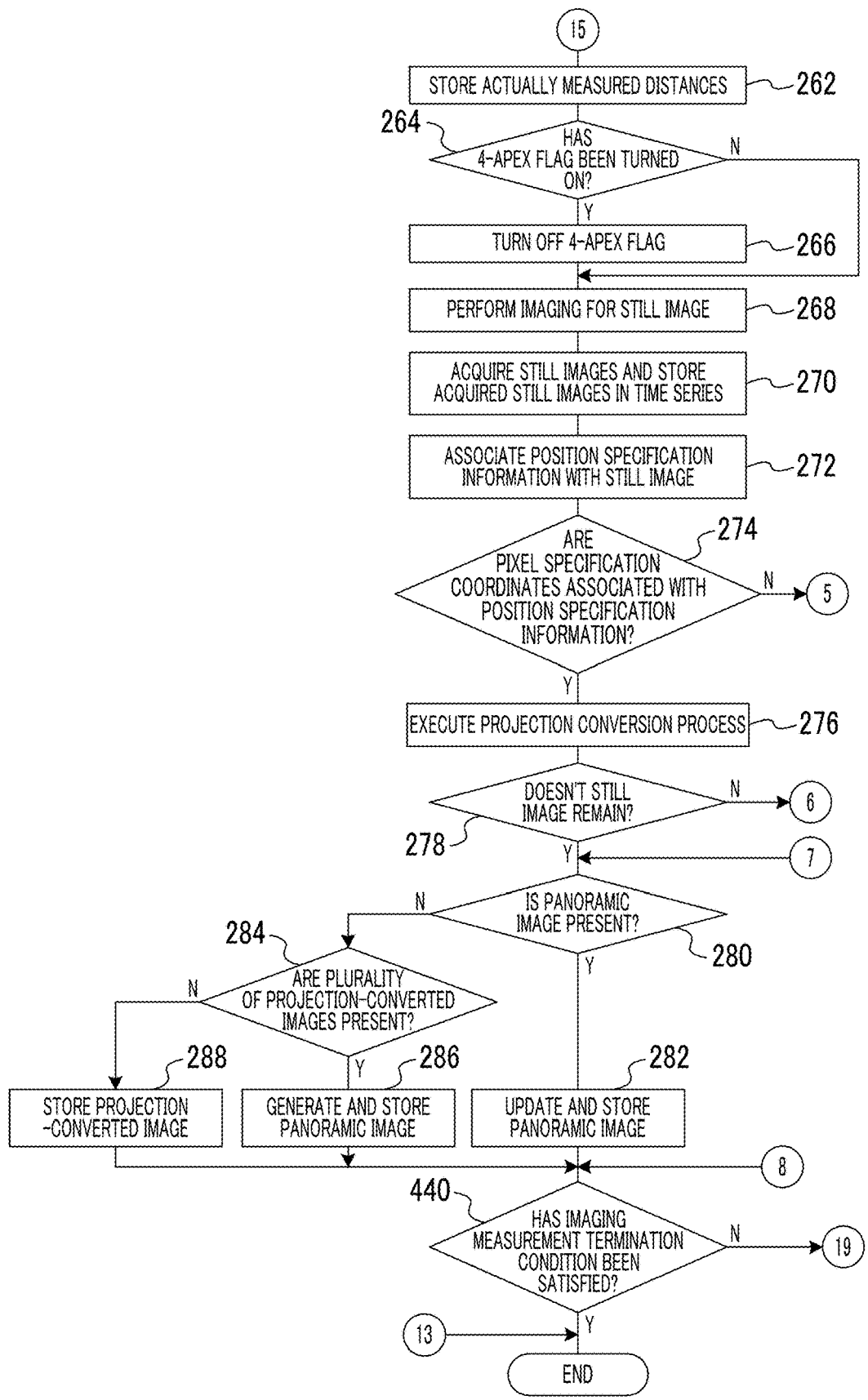
FIG. 34 is the continuation of the flowchart illustrated in FIGS. 30 to 33.
Figure 35:
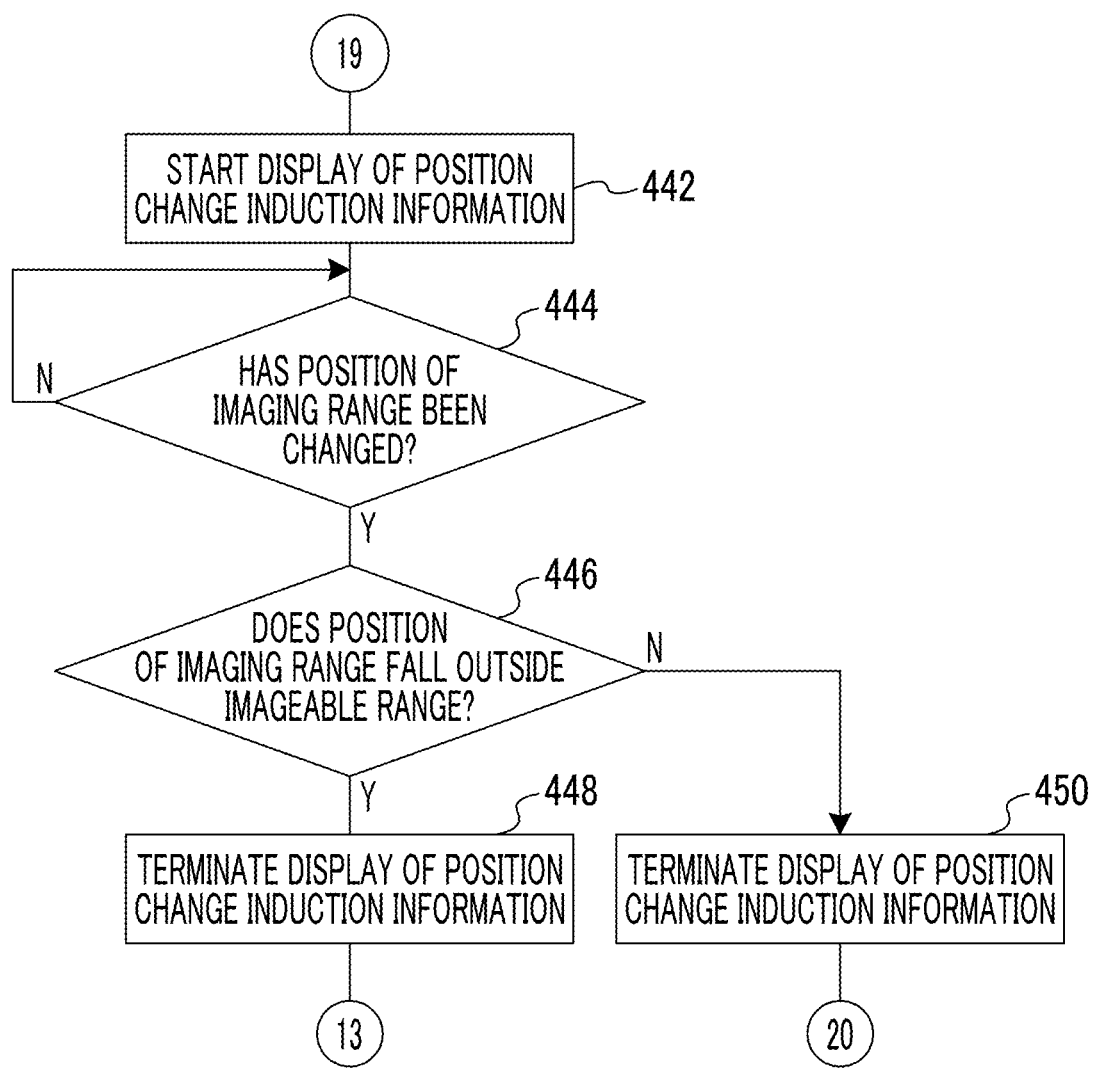
FIG. 35 is the continuation of the flowchart illustrated in FIG. 34.

As illustrated in FIG. 31 as an example, the panoramic imaging measurement process according to the second embodiment is different from the panoramic imaging measurement process according to the first embodiment in that steps 398 to 410 are provided instead of steps 214 and 216. In addition, as illustrated in FIG. 32 as an example, the panoramic imaging measurement process according to the second embodiment is different from the panoramic imaging measurement process according to the first embodiment in that the steps 412 to 438 are provided instead of steps 248 to 254. Further, as illustrated in FIGS. 34 and 35 as an example, there is a difference in that steps 440 to 450 are provided instead of steps 304 and 306.

In step 398 illustrated in FIG. 31, the execution unit 112B determines whether or not a non-arrangement region is present within a first allowable range. In step 398, in a case where a non-arrangement region is not present within the first allowable range, the determination result is negative, and the process proceeds to step 222 illustrated in FIG. 30. In step 398, in a case where a non-arrangement region is present within the first allowable range, the determination result is positive, and the process proceeds to step 400.

In step 400, the execution unit 112B determines whether or not the number of times of the change of the position of the imaging range 115 within the first allowable range is less than a predetermined number of times (for example, 10 times) with respect to the present imaging range 115. In step 400, in a case where the number of times of the change of the position of the imaging range 115 within the first allowable range reaches the predetermined number of times with respect to the present imaging range 115, the determination result is negative, and the process proceeds to step 222 illustrated in FIG. 30. In step 400, in a case where the number of times of the change of the position of the imaging range 115 within the first allowable range is less than the predetermined number of times with respect to the present imaging range 115, the determination result is positive, and the process proceeds to step 402.

Figure 36:
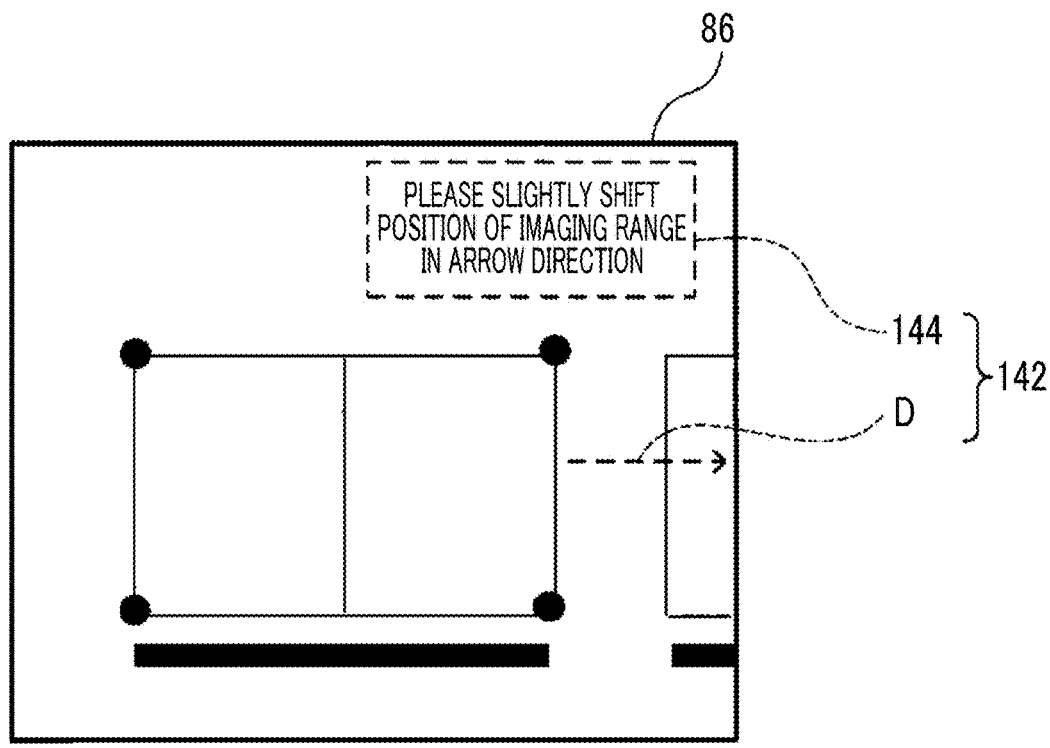
FIG. 36 is a schematic screen view illustrating an example of a screen on which a live view image showing a subject within the imaging range illustrated in FIG. 16 and fine change induction information are displayed.

In step 402, the execution unit 112B causes a display unit 86 to start the display of fine change induction information 142 within a display region of a live view image as illustrated in FIG. 36 as an example, and then the process proceeds to step 404.

The fine change induction information 142, which is an example of first induction information according to the technique of this disclosure, is information for inducing the change of the position of the present imaging range 115 within the allowable range. In the example illustrated in FIG. 36, information including a fine change induction message 144 and an arrow D is illustrated as the fine change induction information 142. In the example illustrated in FIG. 36, a message of "please slightly shift position of imaging range in arrow direction" is shown as the fine change induction message 144. In the example illustrated in FIG. 36, the arrow D indicates a non-arrangement direction.

In addition, the arrow D has a function of an indicator. That is, the arrow D becomes smaller as the position of the imaging range 115 becomes closer to the boundary of the first allowable range, and becomes larger as the position of the imaging range 115 becomes distant from the boundary of the allowable range. In other words, the arrow D becomes smaller as the center of the imaging range 115 becomes distant from a center line CL illustrated in FIG. 16 within the first allowable range, and becomes larger as the center of the imaging range 115 becomes closer to the center line CL illustrated in FIG. 16 within the allowable range.

In the example illustrated in FIG. 36, a description has been given of a case where the fine change induction information 142 is visibly displayed, but audible display such as the output of a sound using a sound reproducing device (not shown) or permanent visible display such as the output of printed matter using a printer may be performed instead of the visible display or may be performed in combination.

In step 404, the execution unit 112B determines whether or not the position of the imaging range 115 has been changed. Meanwhile, in the second embodiment, the change of the position of the imaging range 115 is realized by operating a change mechanism 11 in accordance with the user's operation with respect to the rotary switch.

In step 404, in a case where the position of the imaging range 115 has not been changed, the determination result is negative, and the determination in step 404 is performed again. In step 404, in a case where the position of the imaging range 115 has been changed, the determination result is positive, and the process proceeds to step 406.

In step 406, the execution unit 112B determines whether or not the position of the present imaging range 115 falls outside a first allowable range. In step 406, in a case where the position of the present imaging range 115 falls outside the first allowable range, the determination result is positive, and the process proceeds to step 410. In step 406, in a case where the position of the present imaging range 115 falls within the first allowable range, the determination result is negative, and the process proceeds to step 408.

Figure 30:
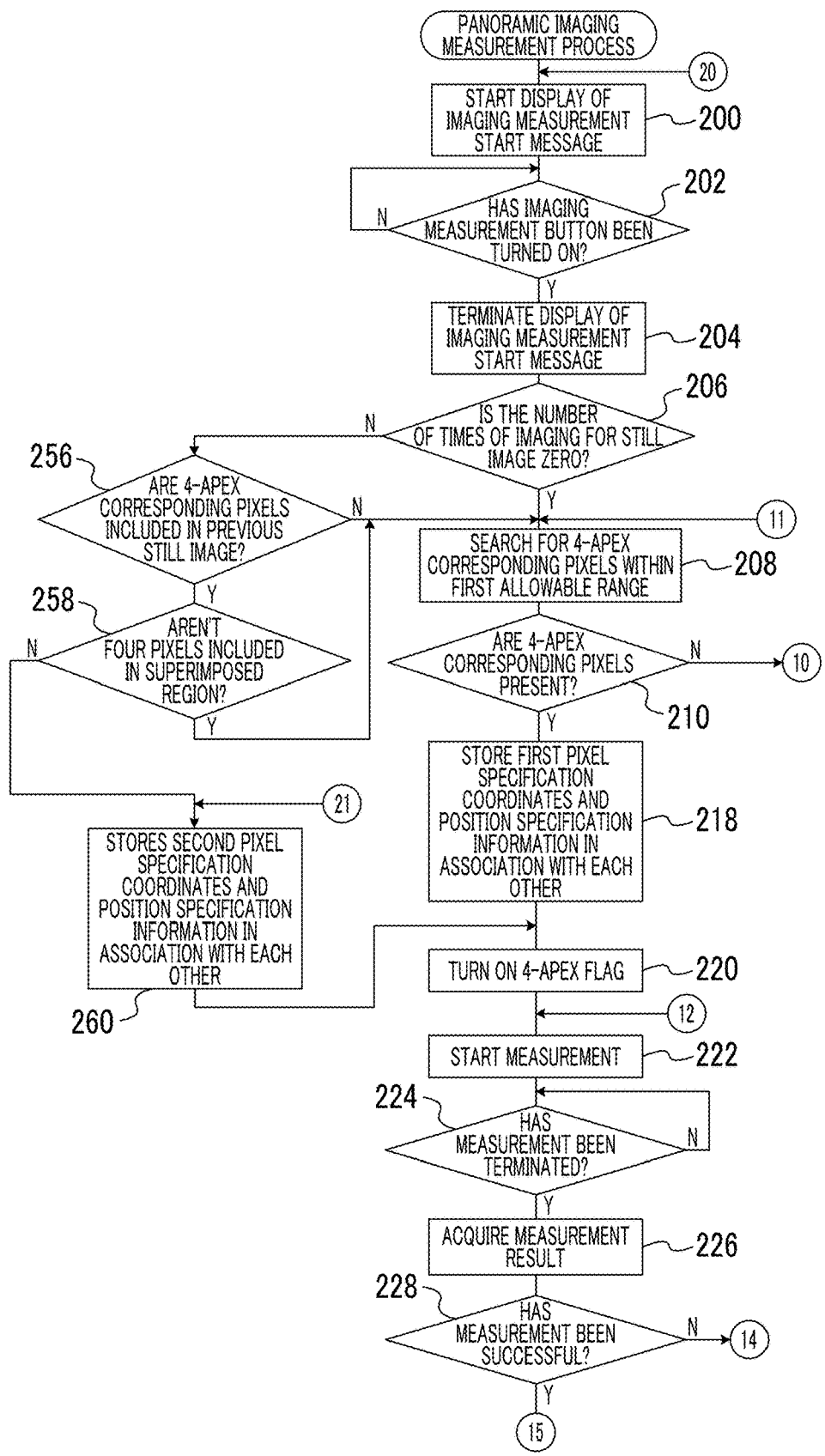
FIG. 30 is a flowchart illustrating an example of a flow of a panoramic imaging measurement process according to the second embodiment.

In step 408, the execution unit 112B causes the display unit 86 to terminate the display of the fine change induction information 142, and then the process proceeds to step 208 illustrated in FIG. 30.

In step 410, the execution unit 112B causes the display unit 86 to terminate the display of the fine change induction information 142, and then the panoramic imaging measurement process is terminated.

In step 412 illustrated in FIG. 32, the execution unit 112B determines whether or not a non-arrangement region is present within a first allowable range. In step 412, in a case where a non-arrangement region is not present within the first allowable range, the determination result is negative, and the process proceeds to step 238 illustrated in FIG. 33. In step 412, in a case where a non-arrangement region is present within the first allowable range, the determination result is positive, and the process proceeds to step 414.

In step 414, the execution unit 112B determines whether or not the number of times of the change of the position of the imaging range 115 within the first allowable range is less than a predetermined number of times (for example, 10 times) with respect to the present imaging range 115. In step 414, in a case where the number of times of the change of the position of the imaging range 115 within the first allowable range reaches the predetermined number of times with respect to the present imaging range 115, the determination result is negative, and the process proceeds to step 238 illustrated in FIG. 33. In step 414, in a case where the number of times of the change of the position of the imaging range 115 within the first allowable range is less than the predetermined number of times with respect to the present imaging range 115, the determination result is positive, and the process proceeds to step 416.

In step 416, the execution unit 112B causes the display unit 86 to start the display of the fine change induction information 142 within a display region of a live view image as illustrated in FIG. 36 as an example, and then the process proceeds to step 418. Meanwhile, the processing of step 416 is an example of a first display process according to the technique of this disclosure.

In step 418, the execution unit 112B determines whether or not the position of the imaging range 115 has been changed. In step 418, in a case where the position of the imaging range 115 has not been changed, the determination result is negative, and the determination in step 418 is performed again. In step 418, in a case where the position of the imaging range 115 has been changed, the determination result is positive, and the process proceeds to step 420.

In step 420, the execution unit 112B determines whether or not the position of the present imaging range 115 falls outside a first allowable range. In step 420, in a case where the position of the present imaging range 115 falls outside the first allowable range, the determination result is positive, and the process proceeds to step 422. In step 420, in a case where the position of the present imaging range 115 falls within the first allowable range, the determination result is negative, and the process proceeds to step 424.

In step 422, the execution unit 112B causes the display unit 86 to terminate the display of the fine change induction information 142, and then the panoramic imaging measurement process is terminated.

In step 424, the execution unit 112B causes the display unit 86 to terminate the display of the fine change induction information 142, and then the process proceeds to step 222.

In step 426, the execution unit 112B determines whether or not a non-arrangement region is present within a second allowable range. In step 426, in a case where a non-arrangement region is not present within the second allowable range, the determination result is negative, and the process proceeds to step 238 illustrated in FIG. 33. In step 426, in a case where a non-arrangement region is present within the second allowable range, the determination result is positive, and the process proceeds to step 428.

In step 428, the execution unit 112B determines whether or not the number of times of the change of the position of the imaging range 115 within the second allowable range is less than a predetermined number of times (for example, 10 times) with respect to the present imaging range 115. In step 428, in a case where the number of times of the change of the position of the imaging range 115 within the second allowable range reaches the predetermined number of times with respect to the present imaging range 115, the determination result is negative, and the process proceeds to step 238 illustrated in FIG. 33. In step 428, in a case where the number of times of the change of the position of the imaging range 115 within the second allowable range is less than the predetermined number of times with respect to the present imaging range 115, the determination result is positive, and the process proceeds to step 430.

In step 430, the execution unit 112B causes the display unit 86 to start the display of the fine change induction information 142 within the display region of the live view image as illustrated in FIG. 36 as an example, and then the process proceeds to step 432. Meanwhile, the processing of step 430 is an example of a first display process according to the technique of this disclosure.

In step 432, the execution unit 112B determines whether or not the position of the imaging range 115 has been changed. In step 432, in a case where the position of the imaging range 115 has not been changed, the determination result is negative, and the determination in step 432 is performed again. In step 432, in a case where the position of the imaging range 115 has been changed, the determination result is positive, and the process proceeds to step 434.

In step 434, the execution unit 112B determines whether or not the position of the present imaging range 115 falls outside the second allowable range. In step 434, in a case where the position of the present imaging range 115 falls outside the second allowable range, the determination result is positive, and the process proceeds to step 436. In step 434, in a case where the position of the present imaging range 115 falls within the second allowable range, the determination result is negative, and the process proceeds to step 438.

In step 436, the execution unit 112B causes the display unit 86 to terminate the display of the fine change induction information 142, and the panoramic imaging measurement process is terminated.

In step 438, the execution unit 112B causes the display unit 86 to terminate the display of the fine change induction information 142, and then the process proceeds to step 222.

In step 440 illustrated in FIG. 34, the execution unit 112B determines whether or not an imaging measurement termination condition has been satisfied. Meanwhile, the imaging measurement termination condition according to the second embodiment may be the same as or different from the imaging measurement termination condition described in the first embodiment.

In step 440, in a case where the imaging measurement termination condition has not been satisfied, the determination result is negative, and the process proceeds to step 442 illustrated in FIG. 35.

Figure 37:
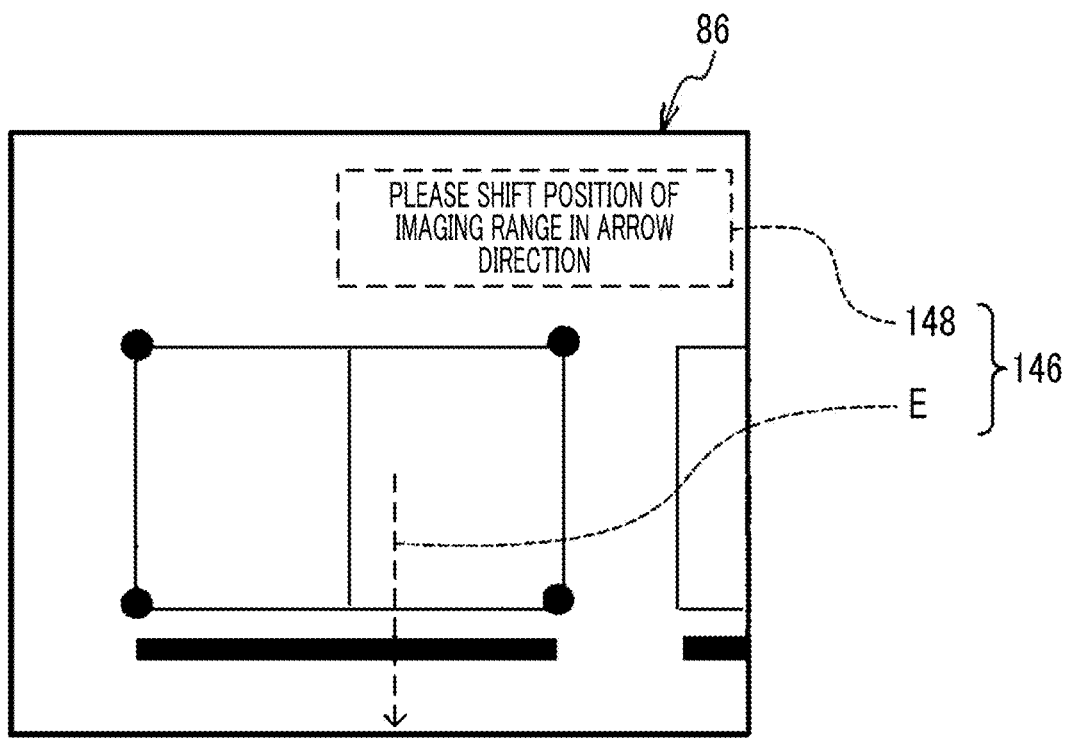
FIG. 37 is a schematic screen view illustrating an example of a screen on which a live view image showing a subject within the imaging range illustrated in FIG. 16 and position change induction information are displayed.

In step 442 illustrated in FIG. 35, the execution unit 112B causes the display unit 86 to start the display of position change induction information 146 as illustrated in FIG. 37 as an example, and then the process proceeds to step 444. Meanwhile, the processing of step 442 is an example of a third display process according to the technique of this disclosure.

The position change induction information 146, which is an example of second induction information according to the technique of this disclosure, and is information for inducing the change of the position of the present imaging range 115 to a position where the next imaging for a still image in panoramic imaging is expected to be performed. In the example illustrated in FIG. 37, information including a position change induction message 148 and an arrow E is illustrated as the position change induction information 146. In the example illustrated in FIG. 37, a message of "please shift position of imaging range in arrow direction" is shown as the position change induction message 148. In the example illustrated in FIG. 37, the arrow E indicates the direction of the position of the imaging range 115 used in imaging for a still image which is expected to be performed next, as imaging for a still image which is required in panoramic imaging.

In addition, the arrow E has a function of an indicator. That is, the arrow E becomes smaller as the position of the imaging range 115 becomes closer to the boundary of an imageable range, and becomes larger as the position of the imaging range 115 becomes distant from the boundary of the imageable range. Meanwhile, the imageable range refers to a range in which panoramic imaging can be performed. The range in which panoramic imaging can be performed refers to, for example, a range which is within an allowable range and continuity with the present imaging range 115 is secured in a direction of the arrow A illustrated in FIG. 16.

In addition, the example illustrated in FIG. 37 shows a case where the position change induction information 146 is visibly displayed, but audible display such as the output of a sound using a sound reproducing device (not shown) or permanent visible display such as the output of printed matter using a printer may be performed instead of the visible display or may be performed in combination.

In step 444, the execution unit 112B determines whether or not the position of the imaging range 115 has been changed. In step 444, in a case where the position of the imaging range 115 has not been changed, the determination result is negative, and the determination in step 444 is performed again. In step 444, in a case where the position of the imaging range 115 has been changed, the determination result is positive, and the process proceeds to step 446.

In step 446, the execution unit 112B determines whether or not the position of the imaging range 115 falls outside an imageable range. In step 446, in a case where the position of the imaging range 115 falls outside the imageable range, the determination result is positive, and the process proceeds to step 448. In step 446, in a case where the position of the imaging range 115 falls within the imageable range, the determination result is negative, and the process proceeds to step 450.

In step 448, the execution unit 112B causes the display unit 86 to terminate the display of the position change induction information 146, and then the panoramic imaging measurement process according to the second embodiment is terminated.

In step 450, the execution unit 112B causes the display unit 86 to terminate the display of the position change induction information 146, and then the process proceeds to step 200 illustrated in FIG. 30.

In step 440 illustrated in FIG. 34, in a case where the imaging measurement termination condition has been satisfied, the determination result is positive, and the panoramic imaging measurement process according to the second embodiment is terminated.

As described above, in the distance measurement device 10B, the fine change induction information 142 is displayed on the display unit 86 (steps 416 and 430).

Therefore, according to the distance measurement device 10B, it is possible to suppress the occurrence of a situation where the measurement unit remeasure a distance to a subject in a state where the position of the imaging range 115 is maintained within the allowable range, as compared to a case where the fine change induction information 142 is not displayed.

In the distance measurement device 10B, the measurement of the measurement unit is executed again in a case where the position of the imaging range 115 within the allowable range has been changed in a state where the fine change induction information 142 is displayed (step 222).

Therefore, according to the distance measurement device 10B, it is possible to cause the measurement unit to remeasure a distance to the subject without requiring time and effort, as compared to a case where the measurement of the measurement unit is not executed again even though the position of the imaging range 115 has been changed within the allowable range in a state where the fine change induction information 142 is displayed.

In the distance measurement device 10B, a measurement success process, which is a process determined in advance as a process executed in a measurement success state where the measurement of the measurement unit has been successful, is further executed by the execution unit 112B in a case where the measurement result acquired by the acquisition unit 110A indicates success in the measurement of the measurement unit.

Here, in the distance measurement device 10B, the measurement success process includes the process of causing the measurement unit to measure a distance to the subject (step 222), in a case where the position of the imaging range 115 has been changed to a position where imaging for a still image is expected to be performed next as imaging for a still image required in panoramic imaging (step 444: Y) and the imaging measurement button 90A is turned on (step 202: Y).

Therefore, according to the distance measurement device 10B, it is possible to cause the measurement unit to measure a distance to the subject at the user's intended timing, in a case where the position of the imaging range 115 has been changed to a position where imaging for a still image is expected to be performed next as imaging for a still image required in panoramic imaging.

Further, in the distance measurement device 10B, the measurement success process includes the process of causing the display unit 86 to display the position change induction information 146 (step 442).

Therefore, according to the distance measurement device 10B, it is possible to change the position of the imaging range 115 to a position where imaging for a still image is expected to be performed next as imaging for a still image required in panoramic imaging, at an appropriate timing, as compared to a case where the process of causing the display unit 86 to display the position change induction information 146 is not included in the measurement success process.

Meanwhile, in the second embodiment, a description has been given of a case where the measurement of the measurement unit is executed in a case where the imaging measurement button 90A is turned on, but the technique of this disclosure is not limited thereto. For example, in a case where the position of the imaging range 115 has been changed to a position where imaging for a still image is expected to be performed next as imaging for a still image required in panoramic imaging (step 444: Y) in a state where the position change induction information 146 is displayed, the measurement of the measurement unit may be started without turning on the imaging measurement button 90A.

Therefore, according to the distance measurement device 10B, it is possible to cause the measurement unit to measure a distance to the subject without requiring time and effort, as compared to a case where the measurement of the measurement unit is not executed even though the position of the imaging range 115 has been changed to a position where imaging for a still image is expected to be performed next as imaging for a still image required in panoramic imaging in a state where the position change induction information 146 is displayed.

In the second embodiment, a description has been given of a case where the process proceeds to step 222 illustrated in FIG. 30 in a case where the processing of step 438 illustrated in FIG. 32 is executed, but the technique of this disclosure is not limited thereto. For example, as illustrated in FIG. 47, steps 660 to 670 may be inserted between step 434 and step 438.

Figure 47:
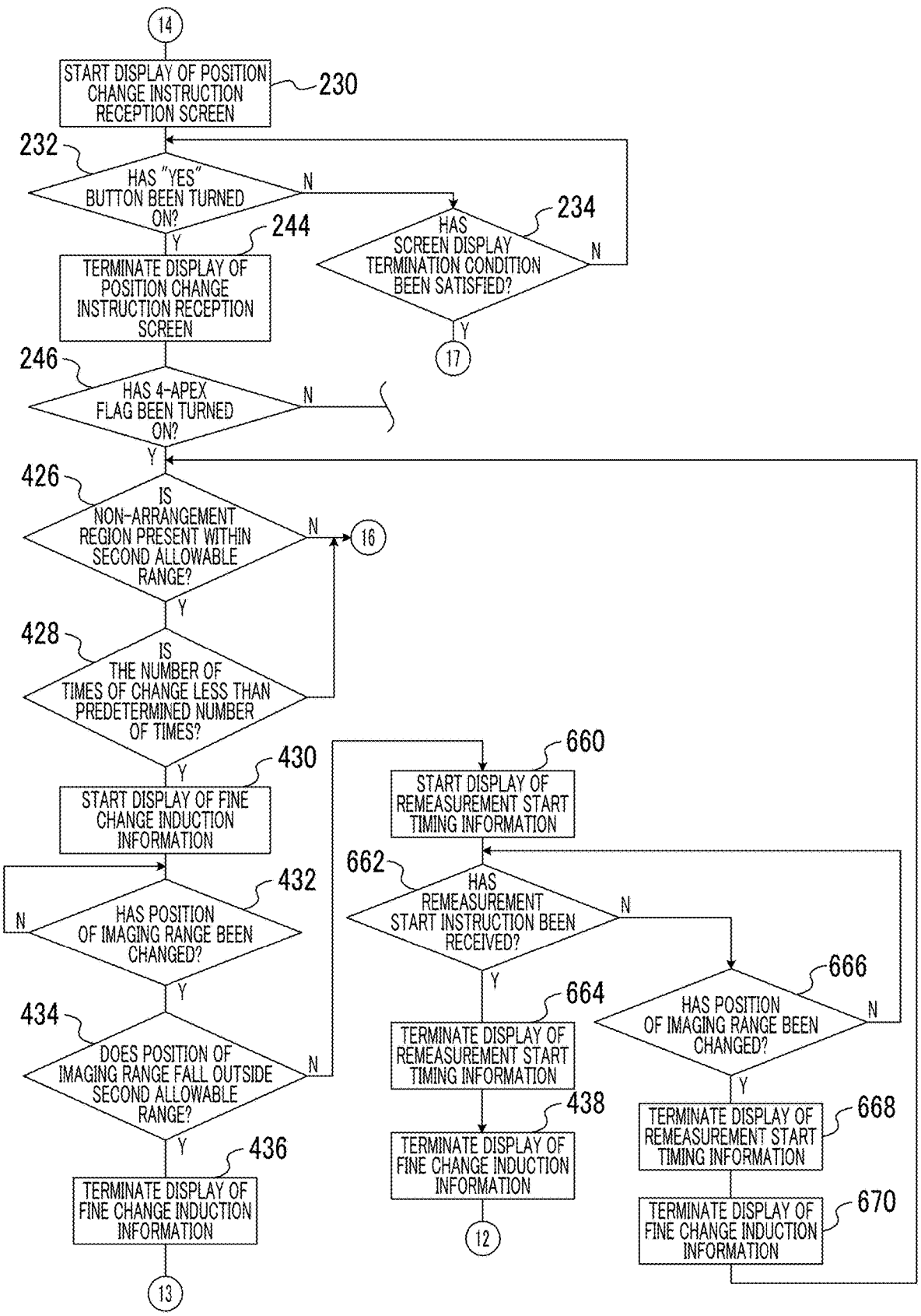
FIG. 47 is a flowchart illustrating a flow (a flow of the processing illustrated in FIG. 32) of a portion of the panoramic imaging measurement process according to a modification example of the second embodiment.

In step 660 illustrated in FIG. 47, the execution unit 112B causes the display unit 86 to start the display of the remeasurement start timing information indicating being a timing when re-execution of the measurement of the measurement unit is started, within the display region of the live view image, and then the process proceeds to step 662. Meanwhile, the processing of step 660 is an example of a second display process according to the technique of this disclosure.

Here, an example of the remeasurement start timing information is a message of "remeasurement timing has arrived". In this manner, any information may be used as long as the information is information for making the user recognize the arrival of the timing of remeasurement. In addition, here, a description has been given of a case where the remeasurement start timing information is visibly displayed, but audible display such as the output of a sound using a sound reproducing device (not shown) or permanent visible display such as the output of printed matter using a printer may be performed instead of the visible display or may be performed in combination.

Meanwhile, the execution unit 112B may cause the display unit 86 to display a reception waiting message indicating being a reception waiting state of the above-described remeasurement start instruction, in addition to the message of "remeasurement timing has arrived". An example of the reception waiting message is a message of "in a case where remeasurement is performed, please perform double-tap operation on touch panel or turn on imaging measurement button".

In step 662, the execution unit 112B determines whether or not the above-described remeasurement start instruction has been received by the touch panel 88 or the reception device 90. In step 662, in a case where the remeasurement start instruction has been received by the touch panel 88 or the reception device 90, the determination result is positive, and the process proceeds to step 664. In step 662, in a case where the remeasurement start instruction has not been received by the touch panel 88 or the reception device 90, the determination result is negative, and the process proceeds to step 666.

In step 664, the execution unit 112B causes the display unit 86 to terminate the display of the remeasurement start timing information, and then the process proceeds to step 438.

In step 666, the execution unit 112B determines whether or not the position of the imaging range 115 has been changed. In step 662, in a case where the position of the imaging range 115 has not been changed, the determination result is negative, and the process proceeds to step 662. In step 666, in a case where the determination result is positive, the process proceeds to step 668.

In step 668, the execution unit 112B causes the display unit 86 to terminate the display of the remeasurement start timing information, and then the process proceeds to step 670.

In step 670, the execution unit 112B causes the display unit 86 to terminate the display of the fine change induction information 142, and then the process proceeds to step 426.

In this manner, in the example illustrated in FIG. 47, the remeasurement start timing information is displayed on the display unit 86 in a case where the position of the imaging range 115 has been changed within the second allowable range in the distance measurement device 10B in a state where the fine change induction information 142 is displayed (step 660). In a case where the remeasurement start instruction has been received (step 662: Y) in a state where the remeasurement start timing information is displayed on the display unit 86, the measurement of the measurement unit is executed again (step 222).

Therefore, according to the example illustrated in FIG. 47, in a case where the position of the imaging range 115 is within the second allowable range, it is possible to cause the measurement unit to remeasure a distance to the subject at the user's intended timing.

Meanwhile, in the example illustrated in FIG. 47, only a case where steps 660 to 670 are inserted between step 434 and step 438 is described, but the technique of this disclosure is not limited thereto. For example, in FIG. 32, steps equivalent to steps 660 to 670 may be inserted between step 420 and step 424. In this case, it is possible to cause the measurement unit to remeasure a distance to the subject at the user's intended timing in a case where the position of the imaging range 115 is within the first allowable range.

Figure 38:
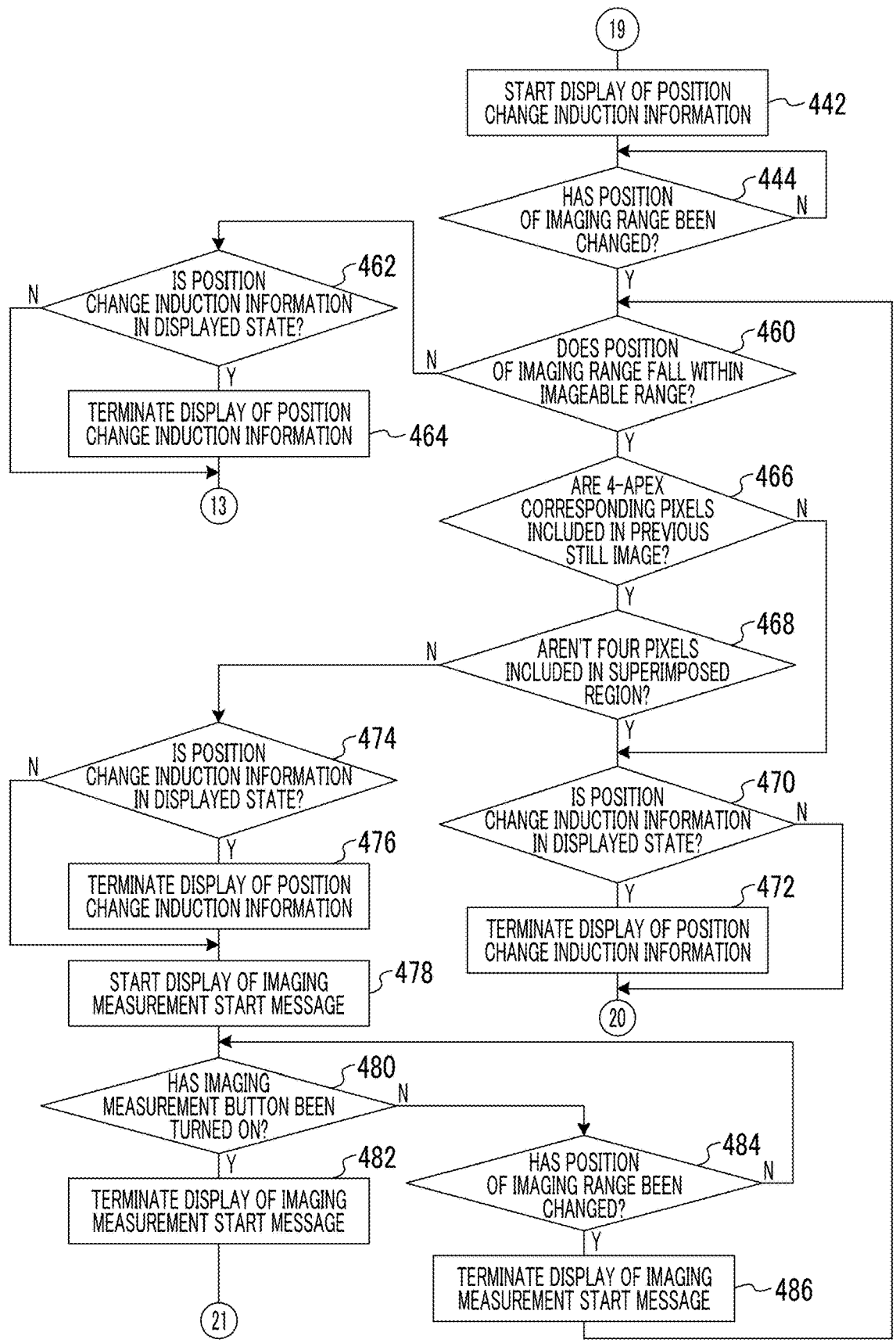
FIG. 38 is a flowchart illustrating a flow (a flow of the processing illustrated in FIG. 35) of a portion of the panoramic imaging measurement process according to a modification example of the second embodiment.

In the second embodiment, a description has been given of a case where the process simply proceeds to step 200 illustrated in FIG. 30 in a case where the execution of the processing of step 450 illustrated in FIG. 35 is terminated, but the technique of this disclosure is not limited thereto. As illustrated in FIG. 38 as an example, steps 460 to 486 may be applied instead of steps 446 to 450 illustrated in FIG. 35. Meanwhile, in a case where steps 460 to 486 illustrated in FIG. 38 are applied instead of steps 446 to 450 illustrated in FIG. 35, steps 256 and 258 illustrated in FIG. 30 may be left as they are or may be removed.

In step 460 illustrated in FIG. 38, the execution unit 112B determines whether or not the position of the imaging range 115 falls within an imageable range. In step 460, in a case where the position of the imaging range 115 falls outside the imageable range, the determination result is negative, and the process proceeds to step 462. In step 460, in a case where the position of the imaging range 115 falls within the imageable range, the determination result is positive, and the process proceeds to step 466.

In step 462, the execution unit 112B determines whether or not the position change induction information 146 is in a displayed state. In step 462, in a case where the position change induction information 146 is in a displayed state, the determination result is positive, and the process proceeds to step 464. In step 462, in a case where the position change induction information 146 is not in a displayed state, the determination result is negative, and the panoramic imaging measurement process is terminated.

In step 464, the execution unit 112B causes the display unit 86 to terminate the display of the position change induction information 146, and then the panoramic imaging measurement process is terminated.

In step 466, the execution unit 112B determines whether or not the 4-apex corresponding pixels described in the first embodiment are included in the previous still image described in the first embodiment. In step 466, in a case where the 4-apex corresponding pixels are not included in the previous still image, the determination result is negative, and the process proceeds to step 470. In step 466, in a case where the 4-apex corresponding pixels are included in the previous still image, the determination result is positive, and the process proceeds to step 468.

In step 468, the execution unit 112B determines whether or not four pixels corresponding to the 4-apex corresponding pixels included in the previous still image are present in the superimposed region described in the first embodiment. In step 468, in a case where four pixels corresponding to the 4-apex corresponding pixels included in the previous still image are not present in the superimposed region, the determination result is positive, and the process proceeds to step 470. In step 468, in a case where four pixels corresponding to the 4-apex corresponding pixels included in the previous still image are present in the superimposed region, the determination result is negative, and the process proceeds to step 474.

In step 470, the execution unit 112B determines whether or not the position change induction information 146 is in a displayed state. In step 470, in a case where the position change induction information 146 is in a displayed state, the determination result is positive, and the process proceeds to step 472. In step 470, in a case where the position change induction information 146 is not in a displayed state, the determination result is negative, and the process proceeds to step 200 illustrated in FIG. 30.

In step 472, the execution unit 112B causes the display unit 86 to terminate the display of the position change induction information 146, and then the process proceeds to step 200 illustrated in FIG. 30.

In step 474, the execution unit 112B determines whether or not the position change induction information 146 is in a displayed state. In step 474, in a case where the position change induction information 146 is in a displayed state, the determination result is positive, and the process proceeds to step 476. In step 474, in a case where the position change induction information 146 is not in a displayed state, the determination result is negative, and the process proceeds to step 478.

In step 476, the execution unit 112B causes the display unit 86 to terminate the display of the position change induction information 146, and then the process proceeds to step 478.

In step 478, the execution unit 112B causes the display unit 86 to start the display of an imaging measurement start message 134 within a display region of a live view image as illustrated in FIG. 19 as an example, and then the process proceeds to step 480.

Meanwhile, the processing of step 478 is an example of fourth and fifth display processes according to the technique of this disclosure. In the step 478, the imaging measurement start message 134 is described. However, the technique of this disclosure is not limited thereto, and any information may be adopted as long as the information is imaging start timing information which is information indicating a timing when the imaging of a subject is started.

In step 480, the execution unit 112B determines whether or not an imaging measurement button 90A has been turned on. In step 480, in a case where the imaging measurement button 90A has not been turned on, the determination result is negative, and the process proceeds to step 484. In step 480, in a case where the imaging measurement button 90A has been turned on, the determination result is positive, and the process proceeds to step 482. Meanwhile, a case where the determination result in step 480 is positive is an example of "a case where an instruction for starting the measurement of the measurement unit is received in a state where measurement start timing information is displayed" according to the technique of this disclosure.

In step 482, the execution unit 112B causes the display unit 86 to terminate the display of the imaging measurement start message 134, and then the process proceeds to step 260 illustrated in FIG. 30.

In step 484, the execution unit 112B determines whether or not the position of the imaging range 115 has been changed. In step 484, in a case where the position of the imaging range 115 has not been changed, the determination result is negative, and the process proceeds to step 480. In step 484, in a case where the position of the imaging range 115 has been changed, the determination result is positive, and the process proceeds to step 486.

In step 486, the execution unit 112B causes the display unit 86 to terminate the display of the imaging measurement start message 134, and then the process proceeds to step 460.

As described above, according to the example illustrated in FIG. 38, in a case where the position of the imaging range 115 has been changed to a position where imaging for a still image is expected to be performed next as imaging for a still image required in panoramic imaging, it is possible to cause the measurement unit to measure a distance to a subject at the user's intended timing.

In addition, according to the example illustrated in FIG. 38, it is possible to easily make the user recognize a timing when a captured image contributing to high-precision projection conversion, that is, a captured image including four pixels corresponding to 4-apex corresponding pixels can be acquired, as compared to a case where the imaging measurement start message 134 is not displayed.

In the second embodiment, the distance measurement device 10B has been described. However, the technique of this disclosure is not limited thereto, and a distance measurement device 10C may be adopted instead of the distance measurement device 10B, as illustrated in FIGS. 1 and 39 as an example.

Figure 39:
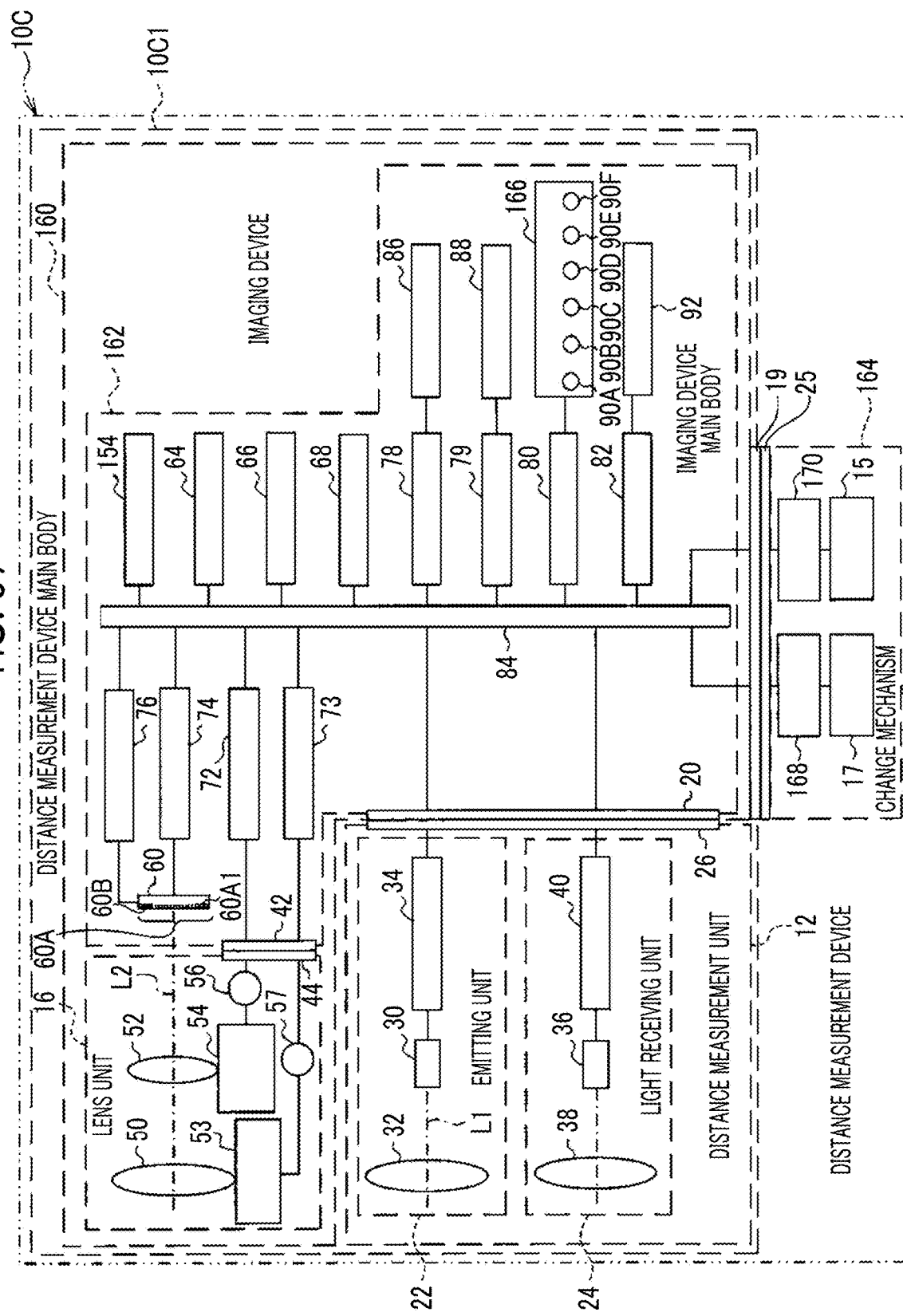
FIG. 39 is a block diagram illustrating a hardware configuration of the distance measurement device according to a first modification example of the second embodiment.

As illustrated in FIGS. 1 and 39 as an example, the distance measurement device 10C is different from the distance measurement device 10B in that the distance measurement device 10C includes a distance measurement device main body 10C1 instead of the distance measurement device main body 10B1 and includes a change mechanism 164 instead of the change mechanism 11. The distance measurement device main body 10C1 is different from the distance measurement device main body 10B1 in that the distance measurement device main body 10C1 includes an imaging device 160 instead of the imaging device 150. The imaging device 160 is different from the imaging device 150 in that the imaging device 160 includes an imaging device main body 162 instead of the imaging device main body 152.

As illustrated in FIG. 39 as an example, the imaging device main body 162 is different from the imaging device main body 152 in that the imaging device main body 162 includes a reception device 166 instead of the reception device 90. The reception device 166 is different from the reception device 90 in that the reception device 166 does not include the rotary switch for vertical rotation 90G and the rotary switch for horizontal rotation 90H. In addition, the imaging device main body 162 is different from the imaging device main body 152 in that the imaging device main body 162 does not include the motor drivers 29 and 31.

As illustrated in FIG. 39 as an example, the change mechanism 164 is different from the change mechanism 11 in that the change mechanism 164 includes a rotary encoder 168 instead of the motor 21, and includes a rotary encoder 170 instead of the motor 23.

The rotary encoder 168 is connected to a horizontal rotation mechanism 17. In addition, the rotary encoder 168 is connected to a bus line 84 through a connector 25 and a hot shoe 19. The rotary encoder 168 detects the rotation direction and the amount of rotation of a vertical rotation mechanism 15 rotated by the horizontal rotation mechanism 17. The main control unit 154 acquires the rotation direction and the amount of rotation which are detected by the rotary encoder 168.

The rotary encoder 170 is connected to the vertical rotation mechanism 15. In addition, the rotary encoder 170 is connected to the bus line 84 through the connector 25 and the hot shoe 19. The rotary encoder 170 detects the rotation direction and the amount of rotation of the distance measurement device main body 10C1 which is rotated by the vertical rotation mechanism 15. The main control unit 154 acquires the rotation direction and the amount of rotation which are detected by the rotary encoder 170.

In the distance measurement device 10B, the rotation direction and the amount of rotation of the vertical rotation mechanism 15 are specified on the basis of the rotation direction and the amount of rotation of the motor 23, and the rotation direction and the amount of rotation of the horizontal rotation mechanism 17 are specified on the basis of the rotation direction and the amount of rotation of the motor 21. On the other hand, in the distance measurement device 10C, the rotation direction and the amount of rotation of the vertical rotation mechanism 15 are specified on the basis of detection results of the rotary encoder 170, and the rotation direction and the amount of rotation of the horizontal rotation mechanism 17 are specified on the basis of detection results of the rotary encoder 168. Also in the distance measurement device 10C, position specification information is derived on the basis of the rotation directions and the amounts of rotation of the vertical rotation mechanism 15 and the horizontal rotation mechanism 17, similar to the distance measurement device 10B.

Figure 40:
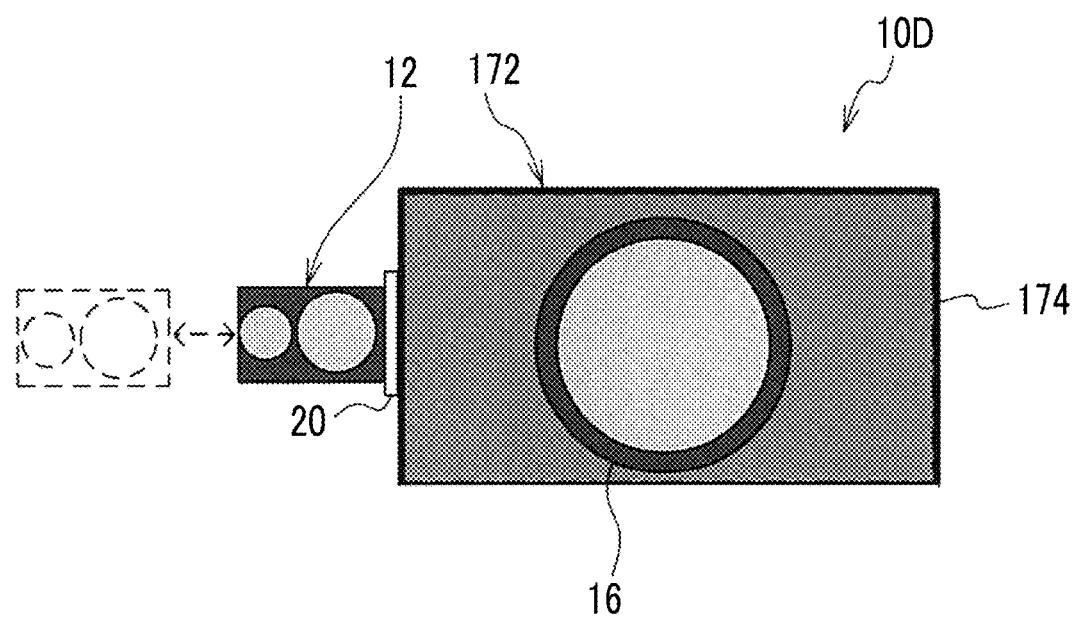
FIG. 40 is a front view illustrating the appearance of the distance measurement device according a second modification example of the second embodiment.
Figure 41:
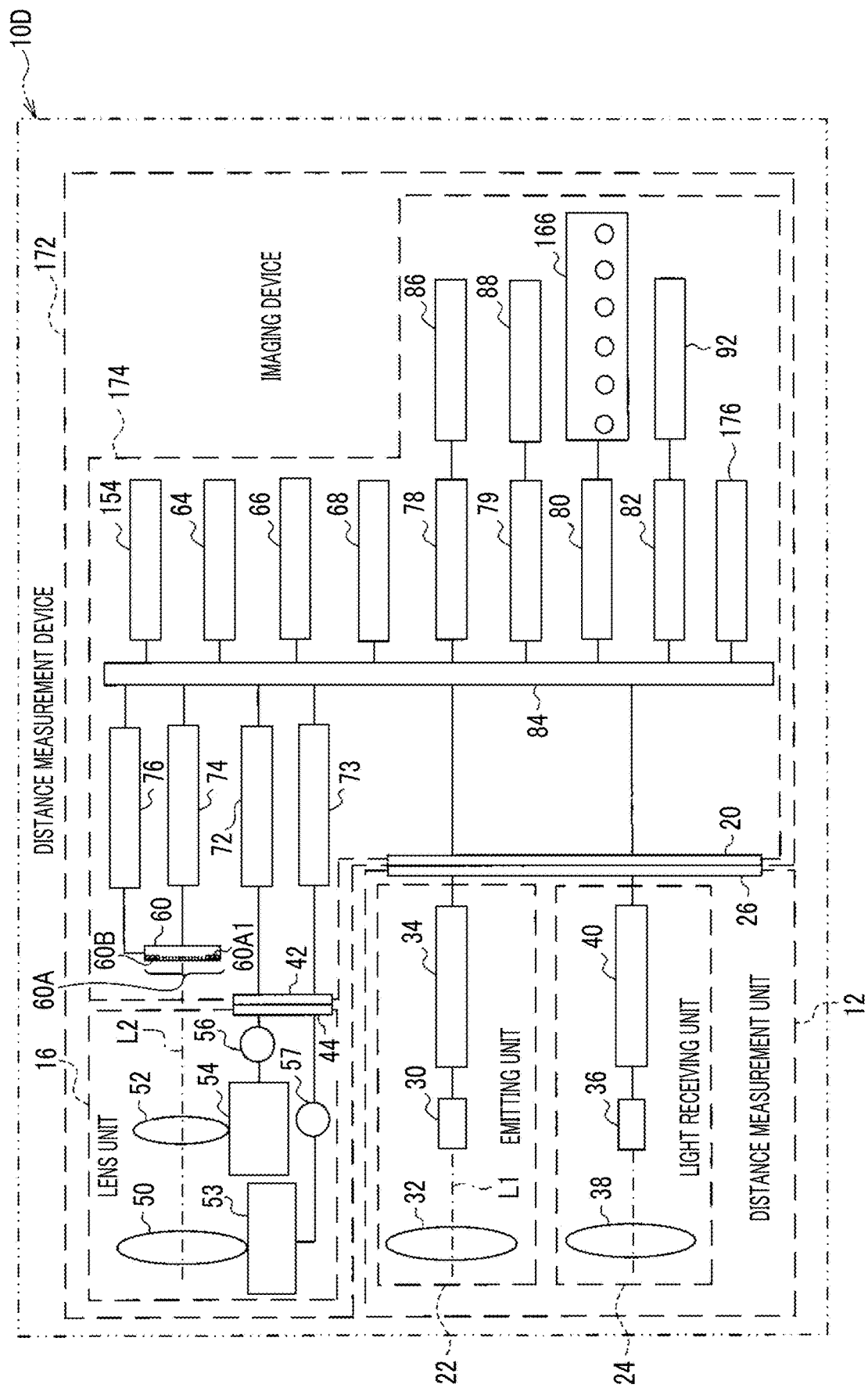
FIG. 41 is a block diagram illustrating an example of a hardware configuration of the distance measurement device illustrated in FIG. 40.

In the distance measurement device 10C illustrated in FIG. 39, position specification information is derived on the basis of detection results of the rotary encoders 168 and 170. However, the technique of this disclosure is not limited thereto, and a distance measurement device 10D illustrated in FIGS. 40 and 41 as an example may be adopted instead of the distance measurement device 10C. As illustrated in FIGS. 40 and 41 as an example, the distance measurement device 10D is different from the distance measurement device 10C in that the distance measurement device 10D includes a change mechanism 164. In addition, the distance measurement device 10D is different from the distance measurement device 10C in that the distance measurement device 10D includes an imaging device 172 instead of the imaging device 160. The imaging device 172 is different from the imaging device 160 in that the imaging device 172 includes an imaging device main body 174 instead of the imaging device main body 162. The imaging device main body 174 is different from the imaging device main body 162 in that the imaging device main body 174 includes a gyro sensor 176. The gyro sensor 176 is connected to the bus line 84, and detection results of the gyro sensor 176 are acquired by the main control unit 154.

The distance measurement device 10D is different from the distance measurement device 10C in that position specification information is derived on the basis of detection results of the rotary encoders 168 and 170 in the distance measurement device 10C, while position specification information is derived on the basis of detection results of the gyro sensor 176 in the distance measurement device 10D.

Third Embodiment

In the first embodiment, a description has been given of a case where the distance measurement device 10A is realized by the distance measurement unit 12 and the imaging device 14, but a distance measurement device 10E realized by further including a smart device 500 will be described in a third embodiment. Meanwhile, in the third embodiment, the same components as those described in the above-described embodiments will be denoted by the same reference numerals and signs, a description thereof will be omitted, and only differences from the above-described embodiments will be described.

Figure 42:
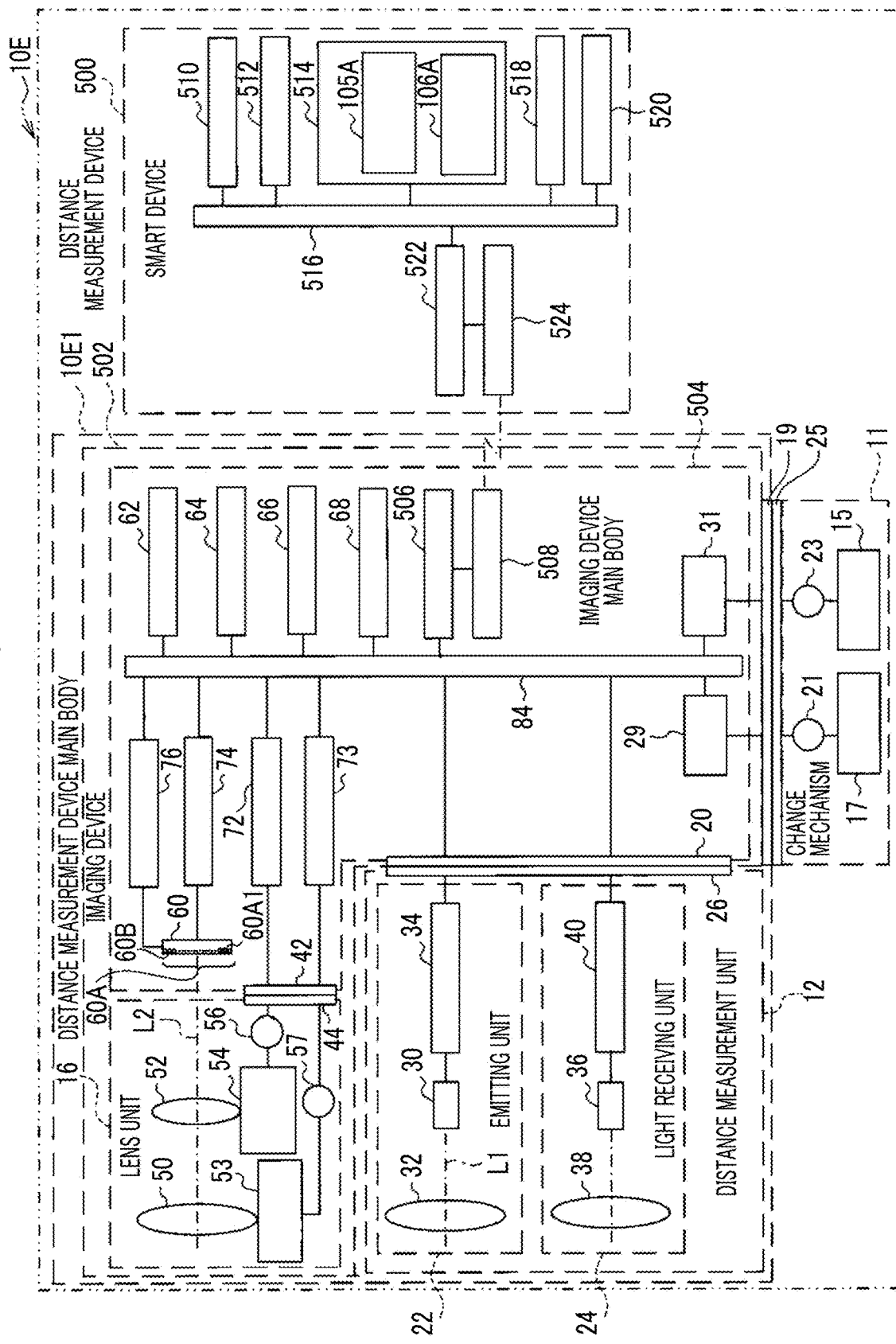
FIG. 42 is a block diagram illustrating an example of a hardware configuration of the distance measurement device according to the third embodiment.

As illustrated in FIG. 42 as an example, a distance measurement device 10E according to the third embodiment is different from the distance measurement device 10A according to the first embodiment in that the distance measurement device 10E includes a distance measurement device main body 10E1 instead of the distance measurement device main body 10A1, and includes the smart device 500. Meanwhile, the smart device 500 is an example of an information processing device according to the technique of this disclosure. In the third embodiment, the smart device 500 is described, but a Personal Computer (PC) may be adopted instead of the smart device.

The distance measurement device main body 10E1 is different from the distance measurement device main body 10A1 in that the distance measurement device main body 10E1 includes an imaging device 502 instead of the imaging device 14. The imaging device 502 is different from the imaging device 14 in that the imaging device 502 includes an imaging device main body 504 instead of the imaging device main body 18.

The imaging device main body 504 is different from the imaging device main body 18 in that the imaging device main body 504 includes a radio communication unit 506 and a radio communication antenna 508.

The radio communication unit 506 is connected to the bus line 84 and the radio communication antenna 508. The main control unit 62 outputs transmission target information, which is information to be transmitted to the smart device 500, to the radio communication unit 506.

The radio communication unit 506 transmits the transmission target information which is input from the main control unit 62 to the smart device 500 through the radio communication antenna 508 by radio waves. In a case where radio waves from the smart device 500 are received by the radio communication antenna 508, the radio communication unit 506 acquires a signal based on the received radio waves and outputs the acquired signal to the main control unit 62.

The smart device 500 includes a CPU 510, a primary storage unit 512, and a secondary storage unit 514. The CPU 510, the primary storage unit 512, and the secondary storage unit 514 are connected to the bus line 516.

The CPU 510 controls the entire distance measurement device 10E inclusive of the smart device 500. The primary storage unit 512 is a volatile memory which is used as a work area or the like during the execution of various programs. An example of the primary storage unit 512 is a RAM. The secondary storage unit 514 is a non-volatile memory that stores, in advance, a control program, various parameters, or the like for controlling the overall operation of the distance measurement device 10E, inclusive of the smart device 500. An example of the secondary storage unit 514 is a flash memory or an EEPROM.

The smart device 500 includes a display unit 518, a touch panel 520, a radio communication unit 522, and a radio communication antenna 524.

The display unit 518 is connected to the bus line 516 through a display control unit (not shown), and displays various pieces of information under the control of the display control unit. Meanwhile, the display unit 518 is realized by, for example, an LCD.

The touch panel 520 is superimposed on a display screen of the display unit 518, and receives a touch of an indicator. The touch panel 520 is connected to the bus line 516 through a touch panel I/F (not shown), and outputs positional information indicating a position touched by the indicator to the touch panel I/F. The touch panel I/F operates the touch panel I/F in accordance with an instruction of the CPU 510, and outputs the positional information which is input from the touch panel 520 to the CPU 510.

Soft keys corresponding to the imaging measurement button 90A, the imaging system operation mode switching button 90B, the wide angle instruction button 90C, the telephoto instruction button 90D, the panoramic imaging measurement button 90E, the dimension derivation button 90F, and the like are displayed on the display unit 518 (see FIG. 41).

Figure 43:
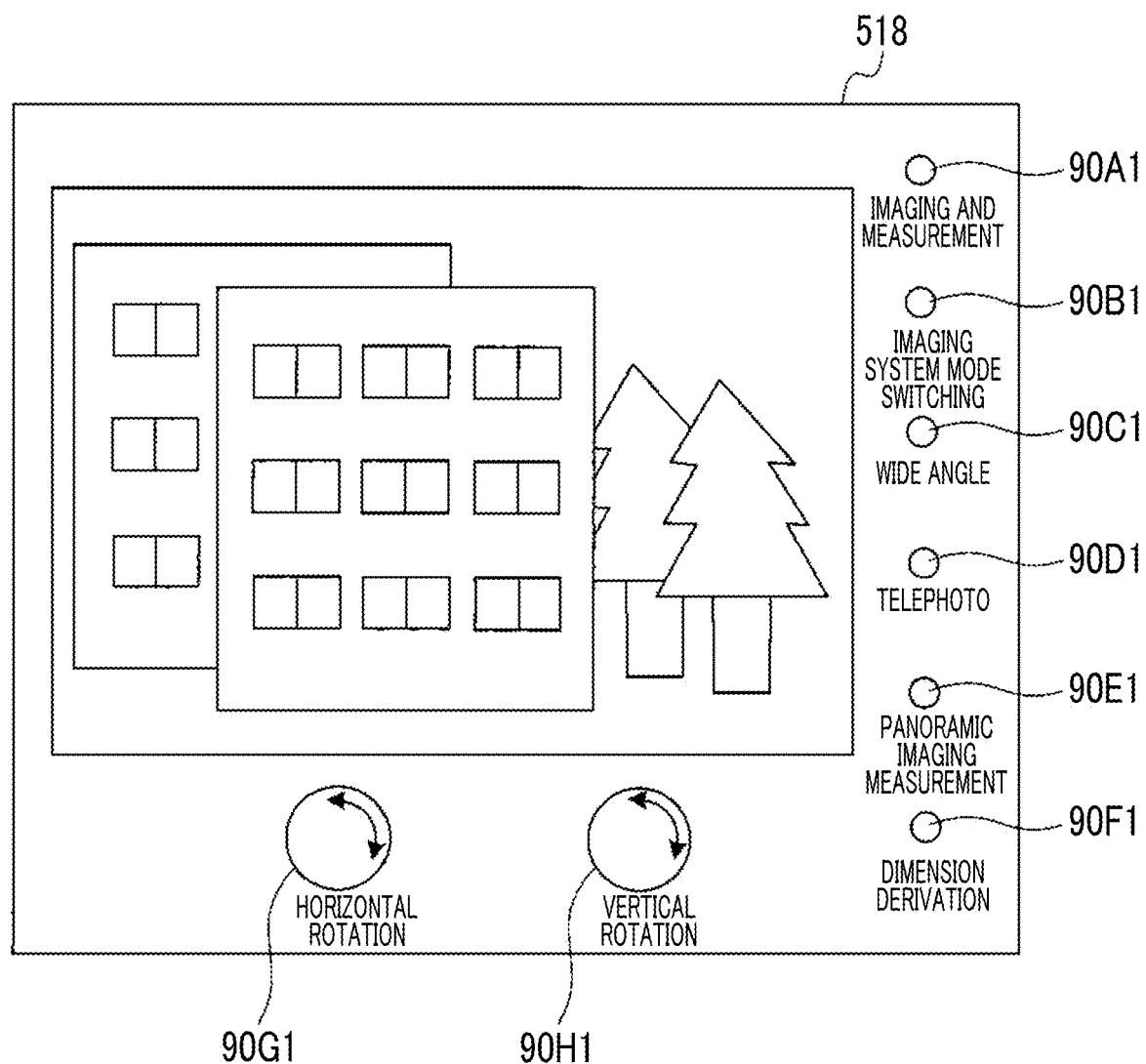
FIG. 43 is a screen view illustrating an example of a screen including various buttons displayed as soft keys on a display unit of a smart device included in the distance measurement device according to the third embodiment.

For example, as illustrated in FIG. 43, an imaging measurement button 90A1 functioning as the imaging measurement button 90A is displayed on the display unit 518 as a soft key, and is pressed down by the user through the touch panel 520. In addition, for example, an imaging button (not shown) functioning as the imaging button described in the first embodiment is displayed on the display unit 518 as a soft key, and is pressed down by the user through the touch panel 520. In addition, for example, an imaging system operation mode switching button 90B1 functioning as the imaging system operation mode switching button 90B is displayed on the display unit 518 as a soft key, and is pressed down by the user through the touch panel 520.

In addition, for example, a wide angle instruction button 90C1 functioning as the wide angle instruction button 90C is displayed on the display unit 518 as a soft key, and is pressed down by the user through the touch panel 520. Further, for example, a telephoto instruction button 90D1 functioning as the telephoto instruction button 90D is displayed on the display unit 518 as a soft key, and is pressed down by the user through the touch panel 520.

In addition, for example, a panoramic imaging measurement button 90E1 functioning as the panoramic imaging measurement button 90E is displayed on the display unit 518 as a soft key, and is pressed down by the user through the touch panel 520. In addition, for example, a dimension derivation button 90F1 functioning as the dimension derivation button 90F is displayed on the display unit 518 as a soft key, and is pressed down by the user through the touch panel 520.

As illustrated in FIG. 43 as an example, a touch pad for vertical rotation 90G1 and a touch pad for horizontal rotation 90H1 are displayed on the display unit 518.

The touch pad for vertical rotation 90G1 is a circular touch pad functioning as the rotary switch for vertical rotation 90G. As illustrated in FIG. 43 as an example, the amount of rotation and the rotation direction of the vertical rotation mechanism 15 are determined by an arc-shaped trajectory being drawn on the inner side of the display region of the touch pad for vertical rotation 90G1 through the touch panel 520.

That is, the amount of rotation of the vertical rotation mechanism 15 is determined in accordance with the length of the trajectory drawn on the inner side of the display region of the touch pad for vertical rotation 90G1. Here, the length of the trajectory drawn on the inner side of the display region of the touch pad for vertical rotation 90G1 corresponds to, for example, the amount of sliding of an indicator (for example, the user's finger) which is slid in a state where the indicator is in contact with the touch panel 520.

In addition, the rotation direction of the vertical rotation mechanism 15 is determined in accordance with a direction (in the example illustrated in FIG. 43, a direction of an arrow G) in which the trajectory is drawn on the inner side of the display region of the touch pad for vertical rotation 90G1. Here, the direction in which the trajectory is drawn on the inner side of the display region of the touch pad for vertical rotation 90G1 corresponds to, for example, a sliding direction of the indicator which is slid in a state where the indicator is in contact with the touch panel 520.

The touch pad for horizontal rotation 90H1 is a circular touch pad functioning as the rotary switch for horizontal rotation 90H. As illustrated in FIG. 43 as an example, the amount of rotation and the rotation direction of the horizontal rotation mechanism 17 are determined by an arc-shaped trajectory being drawn on the inner side of the display region of the touch pad for horizontal rotation 90H1 through the touch panel 520.

That is, the amount of rotation of the horizontal rotation mechanism 17 is determined in accordance with the length of the trajectory drawn on the inner side of the display region of the touch pad for horizontal rotation 90H1. Here, the length of the trajectory drawn on the inner side of the display region of the touch pad for horizontal rotation 90H1 corresponds to, for example, the amount of sliding of an indicator which is slid in a state where the indicator is in contact with the touch panel 520.

In addition, the rotation direction of the horizontal rotation mechanism 17 is determined in accordance with a direction (in the example illustrated in FIG. 43, a direction of an arrow H) in which the trajectory is drawn on the inner side of the display region of the touch pad for horizontal rotation 90H1. Here, the direction in which the trajectory is drawn on the inner side of the display region of the touch pad for horizontal rotation 90H1 corresponds to, for example, a sliding direction of the indicator which is slid in a state where the indicator is in contact with the touch panel 520.

The radio communication unit 522 is connected to the bus line 516 and the radio communication antenna 524. The radio communication unit 522 transmits a signal, which is input from the CPU 510, to the imaging device main body 504 through the radio communication antenna 524 by radio waves. In a case where radio waves from the imaging device main body 504 are received by the radio communication antenna 524, the radio communication unit 522 acquires a signal based on the received radio waves and outputs the acquired signal to the CPU 510. Therefore, the imaging device main body 504 is controlled by the smart device 500 by radio communication performed between the smart device 500 and the imaging device main body 504.

The secondary storage unit 514 stores the panoramic imaging measurement program 105A and a dimension derivation program 106A. The CPU 510 reads out the panoramic imaging measurement program 105A from the secondary storage unit 514 and develops the read-out panoramic imaging measurement program to the primary storage unit 512 to execute the panoramic imaging measurement program 105A. In addition, the CPU 510 reads out the dimension derivation program 106A from the secondary storage unit 514 and develops the read-out dimension derivation program 106A to the primary storage unit 512 to execute the dimension derivation program 106A.

The CPU 510 executes the panoramic imaging measurement program 105A to be operated as the acquisition unit 110A and the execution unit 112A. In addition, the CPU 510 executes the dimension derivation program 106A, and thus the dimension derivation process described in the first embodiment is realized.

Therefore, in the distance measurement device 10E, the smart device 500 executes the panoramic imaging measurement program 105A and the dimension derivation program 106A, and thus the same operations and effects as those in the above-described embodiments are obtained.

Figure 44:
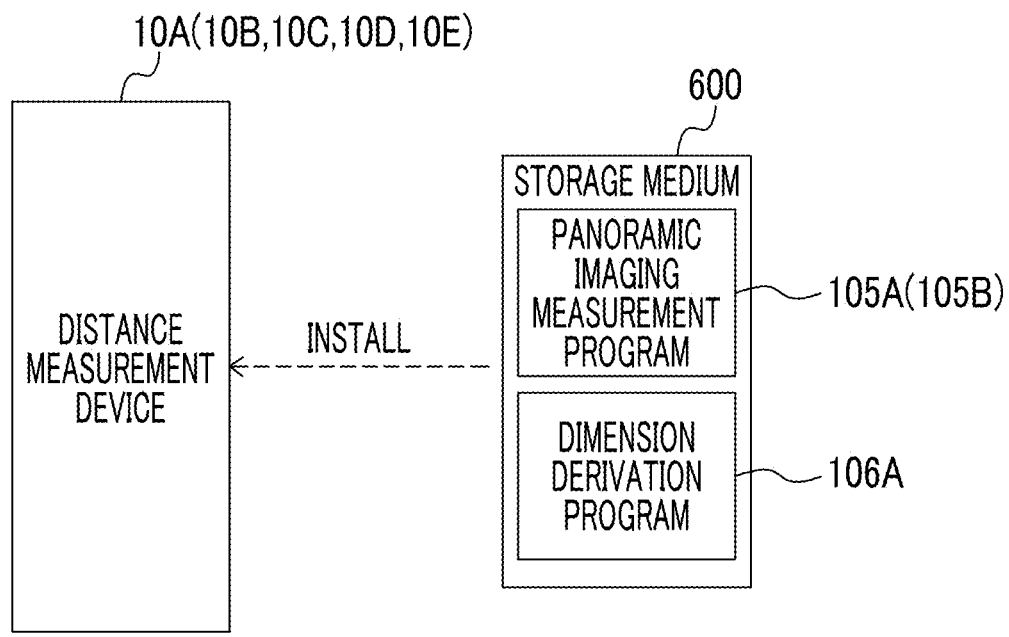
FIG. 44 is a conceptual diagram illustrating an example of a mode in which a panoramic imaging measurement program and a dimension derivation program according to the first to third embodiments are installed in the distance measurement device.

Meanwhile, in the above-described embodiments, a description has been given of a case where the panoramic imaging measurement program 105A (105B) and the dimension derivation program 106A (hereinafter, simply referred to as a "program") are read out from the secondary storage unit 104 (514), but this is just an example. For example, as illustrated in FIG. 44, the programs may be first stored in any portable storage medium 600 such as a Solid State Drive (SSD) or a Universal Serial Bus (USB) memory. In this case, the programs stored in the storage medium 600 are installed in the distance measurement device 10A (10B, 10C, 10D, 10E) (hereinafter, referred to as the "distance measurement device 10A or the like"), and the installed programs are executed by the CPU 100 (510).

In addition, the programs may be stored in a storage unit of another computer or a server device which is connected to the distance measurement device 10A or the like through a communication network (not shown), and the programs may be downloaded in accordance with a request of the distance measurement device 10A or the like. In this case, a downloaded derivation program is executed by the CPU 100 (510).

In the above-described embodiments, a description has been given of a case where various pieces of information such as a panoramic image, the length of an area, and various messages are displayed on the display unit 86, but the technique of this disclosure is not limited thereto. For example, various pieces of information may be displayed on a display unit of an external device which is used by being connected to the distance measurement device 10A or the like. An example of the external device is a PC or a spectacle type or wristwatch type wearable terminal device.

In the above-described embodiments, a description has been given of a case where various pieces of information such as a panoramic image, the length of an area, and various messages are displayed on the display unit 86, but the technique of this disclosure is not limited thereto. For example, at least one of the imaging measurement start message 134, the fine change induction information 142, the position change induction information 146, and the like may be displayed on a display unit (not shown) different from the display unit 86, and the rest may be displayed on the display unit 86. In addition, the imaging measurement start message 134, the fine change induction information 142, the position change induction information 146, and the like may be individually displayed on a plurality of display units including the display unit 86.

In the above-described embodiments, a laser beam has been described as light for distance measurement. However, the technique of this disclosure is not limited thereto, and the light for distance measurement may be directional light having directivity. For example, the light for distance measurement may be directional light obtained by a Light Emitting Diode (LED), a Super Luminescent Diode (SLD), or the like. It is preferable that directivity of the directional light is the same degree of directivity as that of the directivity of the laser beam and is usable in distance measurement, for example, within a range between several meters and several kilometers.

In addition, the panoramic imaging measurement process and the dimension derivation process described in the above-described embodiments are just examples. Therefore, it is needless to say that the deletion of unnecessary steps, the addition of new steps, and the change of processing order may be performed without departing from the scope of the invention. In addition, each processing included in the panoramic imaging measurement process and the dimension derivation process may be realized only by a hardware configuration such as ASIC, or may be realized by a combination of a software configuration and a hardware configuration using a computer.

Figure 45:
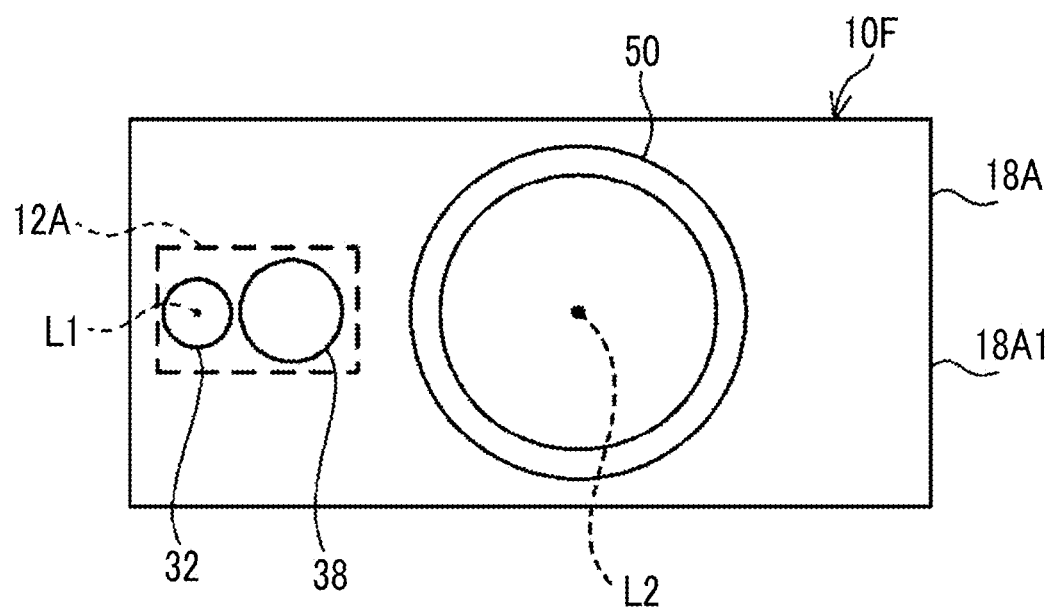
FIG. 45 is a front view illustrating the appearance of the distance measurement device main body according to a modification example of the first embodiment.

In the above-described embodiments, for convenience of description, a description has been given of a case where the distance measurement unit 12 is mounted on the side surface of the imaging device main body 18 included in the distance measurement device 10A and the like, but the technique of this disclosure is not limited thereto. For example, the distance measurement unit 12 may be mounted on the upper surface or the lower surface of the imaging device main body 18. In addition, for example, as illustrated in FIG. 45, a distance measurement device 10F may be applied instead of the distance measurement device 10A and the like. As illustrated in FIG. 45 as an example, the distance measurement device 10F is different from the distance measurement device 10A and the like in that a distance measurement unit 12A is provided instead of the distance measurement unit 12 and an imaging device main body 18A is provided instead of the imaging device main body 18.

In the example illustrated in FIG. 45, the distance measurement unit 12A is accommodated in a housing 18A1 of the imaging device main body 18A, and objective lenses 32 and 38 are exposed from the housing 18A1 on the front side (a side where the focusing lens 50 is exposed) of the distance measurement device 10E. In addition, it is preferable that the distance measurement unit 12A is disposed such that optical axes L1 and L2 are set to be at the same height in the vertical direction. Meanwhile, an opening (not shown) through which the distance measurement unit 12A can be inserted into and removed from the housing 18A1 may be formed in the housing 18A1.

All the documents, patent applications, and technical specifications described in the present specification are incorporated into the present specification by reference, to the same extent as in a case where the individual documents, patent applications, and technical specifications were specifically and individually described as being incorporated by reference.

With regard to the above-described embodiments, the following appendixes will be further disclosed.

APPENDIX 1

An information processing device comprising:
a processor; and
a memory storing instructions, which when executed by the processor perform a procedure, the procedure including:
acquiring measurement success/failure information indicating whether or not measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light; and
executing a remeasurement process of causing the measurement unit to remeasure the distance to the subject in a state where a position of the designated imaging range has been changed within an allowable range in which the panoramic imaging is executable, in a case where the acquired measurement success/failure information indicates that the measurement of the measurement unit has not been successful.

APPENDIX 2

The information processing device according to Appendix 1, wherein the processor is a circuitry.

What is claimed is:

1. An information processing device comprising:
an acquisition unit that acquires measurement success/failure information indicating whether measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light; and
an execution unit that executes a remeasurement process of causing the measurement unit to remeasure the distance to the subject in a state where a position of the designated imaging range has been changed within an allowable range in which the panoramic imaging is executable, in a case where the measurement success/failure information acquired by the acquisition unit indicates that the measurement of the measurement unit has not been successful,
wherein the execution unit further executes a derivation process of deriving a dimension of a real space region corresponding to an interval between a plurality of pixels designated within a panoramic image obtained by performing the panoramic imaging, on the basis of the distance to the subject which is measured by the measurement unit, and the interval.

2. The information processing device according to claim 1,
wherein the remeasurement process is a process including a first movement process of moving the position of the designated imaging range within the allowable range by operating a first change mechanism including a first power source and changing an imaging direction in accordance with power generated by the first power source.

3. The information processing device according to claim 2,
wherein the remeasurement process is a process including the process of causing the measurement unit to remeasure the distance to the subject, in a case where the position of the designated imaging range is moved within the allowable range by executing the first movement process by the execution unit.

4. The information processing device according to claim 3,
wherein the remeasurement process is a process including the process of causing the measurement unit to remeasure the distance to the subject, in a case where the position of the designated imaging range is moved within the allowable range by executing the first movement process by the execution unit and an instruction for starting the measurement of the measurement unit has been received.

5. The information processing device according to claim 1,
wherein the remeasurement process is a process including a first display process of displaying first induction information for inducing the change of the position of the designated imaging range within the allowable range on a first display unit.

6. The information processing device according to claim 5,
wherein the remeasurement process further includes a second display process of displaying remeasurement start timing information indicating a timing when the remeasurement of the measurement unit is started, on a second display unit in a case where the position of the designated imaging range has been changed within the allowable range in a state where the first induction information is displayed on the first display unit, and is a process including the process of causing the measurement unit to remeasure the distance to the subject, in a case where an instruction for starting the measurement of the measurement unit is received in a state where the remeasurement start timing information is displayed.

7. The information processing device according to claim 5,
wherein the remeasurement process is a process including a process of causing the measurement unit to remeasure the distance to the subject, in a case where the position of the designated imaging range has been changed within the allowable range in a state where the first induction information is displayed.

8. The information processing device according to claim 1,
wherein in a case where the measurement success/failure information acquired by the acquisition unit indicates that the measurement of the measurement unit has been successful, a measurement success process which is determined in advance as a process executed in a measurement success state where the measurement of the measurement unit has been successful is further executed.

9. The information processing device according to claim 8,
wherein the measurement success process is a process including the process of causing the measurement unit to measure the distance to the subject, in a case where the position of the designated imaging range has been changed to a position where next imaging in the panoramic imaging is expected to be performed.

10. The information processing device according to claim 9,
wherein the measurement success process is a process including a second movement process of moving the position of the designated imaging range to the position where next imaging in the panoramic imaging is expected to be performed, by operating a second change mechanism including a second power source and changing an imaging direction in accordance with power generated by the second power source.

11. The information processing device according to claim 9,
wherein the measurement success process is a process including the process of causing the measurement unit to measure the distance to the subject, in a case where the position of the designated imaging range has been changed to the position where next imaging in the panoramic imaging is expected to be performed and the instruction for starting the measurement of the measurement unit has been received.

12. The information processing device according to claim 8,
wherein the measurement success process is a process including a third display process of displaying second induction information for inducing the change of the position of the designated imaging range to the position where next imaging in the panoramic imaging is expected to be performed, on a third display unit.

13. The information processing device according to claim 12,
wherein the measurement success process is a process that includes a fourth display process of displaying measurement start timing information indicating a timing when the measurement of the measurement unit is started, on a fourth display unit in a case where the position of the designated imaging range has been changed to the position where next imaging in the panoramic imaging is expected to be performed, in a state where the second induction information is displayed on the third display unit, and includes the process of causing the measurement unit to measure the distance to the subject in a case where the instruction for starting the measurement of the measurement unit has been received in a state where the measurement start timing information is displayed.

14. The information processing device according to claim 12,
wherein the measurement success process is a process including the process of causing the measurement unit to measure the distance to the subject in a case where the position of the designated imaging range is changed to the position where next imaging in the panoramic imaging is expected to be performed, in a state where the second induction information is displayed on the third display unit.

15. The information processing device according to claim 1,
wherein in a case where first multi-apex pixels which are at least four or more pixels for defining apexes of a polygon are included in a first captured image obtained by imaging the subject within one imaging range of which imaging is first performed, among certain adjacent imaging ranges which are imaging ranges adjacent to each other in the plurality of imaging ranges, and corresponding pixels which are pixels corresponding to the first multi-apex pixels are included in a second captured image obtained by imaging the subject within the other imaging range among the adjacent imaging ranges, the execution unit further executes a generation process of generating a panoramic image which is an image including a first projection-converted image which is an image obtained by performing projection conversion on the first captured image on the basis of the first multi-apex pixel, and a second projection-converted image which is an image obtained by performing projection conversion on the second captured image on the basis of the corresponding pixels.

16. The information processing device according to claim 15,
wherein the execution unit further executes a fifth display process of displaying imaging start timing information, indicating a timing when the imaging of the subject within the other imaging range is started, on a fifth display unit in a case where the other imaging range includes the apexes of the polygon.

17. The information processing device according to claim 1,
wherein in a case where second multi-apex pixels which are at least four or more pixels for defining apexes of a polygon are included in a captured image obtained by imaging the subject within the designated imaging range, the allowable range is a range including a position on a real space which corresponds to the positions of the second multi-apex pixels within the captured image.

18. An information processing device comprising:
an acquisition unit that acquires measurement success/failure information indicating whether measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light; and
an execution unit that executes a remeasurement process of causing the measurement unit to remeasure the distance to the subject in a state where a position of the designated imaging range has been changed within an allowable range in which the panoramic imaging is executable, in a case where the measurement success/failure information acquired by the acquisition unit indicates that the measurement of the measurement unit has not been successful,
wherein the remeasurement process is a process including a first movement process of moving the position of the designated imaging range within the allowable range by operating a first change mechanism including a first power source and changing an imaging direction in accordance with power generated by the first power source.

19. An information processing device comprising:
an acquisition unit that acquires measurement success/failure information indicating whether measurement of a measurement unit has been successful, in a case where the measurement unit measures a distance to a subject by emitting directional light, which is light having directivity, toward the subject within a designated imaging range which is an imaging range designated as an imaging target before individual imaging is performed, among a plurality of imaging ranges serving as imaging targets in panoramic imaging with respect to the subject, and receiving reflected light of the directional light; and
an execution unit that executes a remeasurement process of causing the measurement unit to remeasure the distance to the subject in a state where a position of the designated imaging range has been changed within an allowable range in which the panoramic imaging is executable, in a case where the measurement success/failure information acquired by the acquisition unit indicates that the measurement of the measurement unit has not been successful,
wherein the remeasurement process is a process including a first display process of displaying first induction information for inducing the change of the position of the designated imaging range within the allowable range on a first display unit.

* * * * *